(12) United States Patent
Giovanardi et al.

(10) Patent No.: US 9,676,244 B2
(45) Date of Patent: *Jun. 13, 2017

(54) INTEGRATED ACTIVE SUSPENSION SMART VALVE

(71) Applicant: Levant Power Corporation, Woburn, MA (US)

(72) Inventors: Marco Giovanardi, Melrose, MA (US); Clive Tucker, Charlestown, MA (US); Ross J. Wendell, Medford, MA (US); Zackary Martin Anderson, Cambridge, MA (US); John Giarratana, Whitman, MA (US); Richard Anthony Zuckerman, Somerville, MA (US); Colin Patrick O'Shea, Cambridge, MA (US); Vladimir Gorelik, Medford, MA (US); Tyson David Sawyer, Mason, NH (US); Jonathan R. Leehey, Wayland, MA (US); Johannes Schneider, Cambridge, MA (US); Robert Driscoll, Derry, NH (US); Patrick W. Neil, Randolph, MA (US)

(73) Assignee: ClearMotion, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/212,359

(22) Filed: Mar. 14, 2014

(65) Prior Publication Data

US 2014/0265169 A1    Sep. 18, 2014

Related U.S. Application Data

(60) Provisional application No. 61/815,251, filed on Apr. 23, 2013, provisional application No. 61/789,600, (Continued)

(51) Int. Cl.
*B60G 17/016* (2006.01)
*F15B 13/044* (2006.01)
(Continued)

(52) U.S. Cl.
CPC ........ *B60G 17/016* (2013.01); *F15B 13/0444* (2013.01); *F16K 11/065* (2013.01);
(Continued)

(58) Field of Classification Search
CPC ....... B60G 17/0444; B60G 17/08; F01B 3/10; F16D 31/02; F16F 9/32
(Continued)

(56) References Cited

U.S. PATENT DOCUMENTS 998,128 A    7/1911  Smith
1,116,293 A  11/1914 Kane
(Continued)

FOREIGN PATENT DOCUMENTS

CN    1325799 A    12/2001
CN    1370926 A    9/2002
(Continued)

OTHER PUBLICATIONS

[No Author Listed] Ride control innovation, accelerated[SM]. Forward thinking. Forward moving. ACOCAR. Tenneco. Sep. 2011.
(Continued)

*Primary Examiner* — Ruth Ilan
(74) *Attorney, Agent, or Firm* — Wolf, Greenfield & Sacks, P.C.

(57) ABSTRACT

Various embodiments related to hydraulic actuators and active suspension systems as well as their methods of use are described.

39 Claims, 23 Drawing Sheets

Related U.S. Application Data filed on Mar. 15, 2013, provisional application No. 61/865,970, filed on Aug. 14, 2013, provisional application No. 61/930,452, filed on Jan. 22, 2014.

(51) Int. Cl.

| | | |
|---|---|---|
| *F16K 11/065* | (2006.01) | |
| *F16K 31/12* | (2006.01) | |
| *B60G 15/10* | (2006.01) | |

(52) U.S. Cl.
CPC .............. *F16K 31/12* (2013.01); *B60G 15/10* (2013.01); *B60G 2202/413* (2013.01); *B60G 2204/11* (2013.01); *B60G 2400/0511* (2013.01); *B60G 2400/0521* (2013.01); *B60G 2400/60* (2013.01); *B60G 2800/70* (2013.01)

(58) Field of Classification Search
USPC .............. 60/475, 476; 280/5.504; 188/266.3
See application file for complete search history.

(56) References Cited

U.S. PATENT DOCUMENTS

| | | |
|---|---|---|
| 1,290,293 A | 1/1919 | Morski |
| 2,194,530 A | 3/1940 | Torstensson |
| 2,885,202 A | 5/1959 | Trumper et al. |
| 2,958,292 A | 11/1960 | Lipe et al. |
| 3,507,580 A | 4/1970 | Howard et al. |
| 3,515,889 A | 6/1970 | Kammerer |
| 3,559,027 A | 1/1971 | Arsem |
| 3,688,859 A | 9/1972 | Hudspeth et al. |
| 3,800,202 A | 3/1974 | Oswald |
| 3,803,906 A | 4/1974 | Ross |
| 3,805,833 A | 4/1974 | Teed |
| 3,921,746 A | 11/1975 | Lewus |
| 3,947,004 A | 3/1976 | Taylor |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 12/1986 | Williams et al. |
| 4,673,194 A | 6/1987 | Sugasawa |
| 4,729,459 A | 3/1988 | Inagaki et al. |
| 4,740,711 A | 4/1988 | Sato et al. |
| 4,815,575 A | 3/1989 | Murty |
| 4,857,755 A | 8/1989 | Comstock |
| 4,872,701 A | 10/1989 | Akatsu et al. |
| 4,887,699 A | 12/1989 | Ivers et al. |
| 4,908,553 A | 3/1990 | Hoppie et al. |
| 4,921,080 A | 5/1990 | Lin |
| 4,924,393 A | 5/1990 | Kurosawa |
| 4,936,423 A | 6/1990 | Karnopp |
| 4,981,309 A | 1/1991 | Froeschle et al. |
| 5,034,890 A | 7/1991 | Sugasawa et al. |
| 5,046,309 A | 9/1991 | Yoshino et al. |
| 5,060,959 A | 10/1991 | Davis et al. |
| 5,091,679 A | 2/1992 | Murty et al. |
| 5,098,119 A | 3/1992 | Williams et al. |
| 5,102,161 A | 4/1992 | Williams |
| 5,145,206 A | 9/1992 | Williams |
| 5,203,199 A | 4/1993 | Henderson et al. |
| 5,215,327 A | 6/1993 | Gatter et al. |
| 5,232,242 A | 8/1993 | Bachrach et al. |
| 5,243,525 A | 9/1993 | Tsutsumi et al. |
| 5,276,622 A | 1/1994 | Miller et al. |
| 5,291,960 A | 3/1994 | Brandenburg et al. |
| 5,295,563 A | 3/1994 | Bennett |
| 5,295,705 A | 3/1994 | Butsuen et al. |
| 5,337,560 A | 8/1994 | Abdelmalek et al. |
| 5,360,445 A | 11/1994 | Goldowsky |
| 5,377,791 A | 1/1995 | Kawashima et al. |
| 5,391,953 A | 2/1995 | Van de Veen |
| 5,425,436 A | 6/1995 | Teramura et al. |
| 5,480,186 A | 1/1996 | Smith |
| 5,497,324 A | 3/1996 | Henry et al. |
| 5,529,152 A | 6/1996 | Hamilton et al. |
| 5,570,286 A | 10/1996 | Margolis et al. |
| 5,572,425 A | 11/1996 | Levitt et al. |
| 5,590,734 A | 1/1997 | Caires |
| 5,608,308 A | 3/1997 | Kiuchi et al. |
| 5,659,205 A | 8/1997 | Weisser et al. |
| 5,682,980 A | 11/1997 | Reybrouck et al. |
| 5,684,383 A | 11/1997 | Tsuji et al. |
| 5,701,245 A | 12/1997 | Ogawa et al. |
| 5,717,303 A | 2/1998 | Engel |
| 5,764,009 A | 6/1998 | Fukaya et al. |
| 5,794,168 A | 8/1998 | Sasaki et al. |
| 5,794,439 A | 8/1998 | Lisniansky |
| 5,839,800 A | 11/1998 | Koga et al. |
| 5,856,709 A | 1/1999 | Ibaraki et al. |
| 5,892,293 A | 4/1999 | Lucas |
| 5,941,328 A | 8/1999 | Lyons et al. |
| 5,944,153 A | 8/1999 | Ichimaru |
| 5,987,368 A | 11/1999 | Kamimae et al. |
| 5,999,868 A | 12/1999 | Beno et al. |
| 6,025,665 A | 2/2000 | Poag |
| 6,049,746 A | 4/2000 | Southward et al. |
| 6,092,618 A | 7/2000 | Collier-Hallman |
| 6,111,375 A | 8/2000 | Zenobi |
| 6,161,844 A | 12/2000 | Charaudeau et al. |
| 6,190,319 B1 | 2/2001 | Goldowsky |
| 6,227,817 B1 | 5/2001 | Paden |
| 6,282,453 B1 | 8/2001 | Lombardi |
| 6,290,034 B1 | 9/2001 | Ichimaru |
| 6,314,353 B1 | 11/2001 | Ohsaku et al. |
| 6,349,543 B1 | 2/2002 | Lisniansky |
| 6,394,238 B1 | 5/2002 | Rogala |
| 6,397,134 B1 | 5/2002 | Shal et al. |
| 6,441,508 B1 | 8/2002 | Hylton |
| 6,452,535 B1 | 9/2002 | Rao et al. |
| 6,502,837 B1 | 1/2003 | Hamilton et al. |
| 6,519,517 B1 | 2/2003 | Heyring et al. |
| 6,519,939 B1 | 2/2003 | Duff |
| 6,559,553 B2 | 5/2003 | Yumita |
| 6,575,484 B2 | 6/2003 | Rogala et al. |
| 6,592,060 B1 | 7/2003 | Vomhof et al. |
| 6,631,960 B2 | 10/2003 | Grand et al. |
| 6,765,389 B1 | 7/2004 | Moore |
| 6,876,100 B2 | 4/2005 | Yumita |
| 6,908,162 B2 | 6/2005 | Obayashi et al. |
| 6,920,951 B2 | 7/2005 | Song et al. |
| 6,944,544 B1 | 9/2005 | Prakah-Asante et al. |
| 6,952,060 B2 | 10/2005 | Goldner |
| 6,964,325 B2 | 11/2005 | Maes |
| 6,973,880 B2 | 12/2005 | Kumar |
| 7,015,594 B2 | 3/2006 | Asada |
| 7,023,107 B2 | 4/2006 | Okuda et al. |
| 7,034,482 B2 | 4/2006 | Komiyama et al. |
| 7,051,526 B2 | 5/2006 | Geiger |
| 7,087,342 B2 | 8/2006 | Song |
| 7,156,406 B2 | 1/2007 | Kraus et al. |
| 7,195,250 B2 | 3/2007 | Knox et al. |
| 7,198,125 B2 | 4/2007 | Skelcher et al. |
| 7,206,678 B2 | 4/2007 | Arduc et al. |
| 7,335,999 B2 | 2/2008 | Potter |
| 7,336,002 B2 | 2/2008 | Kato et al. |
| 7,392,998 B2 | 7/2008 | Runkel |
| 7,513,490 B2 | 4/2009 | Robertson |
| 7,533,890 B2 | 5/2009 | Chiao |
| 7,656,055 B2 | 2/2010 | Torres et al. |
| 7,722,056 B2 | 5/2010 | Inoue et al. |
| 7,854,203 B2 | 12/2010 | Kumar |
| 7,938,217 B2 | 5/2011 | Stansbury |
| 7,963,529 B2 | 6/2011 | Oteman et al. |
| 8,063,498 B2 | 11/2011 | Namuduri et al. |
| 8,067,863 B2 | 11/2011 | Giovanardi |
| 8,079,436 B2 | 12/2011 | Tikkanen et al. |
| 8,080,888 B1 | 12/2011 | Daley |
| 8,167,319 B2 | 5/2012 | Ogawa |

(56) References Cited

U.S. PATENT DOCUMENTS

| | | |
|---|---|---|
| 8,255,117 B2 | 8/2012 | Bujak et al. |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,380,416 B2 | 2/2013 | Offerle et al. |
| 8,392,030 B2 | 3/2013 | Anderson et al. |
| 8,453,809 B2 | 6/2013 | Hall |
| 8,475,137 B2 | 7/2013 | Kobayashi et al. |
| 8,548,678 B2 | 10/2013 | Ummethala et al. |
| 8,590,679 B2 | 11/2013 | Hall |
| 8,596,055 B2 | 12/2013 | Kadlicko |
| 8,672,337 B2 | 3/2014 | van der Knaap et al. |
| 8,776,961 B2 | 7/2014 | Mori et al. |
| 8,820,064 B2 | 9/2014 | Six et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 8,892,304 B2 | 11/2014 | Lu et al. |
| 8,966,889 B2 | 3/2015 | Six |
| 9,035,477 B2 | 5/2015 | Tucker et al. |
| 9,108,484 B2 | 8/2015 | Reybrouck |
| 9,174,508 B2 | 11/2015 | Anderson et al. |
| 9,205,718 B2 | 12/2015 | Lee |
| 9,260,011 B2 | 2/2016 | Anderson et al. |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0083629 A1 | 5/2004 | Kondou |
| 2004/0096334 A1 | 5/2004 | Aldinger et al. |
| 2004/0119289 A1 | 6/2004 | Zabramny |
| 2004/0207350 A1 | 10/2004 | Wilton et al. |
| 2004/0211631 A1 | 10/2004 | Hsu |
| 2004/0212273 A1 | 10/2004 | Gould |
| 2005/0017462 A1 | 1/2005 | Kroppe |
| 2005/0098399 A1 | 5/2005 | Bremner |
| 2005/0121268 A1 | 6/2005 | Groves et al. |
| 2005/0246082 A1 | 11/2005 | Miki et al. |
| 2005/0280318 A1 | 12/2005 | Parison et al. |
| 2006/0090462 A1 | 5/2006 | Yoshino |
| 2006/0178808 A1 | 8/2006 | Wu et al. |
| 2006/0239849 A1 | 10/2006 | Heltzapple et al. |
| 2007/0018626 A1 | 1/2007 | Chi |
| 2007/0021886 A1 | 1/2007 | Miyajima |
| 2007/0088475 A1 | 4/2007 | Nordgren et al. |
| 2007/0089919 A1 | 4/2007 | de la Torre et al. |
| 2007/0089924 A1 | 4/2007 | de la Torre et al. |
| 2007/0120332 A1 | 5/2007 | Bushko et al. |
| 2007/0170680 A1 | 7/2007 | van der Knaap et al. |
| 2007/0233279 A1 | 10/2007 | Kazerooni et al. |
| 2008/0004771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238004 A1 | 10/2008 | Turco et al. |
| 2008/0238396 A1 | 10/2008 | Ng et al. |
| 2008/0257626 A1 | 10/2008 | Carabelli et al. |
| 2009/0015202 A1 | 1/2009 | Miura et al. |
| 2009/0192674 A1 | 7/2009 | Simons |
| 2009/0212649 A1 | 8/2009 | Kingman et al. |
| 2009/0229902 A1 | 9/2009 | Stansbury |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1 | 3/2010 | Anderson et al. |
| 2010/0115936 A1 | 5/2010 | Williamson et al. |
| 2010/0217491 A1 | 8/2010 | Naito et al. |
| 2010/0244457 A1 | 9/2010 | Bhat et al. |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0057478 A1 | 3/2011 | van der Knaap et al. |
| 2011/0127127 A1 | 6/2011 | Hirao et al. |
| 2011/0162903 A1 | 7/2011 | Stragier |
| 2011/0303049 A1 | 12/2011 | Neelakantan et al. |
| 2012/0010780 A1 | 1/2012 | Hayashi et al. |
| 2012/0055745 A1 | 3/2012 | Buettner et al. |
| 2012/0067037 A1 | 3/2012 | Bohrer et al. |
| 2012/0078470 A1 | 3/2012 | Hirao et al. |
| 2012/0181757 A1 | 7/2012 | Oteman et al. |
| 2012/0233991 A1 | 9/2012 | Ivantysynova et al. |
| 2012/0305347 A1 | 12/2012 | Mori et al. |
| 2013/0081382 A1 | 4/2013 | Nelson et al. |
| 2013/0147205 A1 | 6/2013 | Tucker et al. |
| 2013/0154280 A1 | 6/2013 | Wendell et al. |
| 2013/0221625 A1 | 8/2013 | Pare et al. |
| 2013/0264158 A1 | 10/2013 | Hall |
| 2014/0095022 A1 | 4/2014 | Cashman et al. |
| 2014/0260233 A1 | 9/2014 | Giovanardi et al. |
| 2014/0265170 A1 | 9/2014 | Giovanardi et al. |
| 2014/0271066 A1 | 9/2014 | Hou |
| 2014/0288776 A1 | 9/2014 | Anderson et al. |
| 2014/0294601 A1 | 10/2014 | O'Shea et al. |
| 2014/0294625 A1 | 10/2014 | Tucker et al. |
| 2014/0297113 A1 | 10/2014 | Zuckerman et al. |
| 2014/0297116 A1 | 10/2014 | Anderson et al. |
| 2014/0297117 A1 | 10/2014 | Near et al. |
| 2014/0297119 A1 | 10/2014 | Giovanardi et al. |
| 2014/0346783 A1 | 11/2014 | Anderson et al. |
| 2015/0059325 A1 | 3/2015 | Knussman et al. |
| 2015/0192114 A1 | 7/2015 | Triebel et al. |
| 2015/0224845 A1 | 8/2015 | Anderson et al. |
| 2015/0316039 A1 | 11/2015 | Tucker et al. |
| 2016/0031285 A1 | 2/2016 | Tucker et al. |
| 2016/0059664 A1 | 3/2016 | Tucker et al. |
| 2016/0075205 A1 | 3/2016 | Anderson et al. |
| 2016/0097406 A1 | 4/2016 | Zuckerman et al. |
| 2016/0114643 A1 | 4/2016 | Anderson et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| CN | 101749353 A | 6/2010 |
| DE | 3937987 A1 | 5/1991 |
| DE | 195 35 752 A1 | 3/1997 |
| EP | 0 363 158 A2 | 4/1990 |
| EP | 1878598 | 1/2008 |
| EP | 2 131 072 A1 | 12/2009 |
| EP | 2 136 055 A1 | 12/2009 |
| EP | 2 541 070 A1 | 1/2013 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | S22-3510 U | 12/1947 |
| JP | S59-187124 A | 10/1984 |
| JP | H3-123981 U1 | 12/1991 |
| JP | H05-50195 U | 7/1993 |
| JP | 8-226377 A2 | 9/1996 |
| JP | H11-166474 A | 6/1999 |
| JP | 2001-311452 A | 9/2001 |
| JP | 2003/035254 | 2/2003 |
| JP | 2005-521820 | 7/2005 |
| JP | 2008-536470 A | 9/2008 |
| JP | 2009-115301 A | 5/2009 |
| WO | WO 97/26145 A | 7/1997 |
| WO | WO 2007/071362 A1 | 6/2007 |
| WO | WO 2010/066416 A1 | 6/2010 |
| WO | WO 2011/159874 A2 | 12/2011 |
| WO | WO 2012/167316 A1 | 12/2012 |

(56) References Cited

FOREIGN PATENT DOCUMENTS

OTHER PUBLICATIONS

Cleasby et al., A novel high efficiency electrohydrostatic flight simulator motion system. Fluid Pow Mot Control. Centre for PTMC, UK. 2008;437-449.
Shen et al., Automative electric power and energy mangement—a system approach. Business Briefing: Global Automotive Manufacturing and Technology. 2003:1-5.
Kaminaga et al., Mechanism and Control of knee power augmenting device with backdrivable electro-hydrostatic actuator. 13th World congress Mechanism Machine Science. Jun. 19-25, 2011. 1-10.
Vandersmissen, ACOCAR active suspension. Vehicle Dynamics Expo. Stuttgart, Jul. 5, 2008. 24 pages.
Vandersmissen et al., The new Tenneco ACOCAR active suspension. Vehicle Dynamics Expo. Stuttgart, Jun. 22-24, 2010. 19 pages.
U.S. Appl. No. 14/212,238, filed Mar. 14, 2014, Giovanardi et al.
U.S. Appl. No. 14/212,238, filed Mar. 14, 2014, Anderson et al.
U.S. Appl. No. 14/212,238, filed Apr. 1, 2014, Tucker et al.
U.S. Appl. No. 14/212,238, filed Apr. 1, 2014, O'Shea et al.
U.S. Appl. No. 14/212,238, filed Apr. 1, 2014, Anderson et al.
U.S. Appl. No. 14/212,238, filed Apr. 1, 2014, Zuckerman et al.
U.S. Appl. No. 14/212,238, filed Apr. 1, 2014, Near et al.
U.S. Appl. No. 14/212,238, filed Apr. 1, 2014, Giovanardi et al.
PCT/US2009/040749, Jul. 15, 2009, International Search Report and Written Opinion.
PCT/US2009/040749, Oct. 28, 2010, International Preliminary Report on Patentability.
PCT/US2010/002116, Feb. 16, 2012, International Preliminary Report on Patentability.
PCT/US2010/002116, Oct. 28, 2010, International Search Report and Written Opinion.
PCT/US2010/002105, Mar. 8, 2012, International Preliminary Report on Patentability.
PCT/US2010/002105, Dec. 30, 2011, International Search Report and Written Opinion.
PCT/US2011/040654, Oct. 26, 2011, Invitation to Pay Additional Fees.
PCT/US2011/040654, Jan. 3, 2013, International Preliminary Report on Patentability.
PCT/US2011/040654, Jan. 27, 2012, International Search Report and Written Opinion.
U.S. Appl. No. 14/602,463, filed Jan. 22, 2015, Anderson et al.
U.S. Appl. No. 14/681,630, filed Apr. 8, 2015, Tucker et al.
U.S. Appl. No. 14/989,725, filed Jan. 6, 2016, Anderson et al.
U.S. Appl. No. 14/959,892, filed Sep. 21, 2015, Anderson et al.
U.S. Appl. No. 14/777,068, filed Sep. 15, 2015, Tucker et al.
U.S. Appl. No. 14/786,414, filed Oct. 22, 2015, Tucker et al.
U.S. Appl. No. 14/750,357, filed Jun. 25, 2015, Giarratana et al.
U.S. Appl. No. 14/801,787, filed Jul. 16, 2015, Tucker et al.
U.S. Appl. No. 14/876,796, filed Oct. 6, 2015, Zuckerman et al.
U.S. Appl. No. 14/800,201, filed Jul. 15, 2015, Giarratana et al.
PCT/US2014/0277389, Oct. 1, 2014, International Search Report and Written Opinion.

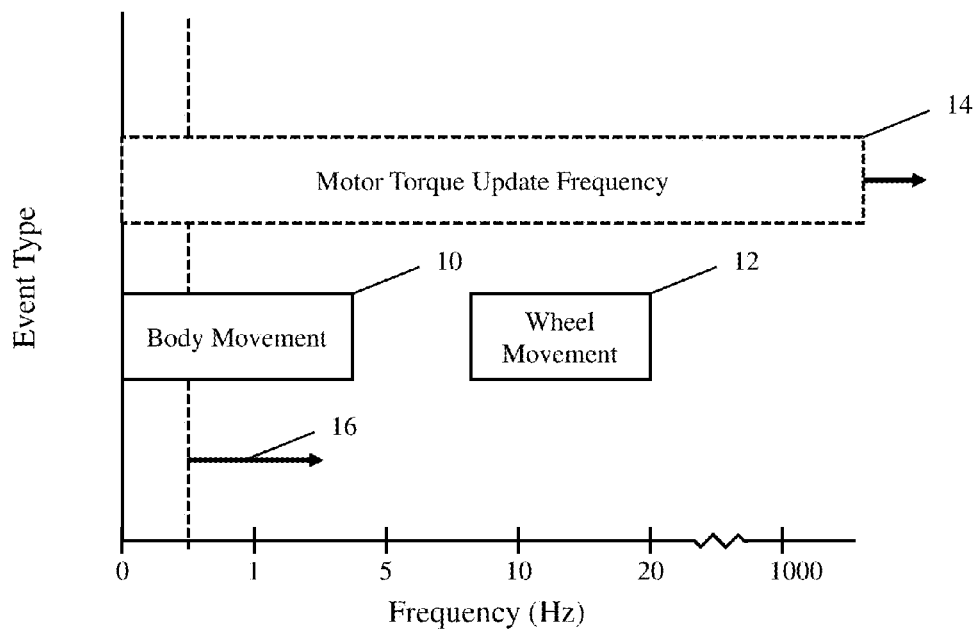
Fig. 3
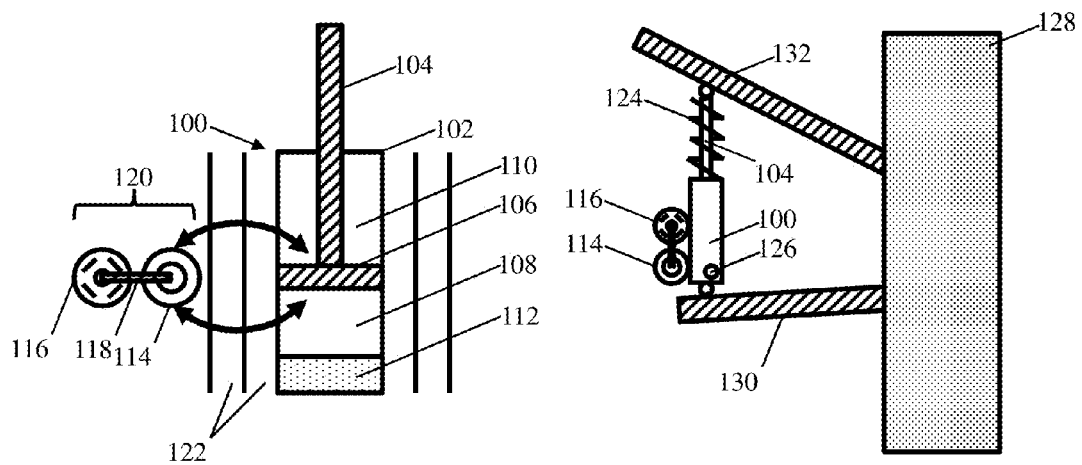
Fig. 4                    Fig. 5

INTEGRATED ACTIVE SUSPENSION SMART VALVE

CROSS-REFERENCE TO RELATED APPLICATIONS

This application claims the priority under 35 U.S.C. §119(e) of U.S. provisional application Ser. No. 61/789,600, entitled "ACTIVE SUSPENSION" filed Mar. 15, 2013, U.S. provisional application Ser. No. 61/815,251, entitled "ACTIVE SUSPENSION," filed Apr. 23, 2013, U.S. provisional application Ser. No. 61/865,970, entitled "MULTI-PATH FLUID DIVERTER VALVE," filed Aug. 14, 2013, and U.S. provisional application Ser. No. 61/930,452, entitled "ELECTROHYDRAULIC SYSTEMS", filed Jan. 22, 2014, the disclosures of which are incorporated by reference in their entirety.

FIELD

Disclosed embodiments are related to the hydraulic actuation systems and controls.

BACKGROUND

Hydraulic actuators have long been used for motion control including, for example, active suspension systems which apply energy to the active suspension in response to various loads applied to a wheel and/or associated vehicle body. In order to achieve a desired level of performance, an active suspension system needs to have energy either already present or capable of being provided at an appropriate time. In the case of hydraulic systems, the necessary energy corresponds to a necessary hydraulic pressure and flow. One common approach used in hydraulic actuation systems, as well as hydraulic active suspension systems, to ensure that energy is applied in a timely manner is to use a continuously operating pump to provide a desired hydraulic pressure and flow. These types of systems control the fluid flow and pressure provided by the continuously operating pump either by controlling the displacement of the pump and/or using one or more electronically controlled valves to control the fluid flow and pressure from the pump to the actuator. Some systems, especially systems including fixed displacement pumps, use valves to by-pass the actuator. However, it should be noted that in some hydraulic systems, a speed of the pump may be adjusted to increase or decrease the hydraulic flow volume and/or pressure.

Hydraulic actuator systems and hydraulic suspension systems are typically powered using a hydraulic actuator associated with a remotely located hydraulic power source used to transfer hydraulic fluid to and from the actuator via an arrangement of hydraulic hoses or tubes. Hydraulic power sources may include various components including, for example, an electric motor and pump assembly as well as a fluid reservoir.

SUMMARY

In one embodiment, an active suspension system includes a hydraulic actuator including an extension volume and a compression volume. The hydraulic actuator is constructed and arranged to be coupled to a vehicle wheel or suspension member. A hydraulic motor is in fluid communication with the extension volume and the compression volume of the hydraulic actuator to control extension and compression of the hydraulic actuator. An electric motor is also operatively coupled to the hydraulic motor. A controller is electrically coupled to the electric motor, and the controller controls a motor input of the electric motor to operate the hydraulic actuator in at least three of four quadrants of a force velocity domain of the hydraulic actuator.

In another embodiment, a method for controlling an active suspension system includes: controlling a motor input of an electric motor to operate a hydraulic actuator in at least three of four quadrants of a force velocity domain of the hydraulic actuator, wherein the hydraulic actuator is constructed and arranged to be coupled to a vehicle wheel or suspension member, and wherein the electric motor is operatively coupled to a hydraulic motor in fluid communication with an extension volume and a compression volume of the hydraulic actuator to control extension and compression of the hydraulic actuator.

In yet another embodiment, an active suspension system includes a hydraulic actuator including an extension volume and a compression volume. The hydraulic actuator is constructed and arranged to be coupled to a vehicle wheel or suspension member. A hydraulic motor-pump is in fluid communication with the extension volume and the compression volume of the hydraulic actuator to control extension and compression of the hydraulic actuator. An electric motor is also operatively coupled to the hydraulic motor, and a sensor is configured and arranged to sense wheel events and/or body events. A controller is electrically coupled to the electric motor and the sensor. Additionally, in response to a sensed wheel event and/or a sensed body event, the controller applies a motor input to the electric motor to control the hydraulic actuator.

In another embodiment, a method for controlling an active suspension system includes: sensing a wheel event and/or a body event; and applying a motor input to an electric motor in response to the sensed wheel event and/or the body event, wherein the electric motor is operatively coupled to a hydraulic motor-pump in fluid communication with an extension volume and a compression volume of a hydraulic actuator.

In yet another embodiment, an actuation system includes a hydraulic actuator including an extension volume and a compression volume. A hydraulic motor is in fluid communication with the extension volume and the compression volume of the hydraulic actuator to control extension and compression of the hydraulic actuator. Also, an electric motor is operatively coupled to the hydraulic motor. The actuation system has a reflected system inertia and a system compliance, and a product of the system compliance times the reflected system inertia is less than or equal to about $0.0063 \text{ s}^{-2}$.

In another embodiment, a device includes a housing including a first port and a second port. A hydraulic motor-pump is disposed within the housing, and the hydraulic motor-pump controls a flow of fluid between the first port and the second port. An electric motor is disposed within the housing and operatively coupled to the hydraulic motor. Additionally, a controller electrically coupled to the electric motor and disposed within the housing controls a motor input of the electric motor.

In yet another embodiment, an active suspension system includes an active suspension housing, and a hydraulic motor-pump disposed within the active suspension housing. The hydraulic motor controls a flow of fluid through the active suspension housing. An electric motor is disposed within the active suspension housing and operatively coupled to the hydraulic motor. Also, a controller is electrically coupled to the electric motor and disposed within the active suspension housing. The controller controls a motor input of the electric motor.

In another embodiment, a vehicle includes one or more active suspension actuators, where each active suspension actuator includes a hydraulic actuator including an extension volume and a compression volume. A hydraulic motor-pump is in fluid communication with the extension volume and the compression volume of the hydraulic actuator to control extension and compression of the hydraulic actuator. An electric motor is operatively coupled to the hydraulic motor-pump, and a controller is electrically coupled to the electric motor. The controller controls a motor input of the electric motor to control the hydraulic actuator.

In another embodiment, a device includes a housing and a pressure-sealed barrier located in the housing disposed between a first portion of the housing and a second portion of the housing. The first portion is constructed and arranged to be filled with a fluid subjected to a variable pressure relative to the second portion. Additionally, an electrical feed-through passes from the first portion of the housing to the second portion of the housing through the pressure-sealed barrier. A compliant connection is electrically connected to the electrical feed-through and is also electrically connected to a controller disposed on or within the housing.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 3 is an exemplary graph of frequency-domain for various inputs and motor control of an active suspension system;

FIG. 4 is a schematic representation of a hydraulic actuator;

FIG. 5 is a schematic representation of a hydraulic actuator integrated into a vehicle suspension;

DETAILED DESCRIPTION

Figure 1:
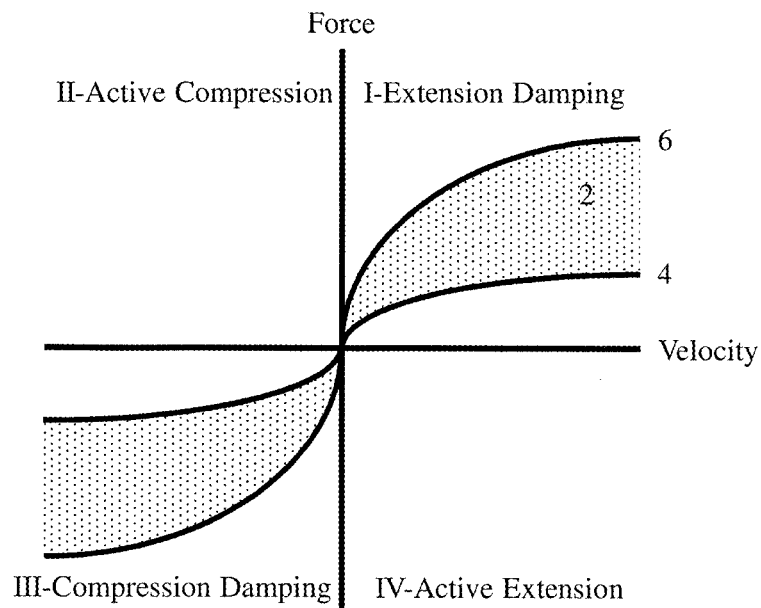
FIG. 1 is an exemplary graph of a conventional semi-active suspension force/velocity range.

The inventors have recognized several drawbacks associated with typical hydraulic actuator systems and hydraulic suspension systems. More specifically, the costs associated with hydraulic power systems used with typical hydraulic actuators and hydraulic suspension systems can be prohibitively expensive for many applications. Further, the packaging associated with remotely located hydraulic power systems necessitates the use of multiple hydraulic hoses and/or tubing over relatively long lengths which can present installation challenges and reliability issues. Additionally, as noted above applications requiring energy to be constantly available require the use of a continuously running pump. However, the inventors have recognized that requiring a pump to continuously operate requires energy to be applied to the pump even when no hydraulic energy is actually needed thus decreasing system efficiency. While some systems use variable displacement pumps to increase efficiency of the system, the systems tend to be more expensive and less reliable than corresponding systems using fixed displacement pumps which can limit their use for many applications. Additionally, systems which adjust the speed of the pump also face several technical challenges limiting their use including, for example, startup friction, rotational inertia, and limitations in their electronic control systems.

In view of the above, as well as other considerations, the inventors have recognized the benefits associated with decentralizing a hydraulic system in order to provide self-contained or partially self-contained hydraulic actuation systems. For example, and as described in more detail below, instead of including a remotely located hydraulic power system, a hydraulic power system, or some portion of a hydraulic power system, may be integrated with, or attached to, a hydraulic actuator. Depending on the particular construction, this may reduce or eliminate the need for external hydraulic connections between the hydraulic power system and the hydraulic actuator. This may both provide increased reliability as well as reduced installation costs and complexity associated with the overall hydraulic system.

The inventors have also recognized the benefits associated with providing a hydraulic actuator and/or an active suspension system capable of providing on demand power which may reduce energy consumption since it does not require continuously operating a pump. A hydraulic system capable of providing on demand power may include a hydraulic actuator body, a hydraulic motor-pump, an associated electric motor operatively coupled to the hydraulic motor-pump, and a controller. Additionally, the hydraulic motor-pump may be operated in lockstep with the hydraulic actuator such that energy delivery to the electric motor may rapidly and directly control a pressure applied to, and thus response of, the hydraulic actuator without the need for ancillary electronically controlled valves. A hydraulic system capable of providing on demand power may also reduce the complexity of a system while providing a desired level of performance.

In addition to the above, the inventors have recognized the benefits associated with providing a hydraulic actuator and/or suspension system capable of being controlled at a sufficiently fast rate to enable the system to respond to individual events as compared to control in a system based on average behavior over time. This may be especially beneficial in use for a vehicle suspension system responding to individual wheel and/or body events which may enable enhanced vehicle performance and comfort. Additionally, depending on the particular application, a hydraulic system may also provide control within three or more quadrants of a force velocity domain as described in more detail below. However, it should be understood that the hydraulic system may also operate in one, two, or any appropriate number of quadrants of the force velocity domain as the disclosure is not so limited.

In embodiments implementing the disclosed hydraulic actuator and suspension systems, the inventors have recognized that a response time to supply a desired force and/or displacement by the hydraulic system may be limited due to inherent delays associated with compliances and inertias various components in the system. Consequently, in embodiments where it is desired to have a particular response time, the inventors have recognized that it may be desirable to design the compliances and inertias of a hydraulic system to enable a desired level of performance as described in more detail below.

While issues with typical hydraulic actuators and suspension systems as well as several possible benefits associated with various embodiments have been noted, the embodiments described herein should not be limited to only addressing the limitations noted above and may also provide other benefits as neither the disclosure nor the claims are limited in this fashion.

For the purposes of this application, the term hydraulic motor-pump may refer to either a hydraulic motor or a hydraulic pump.

In one embodiment, a hydraulic system includes a hydraulic actuator, a hydraulic motor-pump, an electric motor, and an associated controller. The hydraulic actuator includes an extension volume and a compression volume located within the housing of the hydraulic actuator. The extension volume and the compression volume are located on either side of a piston constructed and arranged to move through an extension stroke and a compression stroke of the actuator. The hydraulic actuator housing may correspond to any appropriate structure including, for example, a hydraulic actuator housing including multiple channels defined by one or more concentric tubes. The hydraulic actuator is associated with a hydraulic motor-pump that is in fluid communication with the extension volume and the compression volume of the hydraulic actuator to control actuation of the hydraulic actuator. More specifically, when the hydraulic motor-pump is operated in a first direction, fluid flows from the extension volume to the compression volume and the hydraulic actuator undergoes an extension stroke. Correspondingly, when the hydraulic motor-pump is operated in a second direction, fluid flows from the compression volume to the extension volume and the hydraulic actuator undergoes a compression stroke. Additionally, in at least some embodiments, the hydraulic motor-pump may operate in lockstep with the hydraulic actuator to control both extension and compression of the hydraulic actuator. It should be understood that any appropriate hydraulic motor-pump might be used including devices capable of providing fixed displacements, variable displacements, fixed speeds, and/or variable speeds as the disclosure is not limited to any particular device. For example, in one embodiment, the hydraulic motor-pump may correspond to a gerotor.

As noted above, the hydraulic system also includes an electric motor which is operatively coupled to the hydraulic motor-pump. The electric motor may either be directly or indirectly coupled to the hydraulic motor-pump as the disclosure is not so limited. In either case, the electric motor controls force applied to the hydraulic motor-pump. Further, depending on how the electric motor is controlled, the hydraulic motor-pump may either actively drive the hydraulic actuator or it may act as a generator to provide damping to the hydraulic actuator while also generating energy that may either be stored for future use or dissipated. In instances where the electric motor is back driven as a generator, the hydraulic motor-pump is driven in a particular direction by fluid flowing between the compression volume and the extension volume of a hydraulic actuator in response to an applied force. In turn, the hydraulic motor-pump drives the electric motor to produce electrical energy. By controlling an impedance, or other appropriate input, applied to the electric motor during generation, the damping force applied to the hydraulic actuator may be electronically controlled to provide a range of forces. In some embodiments, the hydraulic motor-pump is operated in lockstep with the hydraulic actuator.

The above-noted controller is electrically coupled to the electric motor and controls a motor input of the electric motor in order to control a force applied to the hydraulic actuator as well as the particular mode of operation. The motor input may correspond to any appropriate parameter including, for example, a position, a voltage, a torque, an impedance, a frequency, and/or a motor speed of the electric motor. The electric motor may be powered by any appropriate energy source including, for example external energy sources such as an external power supply, a battery on a car, and other appropriate sources as well as internal sources which might be integrated with a controller and/or a hydraulic actuator such as batteries, super capacitors, hydraulic accumulators, flywheels, and other appropriate devices. In view of the above, the pressure supplied to the hydraulic actuator may be controlled by the electric motor connected to the hydraulic motor-pump without the need for separately controlled valves.

The hydraulic motor-pump may also be operated in a bidirectional manner, though embodiments in which the hydraulic motor-pump is only operated in a single direction is also possible through the use of appropriate valving. In such an embodiment, a position of the hydraulic actuator may be determined by a position of the electric motor. Consequently, depending on how the electric motor is controlled, the associated hydraulic actuator may be held still, actively extended, or actively compressed. Alternatively, the hydraulic actuator may be subjected to either compression damping or extension damping as well. Thus, a hydraulic system constructed and operated as described above may be used to control the hydraulic actuator in either direction without the use of complex valving arrangements and power is only applied to the system when needed as contrasted to a continuously operating pump. For example, in one specific embodiment, over half of the fluid pumped by the hydraulic motor-pump may be used to actuate a hydraulic actuator instead of bypassing the actuator through one or more valves.

In instances where a hydraulic actuator is used in load holding applications, such as in off-highway lifting applications, forklifts, lift booms or robotics applications for example, it may be desirable to incorporate load holding valves to hydraulically lock the actuator in place until the actuator is commanded to move. Load holding devices may also be desirable for safety and/or fail safe reasons. In one embodiment, a load holding device is one or more load holding valves. These one or more load holding valves may either be passive in nature, e.g. pilot operated check valves, or they may be active such that they require a control input, e.g. solenoid operated valves. In other embodiments, the load holding device is a mechanical device constructed and arranged to lock the hydraulic actuator in place. For example, the load holding device may be a mechanical brake constructed and arranged to grip the piston rod. In such an embodiment, the mechanical device may be hydraulically, mechanically, and/or electrically deactivated when it is desired to move the hydraulic actuator. While several possible load holding devices are described above, it should be understood that any appropriate device capable of limiting and/or preventing actuation of a hydraulic actuator might be used.

While a specific embodiment is described above, it should be understood that embodiments integrating various types of valving and/or a continuously operating pump are also possible as the disclosure is not so limited.

In one embodiment, a hydraulic actuation system and/or a suspension system includes an electric motor, a hydraulic motor-pump (which may be a hydrostatic unit commonly referred to as an HSU), a hydraulic actuator, and a motor controller. Depending on the embodiment, the various ones of the above-noted components may be disposed in, or integrated with, a single housing. Additionally, the electric motor and the hydraulic motor-pump may be closely coupled to one another. The ability to combine the electric motor, hydraulic motor-pump, and motor controller into a compact, self-contained unit, where the electric motor and the hydraulic motor-pump are closely coupled on a common shaft may offer many advantages in terms of size, performance, reliability and durability. In some embodiments, the motor controller has the ability for bi-directional power flow and has the ability to accurately control the motor by controlling either the motor voltage, current, resistance, a combination of the above, or another appropriate motor input. This may permit the motor controller to accurately achieve a desired motor speed, position, and/or torque based upon sensor input (from either internal sensors, external sensors or combination both). The above combination of elements may be termed a 'smart valve' as the unit can accurately control hydraulic flow and/or pressure in a bi-directional manner. Additionally, this control may be achieved without the need for separate passive or actively controlled valves. Though embodiments in which additional valves may be used with the smart valve are also contemplated.

As noted above, an electric motor and hydraulic motor-pump within the smart valve may be close coupled on a common shaft. Additionally, these components may be disposed in a common fluid-filled housing, thereby eliminating the need for shafts with seals. This may increase the valve's durability and performance. Additionally, some embodiments a smart valve also includes an integrated electronic controller which may combine both power and logic capabilities and may also include sensors, such as a rotary position sensors, accelerometers, or temperature sensors and the like. Integrating the electronic controller into the smart valve minimizes the distance between the controller power board and the electric motor windings, thereby reducing the length of the power connection between the electric motor and the power board section of the integrated electronic controller. This may reduce both power loss in the connection and electromagnetic interference (EMI) disturbances from within the vehicle.

The combination of a smart valve and a hydraulic actuator into a single body unit may provide a sleek and compact design that offers multiple benefits. For example, such an embodiment reduces integration complexity by eliminating the need to run long hydraulic hoses, improves durability by fully sealing the system, reduces manufacturing cost, improves response time by increasing the system stiffness, and reduces loses both electrical and hydraulic from the shorter distances between components. Such a system also allows for easy integration with many suspension architectures, such as monotubes, McPherson struts or air-spring systems. For ease of integration into the vehicle, it is desirable for the integrated active suspension smart valve and hydraulic actuator to fit within the constraints of size and/or shape of typical passive damper-based suspension systems. Therefore, in some embodiments a smart valve is sized and shaped to conform to the size, shape, and form factor constraints of a typical passive damper-based suspension system which may, among other things, permit the smart valve based actuator to be installed in existing vehicle platforms without requiring substantial re-design of those platforms.

According to one aspect a smart valve may include an electronic control unit or controller, an electric motor operatively coupled to a hydraulic motor-pump, and one or more sensors configured into a single unit. The hydraulic motor-pump includes a first port and a second port. The first port is in fluid communication with an extension volume of a hydraulic actuator and the second port is in fluid communication with a compression volume of the hydraulic actuator. In such an embodiment, the smart valve may be controlled to create controlled forces in multiple (e.g., typically three or four) quadrants of a vehicle suspension force velocity domain, whereby the four quadrants of the force velocity domain of the hydraulic actuator correspond to compression damping, extension damping, active extension, and active compression. Various embodiments of a smart valve are possible and may optionally include the items identified above including a piston disposed within the hydraulic actuator. The piston is movably positioned between the first chamber and a second chamber within the actuator. The first chamber may be an extension volume and the second chamber may be a compression volume.

According to another aspect, a smart valve may again include a controller, an electric motor, a hydraulic motor-pump, and one or more sensors. The smart valve may be operated by the electronic controller to provide a motor output such as a desired speed or torque of the electric motor by controlling a motor input of the electric motor such as the voltage or current through the motor windings. This may create a torque that resists rotation of the motor.

According to another aspect the controller may control an electric motor by a motor input of at least one of position, voltage, torque, impedance or frequency. Additionally, the various components of a smart valve may be disposed in or integrated with a single housing or body. Alternatively the controller, electric motor, and sensors may be housed in a housing that can be assembled to a housing for the hydraulic motor-pump to facilitate communication among the active suspension system components.

In another embodiment, a smart valve may include an electric motor, electric motor controller, and hydraulic pump in a housing. Depending on the embodiment, the housing is fluid filled. An alternate configuration of a smart valve may include a hydraulic pump, an electric motor that controls operation of the hydraulic pump, an electric motor controller, and one or more sensors in a single body housing. In yet another configuration of a smart valve, the smart valve may include an electric motor, a hydraulic motor-pump, and a piston equipped hydraulic actuator in fluid communication with the hydraulic motor-pump.

According to another aspect, a smart valve may be sized and shaped to fit in a vehicle wheel well. In such an embodiment, a smart valve may include a piston rod disposed in an actuator body, a hydraulic motor, an electric motor, and an electric controller for controlling the electric motor. The smart valve may also include one or more passive valves disposed in the actuator body. The passive valves may either operate in either series or parallel with the hydraulic motor.

According to another aspect, a smart valve incorporated into an active suspension system may be configured so that the electronic controller that controls the electric motor is closely integrated with the smart valve and/or electric motor. This may beneficially minimize the length of a high current path from the control electronics to the electric motor.

According to another aspect, it may be desired to integrate one or more smart valves and/or hydraulic actuators with a vehicle active suspension system that controls all wheels of the vehicle. Such a system may include a plurality of smart valves, each being disposed proximal to a vehicle wheel so that each smart valve is capable of producing wheel-specific variable flow and/or pressure for controlling the associated wheels. This may be accomplished by controlling the flow of fluid through the smart valve. Similar to the above, the flow of fluid through the individual smart valves may be controlled using the electric motor associated with the hydraulic motor-pump of each smart valve. Depending on the particular embodiment, it may be desirable for the electric motor to be coaxially disposed with the hydraulic motor-pump.

While several possible embodiments of a smart valve are described herein, it should be understood that a smart valve may be configured in a variety of other ways. Some exemplary ways may include: an electronic motor controller integrated with a motor housing so that there are no exposed or flexing wires that carry the motor current to the motor controller; a smart valve's components that are fully integrated with or connected to an actuator body or housing; a smart valve's components that are integrated with our connected to a hydraulic shock absorber body; a smart valve's electronics may be mounted to an actuator; a hydraulic pump and electric motor of a smart valve are disposed on the same shaft; a smart valve that requires no hydraulic hoses; a hydraulic motor that is roughly axially aligned with a piston rod of an actuator; a hydraulic motor that is roughly perpendicular to a piston rod travel direction; as well as a smart valve that is mounted between the top of a strut and a lower control arm of a vehicle wheel assembly to name a few.

According to another aspect, particular applications a smart valve may require particular size, shape, and/or orientation limitations. Exemplary smart valve embodiments for various applications are now described. In one embodiment, a smart valve is incorporated with a suspension and occupies a volume and shape that can fit within a vehicle wheel well and between the actuator top and bottom mounts. In another embodiment, smart valve integrated with a suspension and occupies a volume and shape such that during full range of motion and articulation of an associated actuator in the suspension system, adequate clearance is maintained between the smart valve and all surrounding components. In yet another embodiment, a suspension actuator supports a smart valve co-axially with the actuator body and connects to an actuator top mount. In another embodiment, a suspension actuator supports a smart valve co-axially with the actuator body and occupies a diameter substantially similar to that of an automotive damper top mount and spring perch. An active suspension control of motor-pump may be configured to be less than 8 inches in diameter and 8 inches in depth, and even in some cases, substantially smaller than this footprint.

According to another aspect, a smart valve may be self-contained and may not require externally generated knowledge, sensor input, or other data from a vehicle. A smart valve with an integrated processor-based controller may function independently of other systems. This may include functions such as self-calibration regardless of whether there are other smart valves (e.g. corner controllers) operating on other wheels of the vehicle. A smart valve may deliver a wide range of suspension performance which may include operating as a passive damper, a semi-active suspension/regenerative actuator, a variable suspension, and/or as a fully active suspension and the like. This functionality is facilitated because it is self-contained and all of the required power, logic control, and all hydraulic connections are contained within the actuator assembly. A self-contained smart valve may be combined with a wide range of advanced vehicle capabilities to deliver potentially more value and/or improved performance. Combining a smart valve with predictive control, GPS enabled road condition information, radar, look-ahead sensors, and the like may be readily accomplished through use of a vehicle communication bus, such as a CAN bus. Algorithms in the smart valve may incorporate this additional information to adjust suspension operation, performance, and the like. In an example, if a rear wheel smart valve had knowledge of actions being taken by a front wheel smart valve and some knowledge of vehicle speed, the suspension system of the rear wheel could be prepared to respond to a wheel event before the wheel experiences the event.

According to another aspect, a flexible membrane, or compliant electrical connections combined with other pressure sealed barriers, may be used to mechanically decouple motion of the membrane or barrier from a controller located within a hydraulically pressurized housing. The hydraulically pressurized housing may include a separate pressurized fluid filled portion and an air filled portion. Decoupling the movement from the controller may help to prevent the braking of solder joints between the motor connections passing through the membrane or pressure sealed barrier connected to the controller's printed circuit board. According to another aspect, co-locating a controller electronics within a hydraulically pressurized housing, also eliminates the need for complex mechanical feed-throughs and provides a more predictable thermal environment.

According to another aspect hydraulic pressure ripple from a hydraulic motor-pump is reduced by using a rotary position sensor to supply signals for a hydraulic ripple cancellation algorithm, and/or using a port timed accumulator buffer.

The above-described hydraulic actuation system may be used in any number of applications. For example, a hydraulic system may be constructed and arranged to be coupled to an excavator arm, the control surfaces of an aircraft (e.g. flaps, ailerons, elevators, rudders, etc.), forklifts, lift booms, and active suspension systems to name a few. Therefore, while a specific embodiment of a control system directed to an active suspension system as described in more detail below, it should be understood that the noted control methods and systems described below may be integrated into any appropriate system and should not be limited to only an active suspension system.

Figure 2:
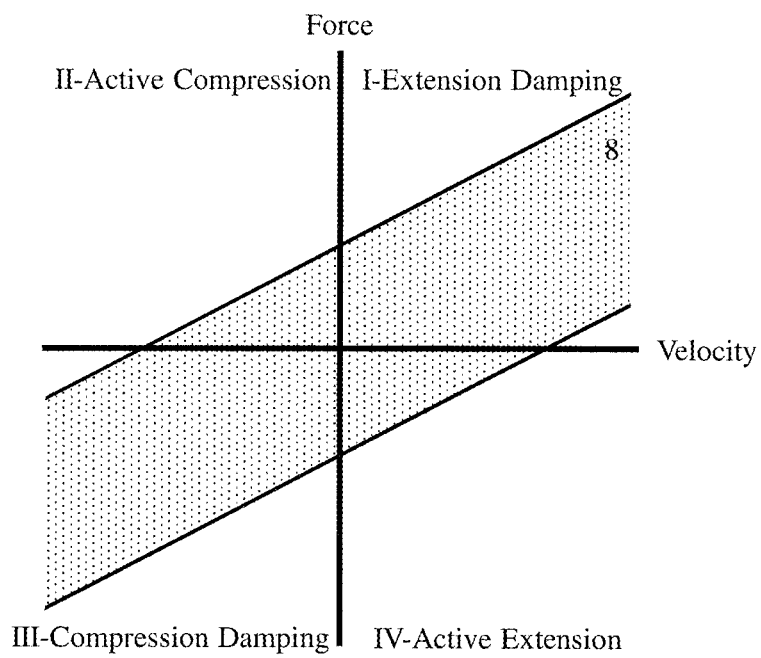
FIG. 2 is an exemplary graph of an active suspension using four-quadrant control.

FIGS. 1 and 2 present plots of various ways to control a hydraulic actuator integrated into a suspension system within a force velocity domain. As illustrated in the figure, the force velocity domain includes a first quadrant I corresponding to extension damping where a force is applied by the hydraulic actuator to counteract extension of hydraulic actuator. Similarly, quadrant III corresponds to compression damping where a force is applied by the hydraulic actuator to counteract compression of the hydraulic actuator a compressive force. In contrast, quadrants II and IV correspond to active compression and active extension of the hydraulic actuator where it is driven to a desired position.

FIG. 1 is a representative plot of the command authority 2 of an actuator integrated into a typical semi-active suspension. As illustrated in the figure, the command authority 2 of the semi-active suspension is located within quadrants I and III corresponding to extension and compression damping. Therefore, such a system only applies forces to counteract movement (i.e. reactive forces). Typically, performance of a semi-active suspension may be varied between damping characteristic curves corresponding to full soft 4 and full stiffness 6 through opening and closing of a simple electronically controlled valve to regulate fluid flow through the system. Systems incorporating electrically controlled valves typically consume energy in order to operate and energy associated with damping of the hydraulic actuator is dissipated as heat. In addition, the operating range of a semi-active system is limited due to leakage at high forces and would be subject to fluid losses and frictional effects at lower forces.

A hydraulic actuator as described herein might be operated to emulate the performance of a semi-active system as shown in FIG. 1. However, such a system would regenerate energy instead of consuming energy. For example, if the terminals of an electric motor operatively coupled to a hydraulic motor-pump were left in an open circuit state (e.g. a relatively high impedance state), a damping curve similar to the full soft 4 curve may be achieved. If instead the terminals of the electric motor were connected to a low impedance, a damping curve similar to the full stiff 6 curve may be achieved. For damping curves between these bounds, a hydraulic actuator such as those described herein may generate energy from wheel movement. Description of the high and low impedance states is a functional description; in some embodiments this may be achieved with a switching power converter such as an H-bridge motor controller, where the switches are controlled to achieve the desired torque characteristic. However, it should be understood that any appropriate mechanism capable of controlling the applied impedance or other appropriate motor input might be used. In either case, the output torque even in a semi-active mode may be controlled in direct response to a wheel event to create force only when necessary and without the need to continuously provide energy to the system from a continuously operating pump.

While it may be possible to emulate the performance of a semi-active suspension system, in some embodiments it is desirable to operate a hydraulic actuator in a full active mode. In such an embodiment, a controller associated with an electric motor controls an input of the electric motor in order to provide controlled forces using the hydraulic actuator in at least three quadrants of the force velocity domain as described in more detail below. However, in at least one embodiment, the hydraulic actuator may be operated to create a controlled force in all four quadrants as the disclosure is not so limited.

FIG. 2 is a representative plot of the command authority 8 of a hydraulic actuator incorporated into a full active suspension system. In the first quadrant I, the system is able to provide extension damping which might correspond to a reactive force to rebound of a vehicle wheel. In the third quadrant III the system is able to provide compression damping which might correspond to a reactive force to compression of a vehicle wheel. As previously described, a hydraulic system may be adapted to generate energy in at least part of quadrants I and III though embodiments in which this energy is dissipated are also possible. However, unlike the semi-active systems described above, the system is also able to create a force in at least one of the two remaining quadrants corresponding to active compression II which might correspond to applying a force to pull a vehicle wheel up and/or active extension IV which may correspond to applying a force to push a wheel down. In these quadrants, the system may consume energy to apply the desired force. This energy may come from any appropriate source including, for example: electrical energy from a vehicle or energy storage device such as a capacitor or battery; hydraulic energy storage from devices such as an accumulator or similar device; and/or mechanical means of energy storage such as a flywheel.

In light of the above description, in some embodiments a full active system operated in at least three of the four quadrants of a force velocity domain provides bidirectional energy flow. More specifically, in quadrants I and III energy is regenerated by the electric motor being driven during compression damping and extension damping, and in quadrants II and IV energy is applied to and consumed by the electric motor to actively extend or compress the hydraulic actuator. Such a hydraulic actuation system may be particularly beneficial as compared to previous hydraulic actuation systems integrated with a suspension system because it does not require the use of separate actively controlled valves to control the flow of fluid to and from various portions of the hydraulic actuator body.

While embodiments of a hydraulic actuator as described herein are capable of operating in all four quadrants of the force velocity domain, as noted above, the energy delivered to the hydraulic actuator is controlled by the force, speed and direction of operation of the electric motor and hydraulic motor-pump. More specifically, the electric motor and the hydraulic motor-pump as well, as well as other associated components, continuously reverse operation directions, accelerate from one operation speed to another, and go from a stop to a desired operation speed throughout operation of the hydraulic actuator. Consequently, a response time of the hydraulic actuator will include delays associated with the ability of these various components to quickly transition between one operation state and the next. This is in comparison to systems that simply open and close valves associated with a hydraulic line including a constant flow of fluid and/or pressure to control an associated hydraulic actuator. Therefore, in some embodiments, it is desirable to design a system to provide a desired response time in order to achieve a desired system performance while taking into account response delays associated with other devices as well. While several types of events are noted above, it should be understood that other types of behavior associated with operation of the electric motor and the hydraulic motor-pump are also possible.

While a fast response time is desirable in any number of applications, as described in more detail below, in one embodiment a system including an associated hydraulic actuator, electric motor, and hydraulic motor-pump is designed with a sufficiently fast response time in order to function in an active suspension system. In such an embodiment, the response time may be selected such that the active suspension system is capable of responding to individual events. While these events may correspond to any appropriate control input, in some embodiments, these events are individual body events and/or wheel events. In one such embodiment, a sensor is configured and arranged to sense wheel events and/or body events of a vehicle. The sensor is electrically coupled to the controller of a hydraulic actuator integrated into a suspension system. Upon sensing a wheel event and/or a body event, the controller applies a motor input to the electric motor which is coupled to the hydraulic motor-pump. This in turn directly controls the flow of fluid within the hydraulic actuator as the hydraulic motor-pump applies a force to the hydraulic actuator. Therefore, the hydraulic actuator is able to be controlled in response to the individual sensed wheel events and/or body events that result in either wheel or body movement. As described in more detail below, individual body events and/or wheel events typically occur at frequencies greater than 0.5 Hz, 2 Hz, 8 Hz, or any other appropriate frequency. Individual body events and/or wheel events also typically occur at frequencies less than about 20 Hz. Therefore, in one embodiment, a hydraulic actuation system integrated into a suspension system is engineered to respond to individual body events and/or wheel events occurring at frequencies between about 0.5 Hz to 20 Hz inclusively.

In view of the rate at which individual body events and/or wheel events occur, in some embodiments, it is desirable that a response time of the hydraulic system be at least equivalent in time to these events. In some embodiments, it may be desirable that the response time is faster than the rate at which individual events occur due to other delays present in the system which may be taken into account when responding to individual events. In view of the above, in some embodiments, a response time of the hydraulic system may be less than about 150 ms, 100 ms, 50 ms, or any other appropriate time period. The response times may also be greater than about 1 ms, 10 ms, 20 ms, 50 ms, or any other appropriate time period. For example, a response time of the hydraulic system may be between about 1 ms and 150 ms, 10 ms and 150 ms, 10 ms and 100 ms, or 10 ms and 50 ms. It should be understood that response times greater than or less than those noted above are also possible. Additionally, it should be understood that hydraulic actuators exhibiting fast response times such as those noted above may be used in applications other than a suspension system as the disclosure is not limited to any particular application.

As described in more detail in the examples, and without wishing to be bound by theory, the response time of a hydraulic actuation system is proportional to the natural frequency of the hydraulic actuation system. Therefore, in order to provide the desired response times, a natural frequency of the hydraulic actuation system may be greater than about 2 Hz, 5 Hz, 10 Hz, 20 Hz, or any other appropriate frequency. Additionally, the natural frequency may be less than about 100 Hz, 50 Hz, or 40 Hz. For example, in one embodiment, the natural frequency of the hydraulic actuation system is between about 2 Hz and 100 Hz inclusively.

Without wishing to be bound by theory, design considerations that impact the natural frequency of a hydraulic actuation system include the reflected inertia as well as the compliance of the hydraulic actuation system. As noted in the examples, the natural frequency of the hydraulic actuation system may be defined using the formula:

$$2\pi f = \sqrt{\frac{K}{Jn^2}}$$

where f is the natural frequency of the hydraulic actuation system, 1/K is the total compliance of the hydraulic actuation system, is the total hydraulic actuation system inertia, and n is the motion ratio of the hydraulic actuation system. The quantity $Jn^2$ is the hydraulic actuation system reflected inertia.

A hydraulic actuation system's reflected inertia $Jn^2$ includes the rotary moment of inertia J of all the components rotating in lockstep with the motion of the actuator, multiplied by the square of the motion ratio n translating rotation of the electric motor into linear motion of the actuator. For example, the reflected inertia can include the moment of inertia of: the rotor; the coupling shaft between the electric motor and hydraulic motor-pump; any bearings coupled with the rotor, shaft, and/or pump; the hydraulic motor-pump; as well as other appropriate components. In one embodiment, the motion ratio n in a hydraulic actuation system as described herein is characterized by the annular area of the piston around the piston rod in the hydraulic piston, divided by the displacement volume of the hydraulic motor-pump per revolution. However, other ways of defining the motion ratio n as would be known in the art are also contemplated. In a system where linear motion is prevalent, or where the transmission components moving linearly in response to actuation of the hydraulic motor-pump have significant mass, the total reflected inertia may also include the mass of the linearly moving components.

The total quantity $Jn^2$ can also be composed of multiple components moving in lockstep with the motion of the piston, each with their own rotating moment of inertia and their own transmission ratio n. For example, a bearing system constraining the in-plane motion of the motor shaft has components that rotate at a different angular velocities from that of the motor shaft. Depending on their total contribution to the reflected system inertia, it may be desirable to include these contributions in the reflected system inertia used for the design of the system using their respective moments of inertia and transmission ratios. For example, and without wishing to be bound by theory, if the bearing system is a roller type bearing, then the rollers will move in lockstep with the shaft but at an angular velocity that is close to half that of the shaft itself. At the same time, the individual rollers move at a much faster angular velocity, while still in lockstep with the shaft. Thus each of these components may be accounted for using their own moments of inertia and their own motion ratios.

In a system where linear motion is prevalent, and where the transmission between actuation force and motor force uses a linear lever, the linear mass of the moving components in the motor may also be accounted for through their linear motion ratio n translating motion at the actuator end to motion at the motor end of the lever. In this sense, the expression $Jn^2$ is intended more generally as the sum of all the rotating moments of inertia and all the moving masses, each multiplied by the square of the motion ratio translating the linear or rotary motion at the actuator into linear or rotary motion of the particular moving element.

The hydraulic actuation system compliance $1/K$ is the compliance of all the elements that are in series with the electric motor and located between the electric motor and a force output point of the hydraulic actuator (e.g. the moving shafts of the actuator). Various contributions to the hydraulic actuation system compliance can include: a total compressibility of a fluid column between the hydraulic motor-pump and a piston of the hydraulic actuator; a flexibility of the hoses, tubes, or structures connecting the hydraulic motor-pump to the hydraulic actuator; a flexibility of the mounting surfaces of the hydraulic actuator to a force application point; and other appropriate considerations which may contribute to the total compliance of the hydraulic actuation system. It should be noted that an inverse of the hydraulic actuation system compliance is the hydraulic actuation system stiffness K.

In view of the above, in order to provide the desired natural frequencies, and thus response times, a hydraulic actuation system may be designed using the interplay between the compliance and reflected inertia. More specifically, a product of the reflected inertia and the compliance of the hydraulic actuation system $Jn^2/K$, which may also be viewed as a ratio of the reflected inertia to the stiffness of hydraulic actuation system, may be designed according to the following design ranges. In some embodiments, the product of the reflected inertia and the compliance of the hydraulic actuation system may be less than $6.3 \times 10^{-3}$ s$^2$, $1.0 \times 10^{-3}$ s$^2$, $2.5 \times 10^{-4}$ s$^2$, $6.3 \times 10^{-5}$ s$^2$, $2.8 \times 10^{-5}$ s$^2$, $1.6 \times 10^{-5}$ s$^2$, or any other appropriate value. Additionally, the product of the reflected inertia and the compliance of the hydraulic actuation system may be greater than $1.6 \times 10^{-5}$ s$^2$, $1.0 \times 10^{-5}$ s$^2$, $2.5 \times 10^{-6}$ s$^2$, or any other appropriate value. For example, in one embodiment, the product of the reflected inertia and the compliance of the hydraulic actuation system is between about $2.5 \times 10^{-6}$ s$^2$ and $6.3 \times 10^{-3}$ s$^2$ inclusively. However, it should be understood that hydraulic actuation systems designed with values both greater than and less than those noted above are also contemplated. Using the above design criteria, a designer may use the inertia of the various components in the system as well as translation ratio and compliance of the system to provide a desired response time. While any of the parameters may be varied to obtain a desired response, it is worth noting that the design parameter has a linear dependence on the inertia of the components and the compliance of the hydraulic actuation system and a dependence on the square of the translation factor. Consequently, changes in the translation factor may provide correspondingly larger changes in the overall response of the system. An example of the interplay of these parameters in designing a hydraulic actuation system are provided in more detail in the examples.

In addition to providing an appropriate response time of a hydraulic actuation system, in some embodiments, it is desirable to control the hydraulic actuation system at frequency that is similar to or greater than the frequency of a control event such as a body and/or wheel event. FIG. 3 shows a frequency plot relating motor torque updates 14 with body control and wheel control frequency bands associated with the typical frequencies of body movement 10 and wheel movement 12 of a vehicle. For a typical passenger vehicle, body movements 10 occur between 0 Hz and 4 Hz is, although higher-frequency body movement may occur well beyond this band. Wheel movement often occurs between 8 Hz and 20 Hz, and is roughly centered around 10 Hertz. However, it should be understood that the body and wheel movement frequencies will differ from vehicle to vehicle and based on road conditions. A wheel event and/or body event may be defined as any input into the wheel or body that causes a wheel and/or body movement (including the result of a steering input). From a frequency perspective, wheel events and body events often occur at roughly 0.5 Hertz and above, see 16, and may even occur at frequencies in excess of one thousand Hertz. Consequently, the motor input update frequency may vary from frequencies as low as 0.5 Hz up to, and even possibly greater than, 1,000 Hz, see 14. From a functional perspective, any change in a commanded motor input, such as motor torque, in response to a wheel event and/or a body event (as measured by one or more sensors) may be considered a response to a wheel event and/or body event.

In view of the above, in some embodiments, it is desirable that the hydraulic actuator be controlled at a frequency that is similar to or greater than the frequency at which the individual body events and/or wheel events occur. Therefore, in at least one embodiment, a controller is electrically coupled to an electric motor used to operate the hydraulic actuator, and the controller updates a motor input of the electric motor at a rate that is faster than individual body events and/or wheel events. The motor input may be updated with a frequency that is greater than about 0.5 Hz, 2 Hz, 8 Hz, 20 Hz, or any appropriate frequency that the controller and associated electric motor are capable of being operated at. In some embodiments, the motor input may be updated with a frequency that is less than about 1 kHz, though other frequencies are also possible. Therefore, in one exemplary embodiment, a motor input is controlled with a frequency between about 0.5 Hz and 1 kHz inclusively.

In one exemplary embodiment, a control system commands a motor input, such as motor torque, to be updated at 10 Hz, though other frequencies are possible. At each update, the commanded motor input is set to be the current vertical body velocity (body acceleration put through a software integrator) multiplied by a scaling factor k such that the actuator creates a force opposite to the body velocity. Such an embodiment may improve the body control of a vehicle. In another embodiment regarding wheel control, the commanded motor input, such as motor torque, is set to be the current actuator velocity (differential movement between the wheel and body) and multiplied by a factor k in order to counteract movement. Here, the system responds much like a damper. It should be understood that the above embodiments might be used together to provide both body control and wheel control in order to provide full vehicle control. In other embodiments the commanded motor input is updated at slower rates such as 0.5 Hz or faster rates such as 1 kHz. More complex control systems may also utilize other sensor data in addition to, or instead of, body acceleration as noted previously, and may include proportional, integral, derivative, and more complex feedback control schemes as the disclosure is not so limited.

FIG. 4 depicts an embodiment of a hydraulic actuator 100 capable of being operated in all four-quadrants of the force velocity domain as a fully active actuator. A piston including a piston rod 104 and piston head 106 is disposed in a fluid-filled housing 102. Upon movement of the piston, a piston head 106 forces fluid into and out of an extension volume 110 located on one side of the piston head and a compression volume 108 located on the opposing side of the piston head through one or more concentric fluid flow tubes 122 or other appropriate connection. The fluid flow tubes 122, or other appropriate connection or port arrangement, are connected to a hydraulic motor-pump 114. Therefore, the hydraulic motor-pump 114 is in fluid communication with the compression volume 108 and the extension volume 110 of the hydraulic actuator as indicated by the arrows in the figure. The hydraulic motor-pump 114 is operatively coupled to an electric motor 116 via an appropriate coupling 118.

Depending on the particular embodiment, the electric motor 116 and/or the hydraulic motor-pump 114 may either be disposed on, integrated with, or remotely located from the hydraulic actuator 100 as the disclosure is not so limited. Alternatively, as described elsewhere the hydraulic motor-pump 114, electric motor 116, and the coupling 118 may be integrated into a single smart valve capable of controlling the flow of fluid between the extension volume in the compression volume of hydraulic actuator without the need for separately operated valves. However, embodiments including separate valves are contemplated. For example, the fluid connections between the ports or outlets of the hydraulic motor-pump and the extension volume and compression volume of the hydraulic actuator may either be direct connections without any valves, or one or more valves may be located between the flow paths from the hydraulic motor-pump to the actuator as the disclosure is not so limited. Additionally, as described in more detail below, one or more valves may also be located between the extension volume and the compression volume of the hydraulic actuator.

It should be understood that any hydraulic motor-pump, electric motor, and coupling might be used. For example, the hydraulic motor-pump may be any device capable of functioning as a hydraulic pump or a hydraulic motor including, for example, a gerotor, vane pump, internal or external gear pump, geroler, high torque/low speed gerotor motor, turbine pump, centrifugal pump, axial piston pump, or bent axis pump. In embodiments where the hydraulic motor-pump is a gerotor, the assembly may be configured so that the root and/or tip clearance can be easily adjusted so as to reduce backlash and/or leakage between the inner and outer gerotor elements. However, embodiments in which a gerotor does not include an adjustable root and/or tip clearance are also contemplated.

In addition to the above, the electric motor 116 may be any appropriate device including a brushless DC motor such as a three-phase permanent magnet synchronous motor, a brushed DC motor, an induction motor, a dynamo, or any other type of device capable of converting electricity into rotary motion and/or vice-versa. However, in some embodiments the electric motor may be replaced by an engine-driven hydraulic motor-pump. In such an embodiment, it may be desirable to provide an electronically controlled clutch or a pressure bypass in order to reduce engine load while high active actuator forces are not needed. Similar to rapidly controlling the motor inputs of the electric motor (e.g. rapid torque changes of the electric motor), the hydraulic motor drive (either through an electronic clutch, an electronically-controlled hydraulic bypass valve, or otherwise), may be rapidly controlled on a per wheel event basis in order to modulate energy usage in the system.

In addition to the various types of hydraulic motor-pumps and electric motors, the coupling 118 between the electric motor and the hydraulic-pump motor may be any appropriate coupling. For example, a simple shaft might be used, or it may include one or more devices such as a clutch (velocity, electronically, directionally, or otherwise controlled) to alter the kinematic transfer characteristic of the system, a shock-absorbing device such as a spring pin, a cushioning/damping device, a combination of the above, or any other appropriate arrangement capable of coupling the electric motor to the hydraulic motor-pump. In some embodiments, in order to decrease response times, it may be desirable to provide a relatively stiff coupling 118 between the electric motor and the hydraulic motor-pump. In one such embodiment, a short close-coupled shaft is used to connect the electric motor to the hydraulic motor-pump. Depending on the particular embodiment, the coupling of the hydraulic motor-pump to the shaft may also incorporate spring pins and/or drive key features so as to reduce backlash between them.

When energy is applied to the terminals of the electric motor 116, the coupling 118 transfers the output motion to the hydraulic motor-pump 114. In some embodiments, the hydraulic motor-pump 114 and the electric motor 116 may also be back driven. Therefore, rotation of the hydraulic motor-pump due to an applied pressure from an associated hydraulic actuator may be transferred via the coupling 118 to rotate an output shaft of the electric motor 116. In such an embodiment, the electric motor may be used as a generator in which case the rotation of the electric motor by the hydraulic motor-pump may be used to regenerate energy. In such an embodiment, the effective impedance of the electric motor may be controlled using any appropriate method including, for example, pulse width modulation amongst several different loads, in order to control the amount of energy recovered and the damping force provided.

In view of the above, operation of the electric motor 116 and/or the hydraulic motor-pump 114 results in movement of fluid between the extension volume and the compression volume through the hydraulic motor-pump which results in movement of the piston rod 104 during different modes of operation. More specifically, in a first mode, rotation of the hydraulic motor-pump 114 in a first direction forces fluid from the extension volume 110 to the compression volume 108 through the one or more fluid flow tubes 122 and hydraulic motor-pump 114. This flow of fluid increases a pressure of the compression volume applied to a first side of the piston head 106 and lowers a pressure of the extension volume applied to a second side of the piston head 106. This pressure differential applies a force on the piston rod 104 to extend the actuator. In a second mode, rotation of the hydraulic motor 114 in a second direction such that fluid is moved from the compression volume 108 to the extension volume 110. Similar to the above, this flow of fluid increases a pressure of the extension volume 110 applied to the second side of the piston head 106 and lowers a pressure of the compression volume 108 applied to the first side of piston head 106. This pressure differential applies a force to the piston rod 104 to compress, or retract, the actuator. In yet another mode of operation, the hydraulic motor 114 opposes the movement of fluid between the compression volume 108 and the extension volume 110 such that it provides a damping force to the piston rod 104.

In view of the above, when a force generated by the pressure provided by the hydraulic motor-pump (caused by torque from the electric motor acting on the hydraulic motor-pump), is sufficient to overcome the force applied to the piston rod 104, the hydraulic actuator is actively driven. In contrast, when a force generated by pressure provided by the hydraulic motor-pump is less than a force acting on the piston rod 104, the hydraulic actuator is back driven and may be subjected to a damping force. Therefore, in some embodiments, the hydraulic motor-pump is a positive displacement hydraulic motor constructed and arranged to be back driven. While an embodiment including a hydraulic motor-pump and electric motor that may be back driven is described above, embodiments in which the hydraulic actuation system is not back drivable are also contemplated. In addition, in some embodiments secondary passive or electronic valving is included in the hydraulic actuation system which may in certain modes decouple piston movement from electric motor movement (i.e., movement of the piston head might not create an immediate and correlated movement of the electric motor).

Since fluid volume in the fluid-filled housing 102 changes as the piston 104 enters and exits the housing, the embodiment of FIG. 3 includes an accumulator 112 to accept the piston rod volume. In one embodiment, the accumulator 112 is a nitrogen-filled chamber with a floating piston able to move in the housing and sealed from the hydraulic fluid. While an internal accumulator has been depicted, any appropriate structure, device, or compressible medium capable of accommodating a change in the fluid volume present within the housing 102, including an externally located accumulator, might be used as the disclosure is not so limited.

The embodiment depicted in FIG. 4 may be adapted in order to accommodate a number of different fluid flow paths and should not be limited to any particular arrangement or method of providing fluid flow between various portions of the housing and the hydraulic motor-pump. For example, in one embodiment, the fluid flow tubes 122 may be pipes or hydraulic hoses. In another embodiment, the fluid flow tubes 122 may be the concentric area between the inner and outer tubes of a twin-tube damper or the concentric area between each of the three tubes of a triple-tube damper. In the above embodiments, fluid may flow in both directions through the hydraulic motor-pump. In embodiments where a monotube damper architecture is used, a high gas pre-charge, for example, greater than 35 bar, may be used to increase the hydraulic fluid stiffness and hence reduce lag and latency. In other embodiments a gas pre-charge around 25 bar, or any other appropriate pressure, may be used. The hydraulic actuator may also be beneficially combined with various damper tube technologies including, but not limited to: McPherson strut configurations and damper bodies; de-aeration devices for removing air that may be introduced during filling or otherwise without requiring a dedicated air collection region inside the vibration damper; high pressure seals for a damper piston rod and/or piston head; a low cost low inertia floating piston tube (e.g. monotube); and the like.

FIG. 5 presents one embodiment of a hydraulic actuation system integrated into a suspension system which includes a hydraulic actuator 100, hydraulic motor-pump 114, and electric motor 116 integrated into a suspension system, which may be an active suspension system. The suspension system is connected to a wheel 128 and located within the wheel-well of a vehicle. As depicted in the figure, the actuation system is located where a damper is typically located and is constructed and arranged to be coupled to the suspension system between the lower 130 and upper 132 suspension members. The upper and lower suspension members may be an upper top mount and lower control arm in a suspension system though other configurations are possible. As depicted in the figure, the hydraulic actuator housing 102 is connected to the lower suspension member 130 on one side of the hydraulic actuator and the piston, and the piston rod 104 is connected to the upper suspension member 132 on an opposing side of the hydraulic actuator. However, it should be understood that the hydraulic actuator could be oriented in the opposite direction as well. Additionally, the connections between the hydraulic actuator and the suspension members might correspond to any appropriate connection including for example, a bushing. In some embodiments, a bushing constructed to reduce noise and resonance vibrations associated with actuator movement might be used. Similar to the above, the hydraulic actuator 100 is also operatively connected to a hydraulic motor-pump 114 and electric motor 116. As depicted in the figure, the hydraulic motor-pump and electric motor may be connected to, or integrated with, the hydraulic actuator. In the depicted embodiment, the hydraulic motor-pump 114 and electric motor 116 are located between the suspension members 130 and 132. However, embodiments in which the hydraulic motor-pump 114 and/or electric motor are remotely located from the hydraulic actuator 100 are also contemplated.

As illustrated in the figure, in some embodiments, a spring 124 is disposed coaxially around the piston rod 104 and extends between the upper suspension member 132 and the hydraulic actuator body 102. Therefore, the spring will apply a force to the upper suspension member 132 that is dependent on the amount of compression. In such a configuration, the spring 124 is located in parallel to the hydraulic actuator. However, embodiments in which the spring is located in series with the hydraulic actuator are also contemplated. For example, a spring might be located between the piston rod 104 and the upper suspension member 132 or between the hydraulic actuator housing 102 and the lower suspension member 130. When the spring is located in series with the hydraulic actuator, a separate actuator and/or damper may be located in parallel with the spring and in series with the hydraulic actuator.

Depending on the embodiment, a hydraulic actuator may include one or more passive and/or electronically controlled valves 126 integrated with the hydraulic actuator housing 102, see FIG. 5. Types of valves that might be associated with the hydraulic actuator include, but are not limited to, at least one of progressive valving, multi-stage valving, flexible discs, disc stacks, amplitude dependent damping valves, volume variable chamber valving, proportional solenoid valving placed in series or in parallel with the hydraulic pump, electromagnetically adjustable valves for communicating hydraulic fluid between a piston-local chamber and a compensating chamber, and pressure control with adjustable limit valves. Additionally, a baffle plate for defining a quieting duct for reducing noise related to fluid flow might be used. A diverter valve constructed and arranged to divert a portion of the fluid flow between the compression volume and the extension volume past the hydraulic motor-pump might also be used to limit either a pressure, flow, and/or amount of energy applied to the hydraulic motor-pump. Depending on the embodiment, the hydraulic actuator force may be at least partially controlled by the one or more valves 126. Additionally the one or more valves 126 may be pressure-operated, inertia-operated, acceleration-operated, and/or electronically controlled.

The above-noted active suspension system may also incorporate any number of other associated components and/or alterations. For example, in one embodiment the active suspension system is integrated with at least one of: an inverted actuator, a telescoping actuator, an air spring, a self-pumping ride height adjustable device, and/or other appropriate device. Additionally, the hydraulic actuation system may include various types of thermal management such as: thermal isolation between the actuator body and control/electronics; airstream cooling of electronics; and other appropriate thermal management devices and/or methods. In another embodiment, the hydraulic actuation system includes an appropriate connection for connecting to either a smart valve including a hydraulic motor-pump and electric motor or to separate hydraulic motor-pump and electric motor combination. While any appropriate connection might be used, in one embodiment the connection corresponds to one of direct wiring, flexible cables, and/or one or more modular connectors for connecting to a vehicle wiring harness, externally mounted power switches, and other appropriate power and/or control sources.

Figure 6:
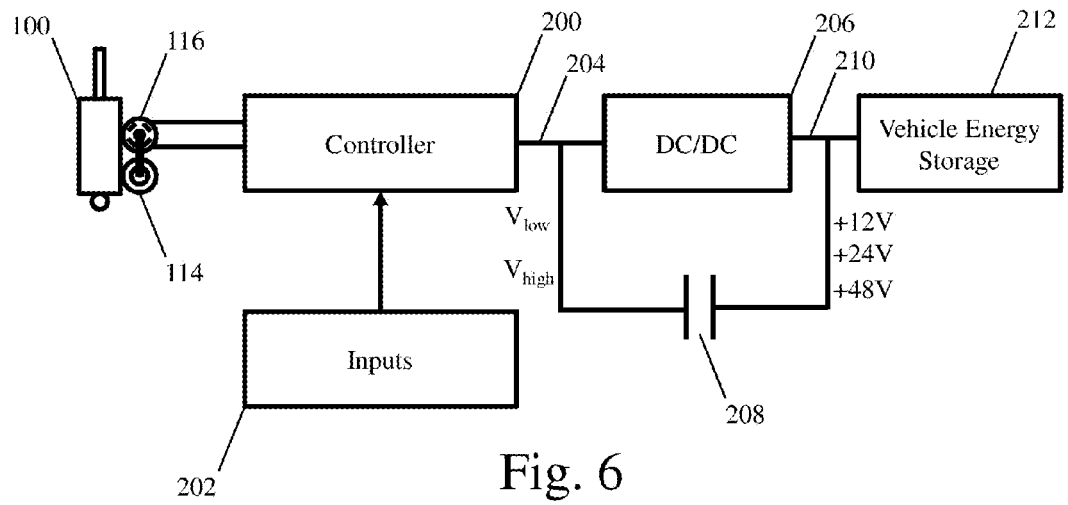
FIG. 6 is an exemplary block diagram of an active suspension system.

As noted above, in some embodiments a hydraulic actuation system is capable of responding on a per wheel and/or body event basis. Therefore, it is desirable that the motor input to an electric motor controlling hydraulic actuation either changes at an update rate greater than or equal to the frequency at which events occur, or that it occurs in direct response to a sensed event. FIG. 6 demonstrates a generic control architecture for controlling such a hydraulic actuation system. Depending on the particular embodiment, the various components may either be provided separately, or one or more of them may be integrated or attached together as the disclosure is not so limited. In the depicted embodiment, the hydraulic actuation system includes an electronic controller 200. In some embodiments, the controller is a corner controller configured to control an active suspension system associated with a single wheel. As depicted in the figure, the controller is electrically coupled to an electric motor 116, which is a three-phase electric motor with an encoder in the current embodiment. One possible electrical topology of such an embodiment includes a three-phase bridge, with six MOSFET transistors where each motor phase is connected to the junction between two MOSFETs in series. In such an embodiment, the high side MOSFET is connected to the voltage rail and the low side MOSFET is connected to ground and the controller rapidly pulse-width-modulates a control signal to the gate of each MOSFET in order to drive the motor for 116. However, other types of electric motors and control methods might also be used including, for example, a sensorless control instead of an encoder.

The controller 200 is configured to receive signals from one or more inputs 202 corresponding to various different information sources in order to determine how to control a motor input of the electric motor 200 and thus the hydraulic actuator. These sensors may provide information related to sensing individual wheel events, body events, and/or other pertinent information. The controller 200 may receive inputs from sensors that are external to the hydraulic actuator or from sensors that are integrated with, or disposed on, the hydraulic actuator. Sensors located external to the hydraulic actuator may either be sensors dedicated to the hydraulic actuator, or they may be sensors integrated with the vehicle body as the disclosure is not so limited. The above noted sensors correspond to one or more of the following sensor architectures: wheel acceleration sensing; body acceleration sensing, fluid pressure sensing; position sensing; smart valve local sensing; motor position sensing; multi-sensor whole vehicle sensing; centralized inertial measurement unit sensor architecture; the vehicle CAN bus, one or more sensors associated with a wheel (e.g. accelerometers), and one or more sensors associated with an axle (e.g. accelerometers). In another embodiment, the input received by the controller 200 is a signal from a central controller associated with one or more other controllers and hydraulic actuators and may provide information related to other body events, wheel events, or other relevant information sensed by the other controllers, or input to the central controller.

In one particular embodiment, the inputs received by the controller 200 include information from a rotor position sensor that senses the position and/or velocity of the electric motor. This sensor may be operatively coupled to the electric motor directly or indirectly. For example, motor position may be sensed without contact using a magnetic or optical encoder. In another embodiment, rotor position may be measured by measuring the hydraulic pump position, which may be relatively fixed with respect to the electric motor position. This rotor position or velocity information may be used by a controller connected to the electric motor. The position information may be used for a variety of purposes such as: motor commutation (e.g. in a brushless DC motor); actuator velocity estimation (which may be a function of rotor velocity for systems with a substantially positive displacement pump); electronic cancellation of pressure fluctuations and ripples; and actuator position estimation (by integrating velocity, and potentially coupling the sensor with an absolute position indicator such as a magnetic switch somewhere in the actuator stroke travel such that activation of the switch implies the actuator position is in a specific location). Without wishing to be bound by theory, by coupling an active suspension containing an electric motor and/or hydraulic pump with a rotary position sensor coupled to it, the system may be more accurately and efficiently controlled.

Other possible embodiments of inputs 202 include information such as global positioning system (GPS) data, self-driving parameters, vehicle mode setting (i.e. comfort/sport/eco), driver behavior (e.g. how aggressive is the throttle and steering input), body sensors (accelerometers, inertial measurement units, gyroscopes from other devices on the vehicle), safety system status (e.g. ABS braking engaged, electronic stability program status, torque vectoring, airbag deployment), and other appropriate inputs. For example, in one embodiment, a suspension system may interface with GPS on board the vehicle and the vehicle may include (either locally or via a network connection) a map correlating GPS location with road conditions. In this embodiment, the active suspension may control hydraulic actuation system within the suspension to react in an anticipatory fashion to adjust the suspension in response to the location of the vehicle. For example, if the location of a speed bump is known, the actuators can start to lift the wheels immediately before impact. Similarly, topographical features such as hills can be better recognized and the system can respond accordingly. Since civilian GPS is limited in its resolution and accuracy, GPS data can be combined with other vehicle sensors such as an inertial measurement unit (or accelerometers) using a filter such as a Kalman Filter in order to provide a more accurate position estimate and/or any other appropriate device.

By integrating an active suspension with other sensors and systems on the vehicle, the ride dynamics may be improved by utilizing predictive and reactive sensor data from a number of sources (including redundant sources, which may be combined and used to provide greater accuracy to the overall system). In addition, the active suspension may send commands to other systems such as safety systems in order to improve their performance. Several data networks exist to communicate this data between subsystems such as CAN (controller area network) and FlexRay.

While several types of sensors and control arrangements are noted above, it should be understood that other appropriate types of inputs, sensors, and control schemes are also contemplated as the disclosure is not so limited. The inputs 202 indicated in FIG. 6 may also include information derived from the electric motor including, for example, calculating actuator velocity by measuring electric motor velocity as well as calculating actuator force by measuring electric motor current to name a few. In other embodiments, the inputs 202 include information from look-ahead sensors, such as controllers associated with actuators on the rear axle of a vehicle receiving information from the front wheels to adjust control of the hydraulic actuator before an event occurs.

In the system-level embodiment of FIG. 6, energy flows into and out of the controller on the suspension electrical bus 204. The suspension electrical bus 204 may be direct current, though embodiments using alternating current are also contemplated. While not shown in FIG. 6, in one embodiment multiple actuators 100 and controllers 200 share a common suspension electrical bus 204. In this way, if one actuator and/or controller pair is regenerating energy, another pair can be consuming this regenerated energy. In some embodiments the voltage of the suspension electrical bus 204 is held at a voltage $V_{high}$ higher than that of the vehicle's electrical system, such as 48 volts, 380 volts, or any other appropriate voltage. Without wishing to be bound by theory, such an embodiment may enable the use of smaller wires with lower currents providing a potential cost, weight, and integration advantage. In other embodiments this voltage is substantially similar to the vehicle's electrical system voltage (12, 24 or 48 volts), which may eliminate or reduce the need for a DC-DC converter 206. However, in some embodiments it may be desirable to use a voltage $V_{low}$ lower than the vehicle's electrical system to reduce the need for a super capacitor, In the embodiment of FIG. 6, the suspension electrical bus 204 interfaces with the vehicle's electrical system 210 and the vehicle's energy storage 212, for example, the main battery, or other appropriate energy storage, through a bidirectional DC-DC converter 206. Appropriate bidirectional converters include both galvanically isolated and non-galvanically isolated converters. However, other devices capable of converting the electrical signal between the suspension electrical bus 204 and the vehicle's electrical system 210 might be used. A few possible topologies include a synchronous buck converter (where the freewheeling diode is replaced with a transistor), a transformer with fast-switching DC/AC converters on each side, and resonant converters, and other appropriate devices.

Modern vehicles are typically limited in their capacity to accept regenerative electrical energy from onboard devices, and to deliver large amounts of energy to onboard devices. Without wishing to be bound by theory, in the former, regenerated energy may cause a vehicle's electrical system voltage to rise higher than allowable, and in the latter, large power draws may cause a voltage brownout, or undervoltage condition for the vehicle. In order to deliver sufficient power to an active suspension, or to capture a maximal amount of regenerated energy, a form of energy storage associated with the suspension system itself may be used. Energy storage may be in the form of batteries such as lithium ion batteries with a charge controller, ultra-capacitors, or other forms of electrical energy storage. In the embodiment of FIG. 6, the negative terminal of one or more ultra-capacitors 208 are connected to a positive terminal of a vehicle electrical system 212, and the positive terminal is connected to the suspension electrical bus 204 running at a voltage higher than the vehicle electrical system voltage. In such an embodiment, the ultra-capacitor, or other appropriate storage device located on the part bus, may be sized to accommodate regenerative and/or expected consumption spikes, in order to effectively control wheel movement and regenerate energy during damping (bidirectional energy flow) and limit the impact of such a suspension system on the overall vehicle electrical system. However, as noted above, other embodiments are also possible including, for example, the energy storage may be placed directly on the suspension electrical bus or the vehicle electrical system.

Due to the ability to store regenerated energy locally on the super capacitor 208 or other appropriate device, as well as the vehicle energy storage device 212, the above described embodiments may be either self-powered or at least partially self-powered by the regenerated energy. Several advantages may be achieved by combining an active suspension with a self-powered architecture. An active suspension may be failure tolerant of a power bus failure, wherein the system can still provide damping, even controlled damping with a bus failure. Another advantage is the potential for a retrofittable semi-active or fully active suspension that may be installed OEM or aftermarket on vehicles and not require any wires or power connections. Such a system may communicate with each actuator device wirelessly or through hard connections such as the vehicle CAN. Energy to power the system may be obtained through recuperating dissipated energy from damping. This has the advantage of being easy to install and lower cost. Another advantage is that such a system may function as an energy efficient active suspension. More specifically, by utilizing the regenerated energy in the active suspension, DC/DC converter losses can be minimized such that recuperated energy is not delivered back to the vehicle, but rather, stored and then used directly in the suspension at a later time. Though as noted above, embodiments in which energy is delivered back to the vehicle are also contemplated.

While in some embodiments a hydraulic actuation system incorporated into a suspension system may be a net consumer or producer of energy, in other embodiments, it may be desirable to provide a hydraulic actuation system that is substantially energy neutral during use to provide an energy efficient suspension system. In such an embodiment, a controller associated with a hydraulic actuation system controls the motor inputs associated with the electric motor in response to road conditions, wheel events, and/or body events such that the energy harvested during regenerative cycles (e.g. during damping) and the energy concerned during active cycles of the suspension system (on-demand energy delivery) are substantially equal over a desired time period. As noted previously, the regenerated energy intended for subsequent usage may be stored in any appropriate manner including local energy storage associated with individual hydraulic actuators, or energy might be stored at the vehicle level. Appropriate types of energy storage include, but are not limited to, super capacitors, batteries, flywheels, hydraulic accumulators, or any other appropriate mechanism capable of storing the recaptured kinetic energy and subsequently providing it for use by the system for reconversion into kinetic energy in a desired amount and at a desired time.

Referring to the embodiment of FIG. 6, in some embodiments using a neutral energy control, the controller 200 may control the energy flow such that energy captured via regeneration from small amplitude and/or low frequency wheel and/or body events is stored in the super capacitor 208. Once the super capacitor is fully charged, additional regenerated energy is either transferred to the vehicle electrical bus 210 to either charge the vehicle energy storage device 212, be consumed by loads connected to the vehicle electrical bus 210, and/or dissipated as heat on a dissipative resistor. When the suspension control system requires energy, such as to resist movement of a wheel or to encourage movement of a wheel in response to a sensed event, energy is drawn from the super capacitor 208 and/or from the vehicle electrical bus 210 via the bidirectional power converter 206. Energy that is consumed to manage various sensed events is replaced during subsequent regenerative events as described above. When the relative amounts of regeneration and active actuation are appropriately controlled, the controller provides a substantially energy neutral suspension control over a desired time period. In other embodiments, the controller controls the relative amounts of regeneration over a desired time period to provide an average power with a magnitude that is less than or equal to 75 watts, 50 watts, or any other desired average power. This average power may either be positive corresponding to energy consumption, and/or negative corresponding to energy regeneration. Such a control system is not limited to a fully active system including regenerative and practice control. Instead, limiting an average power of the system may also be applied to purely active systems and purely regenerative systems such as might be seen in a hydraulic actuation system and/or a semi-active suspension system.

Figure 7:
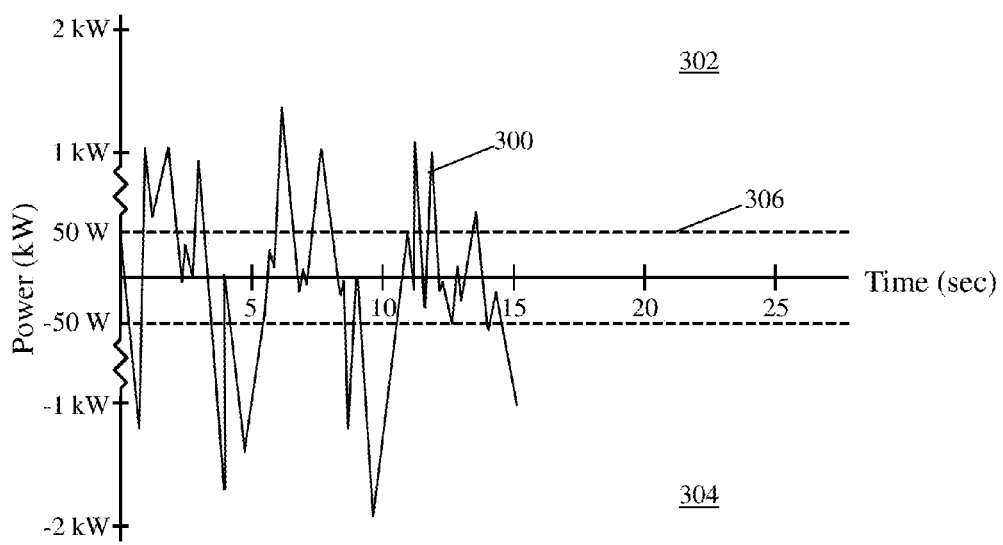
FIG. 7 is an exemplary graph of an energy flow of an active suspension system.

FIG. 7 illustrates an exemplary implementation of energy neutral control of a suspension system. The figure shows power flow 300 over time. Positive y-axis values 302 correspond to regenerated energy during damping and negative y-axis values 304 correspond to energy consumed during active actuation. In the depicted embodiment, a controller regulates the force of a full active suspension and the resulting power flow curve 300 such that average power is within a window 306 substantially close to zero such as, for example, 75 W or 50 W of regeneration and/or consumption over an extended period of time. Such a control system may be considered an energy neutral control system.

The control system of an active suspension system such as that shown in FIG. 4 may involve a variety of parameters such as wheel and body acceleration, steering input, braking input, and look-ahead sensors such as vision cameras, planar laser scanners, and the like. In one embodiment of an energy neutral control system, the controller calculates a running average of power (consumed or regenerated) though embodiments in which the power is tracked from ignition might also be used. In one embodiment, the average powers calculated by taking the total power equal to the integral of the power flow curve 300 over the desired time period and dividing it by the time period. The controller may then alter a gain parameter in a control algorithm to bias control of the suspension system more towards either the regenerative region if excess power consumption has occurred or the active actuation region if excess power regeneration has occurred in order to keep the average power within the neutral band 306, which may also be referred to as an active control demand threshold. For example, during an extended high lateral acceleration turn, a control algorithm may slowly allow the vehicle to roll, thus reducing the instantaneous power consumption, and over time will reduce the energy consumed (a lower average power). While in energy neutral system has been described above with regards to an electrical system, embodiments of a control system implementing an active control demand threshold with a mechanical system are also contemplated. For example, hydraulic energy may be dissipated using an appropriate element and/or captured using a hydraulic accumulator. One such embodiment that may be controlled in such a manner as described above involving the use of two electronically controlled valves and three check valves.

While embodiments described above are directed to providing an average power flow of a single hydraulic actuator that is energy neutral, the disclosure is not so limited. Instead, in some embodiments an average power flow may be taken as the sum of all the hydraulic actuators located within a vehicle or other system. Additionally, the average power flow might be determined for a subset of the hydraulic actuators located within the vehicle or system. The average may also be over all time, between vehicle ignition starts, over a small time window, or over any other appropriate time period.

In some situations, it may be desirable to override the energy neutral limits described above. For example, during a safety mode associated with sensing events such as avoidance, braking, fast steering, and/or other safety-critical maneuver, the power limits associated with the energy neutral system are overridden. One embodiment of a safety maneuver detection algorithm is a trigger if the brake position is depressed beyond a certain threshold, and the derivative of the position (i.e. the brake depression velocity) also exceeds a threshold. Other embodiments of a safety maneuver detection algorithm include the use of longitudinal acceleration thresholds, steering thresholds, and/or other appropriate inputs. In one specific embodiment, a fast control loop compares a threshold emergency steering threshold to a factor derived by multiplying the steering rate and a value from a lookup table indexed by the current speed of the vehicle. The lookup table may contain scalar values that relate maximum regular driving steering rate at each vehicle speed. For example, in a parking lot a quick turn is a conventional maneuver. However, at highway speeds the same quick turn input is likely a safety maneuver where the suspension should disregard energy limits in order to keep the vehicle stabilized. In another exemplary embodiment, a vehicle rollover model for SUVs may be utilized that incorporates a number of sensors such as lateral acceleration to change the suspension dynamics if an imminent rollover condition is detected. In many real-world applications, a number of these heuristics (braking, steering, lane-departure/traffic detection sensors, deceleration, lateral acceleration, etc.) may be fused together (such as by using fuzzy logic) to come to a desired control determination in order to control the suspension system. Depending on the embodiment, the control determination might not be binary, but rather may be a scaling factor on the power limits.

In another embodiment, a controller of suspension system adjusts how it responds to sensed wheel and/or body events based on the availability of energy reserves within the energy storage, such as a super capacitor, present within the hydraulic actuation system. More specifically, as energy reserves begin to diminish, responses to some wheel events might transition from consuming energy to harvesting energy from the actuator movements. In an example of self-powered adaptive suspension control, energy captured via regeneration from small amplitude and/or low frequency wheel events may be stored in the super capacitor of FIG. 6. When the suspension control system requires energy, such as to resist movement of a wheel at very low velocities substantially close to zero velocity, or to actively move a wheel, in response to a wheel event, energy may be drawn from the super capacitor. As energy reserves in the super capacitor, or other appropriate device, are diminished, the controller biases the system responses towards regeneration and energy conservation until the energy reserves are sufficiently replenished to resume "normal" active suspension operation.

Combining a suspension capable of adjusting its power consumption over time using energy optimizing algorithms and/or energy neutral algorithms may enhance the efficiency of the suspension. In addition, it may allow an active suspension to be integrated into a vehicle without compromising the current capacity of the alternator. For example, the suspension may adjust to reduce its instantaneous energy consumed in order to provide enough vehicle energy for other subsystems such as an anti-lock braking system (ABS brakes), electric power steering, dynamic stability control, and engine control units (ECUs).

In another exemplary embodiment, a suspension system as described herein may be associated with an active chassis power management system adapted to control power throttling of the suspension system. More specifically, a controller responsible for commanding the active suspension responds to energy needs of other devices on the vehicle such as active roll stabilization, electric power steering, other appropriate devices, and/or energy availability information such as alternator status, battery voltage, and/or engine RPM. Further, when needed the controller may reduce the power consumption of the suspension system when power is required by other devices and/or when there is low system energy as indicated by the alternator status, battery voltage, and/or engine RPM. For example, in one embodiment, a controller of a suspension reduces its instantaneous and/or time-averaged power consumption if one of the following events occur: vehicle battery voltage drops below a certain threshold; alternator current output is low, engine RPM is low, the battery voltage is dropping at a rate that exceeds a preset threshold; a controller (e.g. an engine control unit) on the vehicle commands a power consumer device (such as electric power steering) at a relatively high power (for example, during a sharp turn at low speed); an economy mode setting for the active suspension is activated, and/or any other appropriate condition where a reduced power consumption would be desired occurs.

In addition to neutral energy control, FIG. 7 also provides an example of on-demand energy delivery for an active suspension system. When an on-demand energy delivery-capable active suspension system experiences positive energy flow 302 (when the graph is above the center line), an electric motor, or other appropriate associated device, capable of acting as a generator may utilize this energy to generate electricity. This may occur when fluid flows past the hydraulic motor 114 in FIG. 4 due to wheel rebound action or compression. This flow of fluid is used to turn the electric generator, thereby producing electricity that may be stored for on-demand consumption, or it may be instantaneously consumed by another associated device within a vehicle or another suspension system including a hydraulic actuator. In contrast to regeneration, when an on-demand energy delivery capable suspension system experiences negative energy flow 304 (when the graph is below the center line), energy is being consumed as needed (e.g. on-demand). The consumed energy may either be used to actively actuate the hydraulic actuator in a desired direction, or it may be used applied as a counter acting current into the generator, thereby resisting the rotation of the hydraulic motor which in turn increases pressure in the actuator causing the wheel movement driving the demand to be mitigated. The consumed power may correspond to energy harvested during a previous regeneration cycle. Alternatively, the energy can be consumed from a variety of different sources including, for example, energy storage devices associated with the suspension system, a vehicle's 12V or 48V electrical system, and/or any other applicable energy storage system capable of delivering the desired power flow to and from the suspension system.

In one example of a suspension system and controlled to provide on-demand energy, energy consumption might be required throughout a wheel event, such as when a vehicle encounters a speed bump. Energy may be required to lift the wheel as it goes over a speed bump (that is, reduce distance between the wheel and vehicle) and then push the wheel down as it comes off of the speed bump to keep the vehicle more level throughout. However, rebound action, such as the wheel returning to the road surface as it comes down off of the speed bump may, fall into the positive energy flow cycle by harnessing the potential energy in the spring, using extension damping to regenerate energy.

While embodiments directed to suspension systems capable of both regeneration and active actuation are described above, embodiments of suspension systems that do not regenerate power, and/or dissipate regenerated power are also contemplated.

Figure 13:
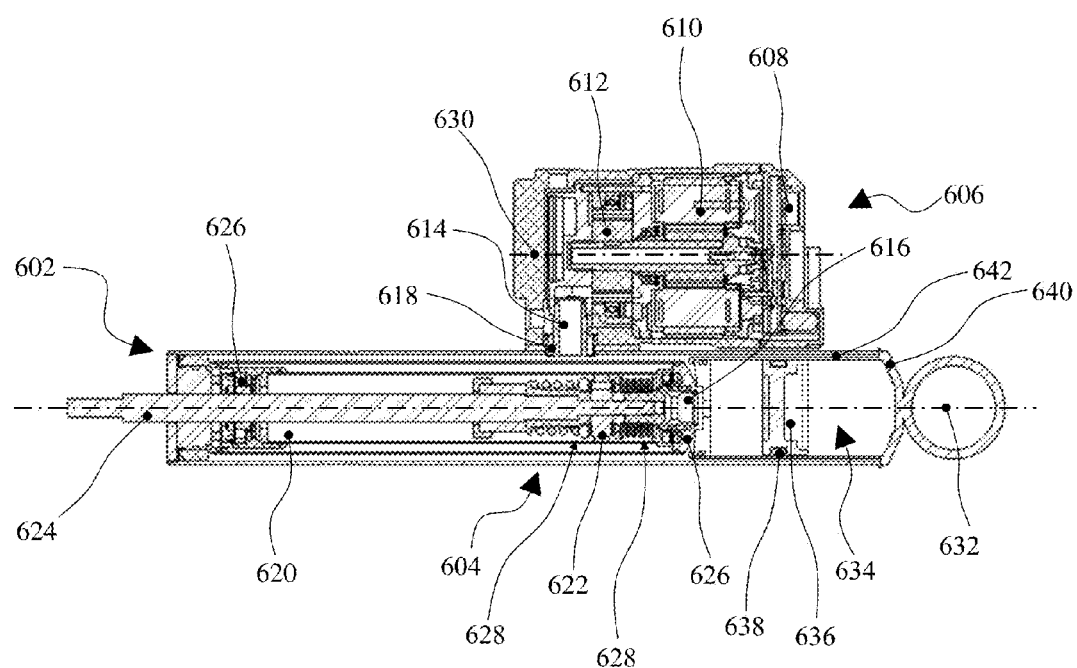
FIG. 13 is a cross-sectional view of an active suspension actuator including a hydraulic actuator and smart valve.

FIG. 13 shows an embodiment of a suspension actuator that includes a smart valve. The active suspension actuator 602 includes an actuator body (housing) 604 and a smart valve 606. The smart valve 606 is close coupled to the actuator body 604 so that there is a tight integration and short fluid communication between the smart valve and the fluid body, and is sealed so that the integrated active suspension smart valve assembly becomes a single body (or housing) active suspension actuator. In the embodiment shown in FIG. 13 the smart valve 606 is coupled to the actuator body 604 so that the axis of the smart valve (i.e. the rotational axis of the integrated hydraulic motor-pump and electric motor) 630 is parallel with the axis of actuator body 632. It should be understood that while a close coupled connection with an actuator body has been depicted, embodiments in which the smart valve is integrated into the same housing as the actuator body, connected to the actuator through the use of hoses or other similar mechanisms, as well as other connection arrangements are also contemplated.

The integrated smart valve 606 includes an electronic controller 608, an electric motor 610 that is close coupled to hydraulic motor (e.g. an HSU) 612. The hydraulic motor-pump has a first port 614 that is in fluid communication with a first chamber 616 in the actuator body 604 and a second port 618 that is in fluid communication with a second chamber 620 in the actuator body 604. The first port and second port include a hydraulic connection constructed and arranged to place the smart valve in fluid communication with the actuator In one embodiment, the hydraulic connection includes a first tube inside a second tube. The first port corresponds to the first tube, and the second port corresponds to the annular area between the first tube and second tube. In an alternate embodiment the hydraulic connection may simply correspond to two adjacent ports. Hydraulic seals may be used to contain the fluid within the first and second hydraulic connections as well as to ensure that fluid is sealed within the actuator. It should be understood that many other permutations of hydraulic connection arrangements can be constructed and the disclosure is not limited to only the connection arrangements described herein.

In the embodiment disclosed in FIG. 13 the first chamber is an extension volume and the second chamber is a compression volume, however, these chambers and volumes may be transposed and the disclosure is not limited in this regard. The hydraulic motor-pump 612 is in hydraulic communication with the first and second chambers located on opposing sides of a piston 622 which is connected to a piston rod 624. Therefore, when the piston and piston rod move in a first direction (i.e. an extension stroke) the hydraulic motor-pump rotates in a first direction, and when the piston and piston rod move in a second direction (i.e. a compression stroke) the hydraulic motor rotates in a second rotation. The close coupling of the hydraulic motor-pump through the first and second ports with the extension and compression chambers of the actuator may allow for a very stiff hydraulic system which may desirably improve the responsiveness of the actuator. As described previously, a fast response time for the actuator system is highly desirable, especially for active suspension systems where it may need to respond to wheel events acting at 20 Hz and above. As detailed previously, the response time of a second order system is directly proportional to its natural frequency and the system depicted in FIG. 13, has a natural frequency of about 30 Hz (resulting in a response time of less than 10 ms). In view of the above, similar systems should be able to readily provide natural frequencies anywhere in the range of about 2 Hz to 100 Hz though other frequencies are also possible.

The active suspension actuator 602 may have a high motion ratio from the linear speed of the piston 622 and piston rod 624 to the rotational speed of the close coupled hydraulic motor-pump and electric motor. Therefore, during high velocity suspension events, extremely high rotational speeds may be achieved by the close coupled hydraulic motor-pump and electric motor. This may cause damage to the hydraulic motor-pump and electric motor. To overcome this issue and allow the actuator to survive high speed suspension events, in some embodiments, passive valving may be incorporated to act hydraulically in either parallel, in series, or a combination of both with the hydraulic motor-pump. Such passive valving may include a diverter valve(s) 626. The diverter valve(s) 626 is configured to activate at a preset fluid flow rate (i.e. a fluid diversion threshold) and will divert hydraulic fluid away from the hydraulic motor-pump 612 in response to the hydraulic fluid flowing at a rate that exceeds the fluid diversion threshold. The fluid diversion threshold may be selected so that the maximum safe operating speed of the hydraulic motor-pump and motor is never exceeded, even at very high speed suspension events. When the diverter activates and enters the diverted flow mode, restricting fluid flow to the hydraulic motor-pump, a controlled split flow path is created so that fluid flow can by-pass the hydraulic pump in a controlled manner, thereby creating a damping force on the actuator so that wheel damping is achieved when the diverter valve is in the diverted flow mode. A diverter valve may be incorporated in at least one of the compression and extension stroke directions. The diverter valve(s) may be located in the extension volume and compression volume as shown in the embodiment of FIG. 13 or elsewhere in the hydraulic connection between the actuator body 604 and the hydraulic motor-pump 612 as the disclosure is not limited in this regard. Other forms of passive valving may also be incorporated to act hydraulically in either parallel, in series, or a combination of both, with the hydraulic motor-pump. For example, a blow-off valve(s) 628 might be used. The blow off valve(s) can be adapted so that they can operate when a specific pressure drop across the piston 622 is achieved, thereby limiting the maximum pressure in the system. The blow off valve(s) 628 may be located in the piston as shown in the embodiment of FIG. 13 or elsewhere in the hydraulic connection between the actuator body 604 and the hydraulic motor-pump 612.

The passive valving used with the active suspension actuator 602 can be adapted so as to provide a progressive actuation, thereby minimizing any noise vibration and harshness (NVH) induced by their operation. The passive valving that may be incorporated in the active suspension actuator may comprise at least one of progressive valving, multi-stage valving, flexible discs, disc stacks, amplitude dependent damping valves, volume variable chamber valving, and a baffle plate for defining a quieting duct for reducing noise related to fluid flow. Other forms of controlled valving may also be incorporated in the active suspension actuator, such as proportional solenoid valving placed in series or in parallel with the hydraulic motor-pump, electromagnetically adjustable valves for communicating hydraulic fluid between a piston-local chamber and a compensating chamber, and pressure control with adjustable limit valving. While particular arrangements and constructions of passive and controlled valving are disclosed above, other arrangements and constructions are also contemplated.

Since fluid volume in the actuator body 604 changes as the piston 624 enters and exits the actuator, the embodiment of FIG. 13 includes an accumulator 634 to accept the piston rod volume. In one embodiment, the accumulator is a nitrogen-filled chamber with a floating piston 636 able to move in the actuator body and sealed from the hydraulic fluid with a seal 638. In the depicted embodiment, the accumulator is in fluid communication with the compression chamber 616. The nitrogen in the accumulator is at a pre-charge pressure, the value of which is determined so that it is at a higher value than the maximum working pressure in the compression chamber. The floating piston 636 rides in the bore of an accumulator body 640 that is rigidly connected to the actuator body 604. A small annular gap 642 exists between the outside of the accumulator body 640 and the actuator body 604 that is in fluid communication with the compression chamber, and hence is at the same pressure (or near same pressure) as the accumulator, thereby negating or reducing the pressure drop between the inside and outside of the accumulator body. This arrangement allows for the use a thin wall accumulator body, without the body dilating under pressure from the pre-charged nitrogen.

While an internal accumulator has been depicted, any appropriate structure, device, or compressible medium capable of accommodating a change in the fluid volume present within the actuator 604, including an externally located accumulator, might be used, and while the accumulator is depicted as being in fluid communication with the compression chamber, the accumulator could be in fluid communication with the extension chamber, as the disclosure is not so limited.

The compact nature and size of the integrated smart valve and active suspension actuator of the embodiment of FIG. 13 occupies a volume and shape compatible with vehicle suspension damper wheel well clearances. This may enable easy integration into a vehicle wheel well. The smart valve occupies a suitable volume and shape such that during full range of motion and articulation of the active suspension actuator, a predetermined minimum clearance is maintained between the smart valve and all surrounding components of a conventional vehicle wheel well. The size of the smart valve as disclosed in FIG. 13 is less than 8" (203 mm) in diameter and is less than 8" (203 mm) in length. However, other sizes, dimensions, and orientations are also possible.

Figure 14:
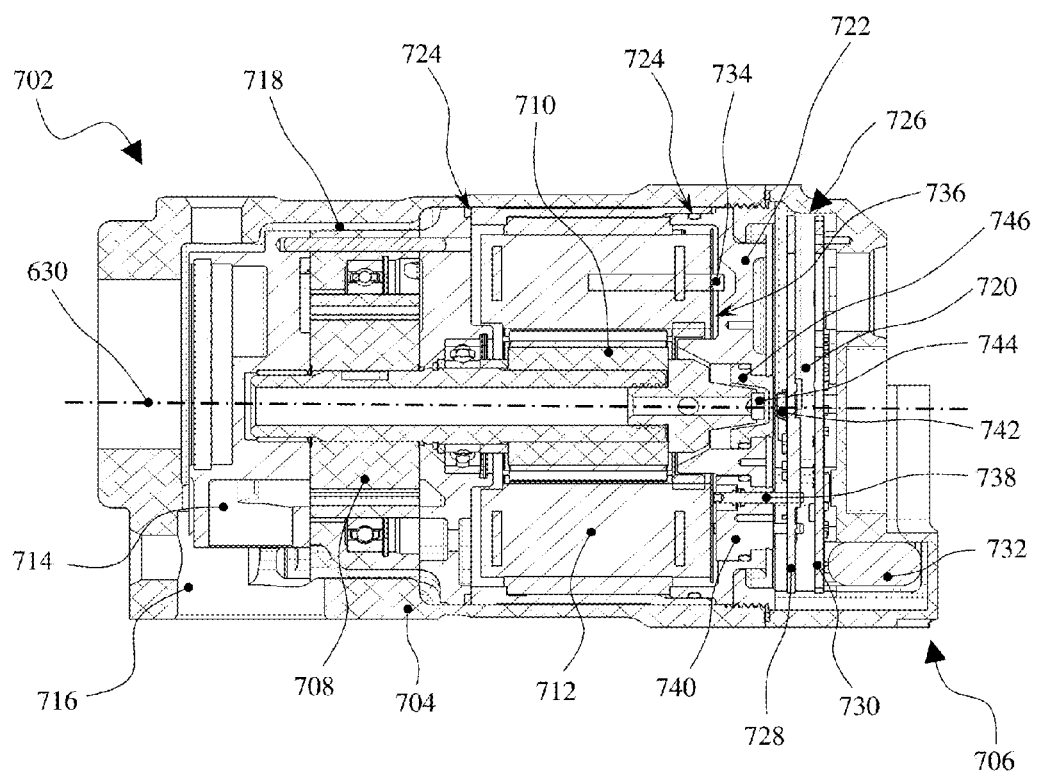
FIG. 14 is a cross-sectional view of a smart valve.

FIG. 14 shows one embodiment of a smart valve 702. As disclosed in the embodiment of FIG. 13, a fluid filled housing 704 is coupled with the control housing 706. The control housing is integrated with the smart valve 702. The smart valve assembly includes a hydraulic motor-pump assembly (HSU) 708 closely coupled and operatively connected to a rotor 710 of an electric motor/generator. The stator 712 of the electric motor/generator is rigidly located to the body of the electro-hydraulic valve assembly 702. The hydraulic motor-pump includes a first port 714 that is in fluid communication with a first chamber of the actuator and a second port 716 that is in fluid communication with a second chamber of the actuator. The second port 716 is also in fluid communication with fluid 718 that is contained within the volume of the housing 704. The hydraulic motor-pump and electric motor/generator assembly is contained within and operates within the fluid 718 contained in the fluid filled housing 704.

For reasons of reliability and durability the electric motor/generator may a brushless DC motor and electric commutation may be carried out via the electronic controller and control protocols, as opposed to using mechanical means for commutation (such as brushes for example), which may not remain reliable in an oil filled environment. However, embodiments using brush motors and other types of motors are also contemplated. As the fluid 718 is in fluid communication with the second port 716 of the hydraulic motor-pump 708, any pressure that is present at the second port of the hydraulic motor-pump will also be present in the fluid 718. The fluid pressure at the second port may be generated by the pressure drop that exists across the hydraulic motor-pump (and hence across the piston of the actuator of the embodiment of FIG. 13) and may change accordingly with the pressure drop (and hence force) across the piston. The pressure at the second port may also be present due to a pre-charge pressure that may exist due to a pressurized reservoir (that may exist to account for the rod volume that is introduced or removed from the working volume of the actuator as the piston and piston rod strokes, for example). This pre-charge pressure may fluctuate with stroke position, with temperature or with a combination of both. The pressure at the second port may also be generated as a combination of the pressure drop across the hydraulic motor-pump and the pre-charge pressure.

The control housing 706 is integrated with the smart valve body 702 and contains a controller cavity 720. The controller cavity 720 is separated from the hydraulic fluid 718 that is contained within the housing 704 by a bulkhead 722, or other pressure sealed barrier. The pressure within controller cavity 720 is at atmospheric (or near atmospheric) pressure. The bulkhead 722 contains the fluid 718 within the fluid-filled housing 704, by a seal(s) 724, acting as a pressure barrier between the fluid filled housing and the control cavity. The control housing 706 contains a controller assembly 726 which may be an electronic controller assembly including a logic board 728, a power board 730, and a capacitor 732 among other components. In some embodiments, the controller assembly is rigidly connected to the control housing 706. The electric motor/generator stator 712 includes winding electrical terminations 734 that are electrically connected to a flexible electrical connection (such as a flex PCB for example) 736 that is in electrical communication with an electronic connector 738. The electronic connector 738 passes through the bulkhead 722 while still isolating the controller cavity from the fluid filled portion of the housing through the use of a sealed pass-through 740.

Since the bulkhead 722 contains the fluid 718 within the fluid filled housing 704, the bulkhead is subjected to the pressure variations of the fluid 718 due to the pressure from the second port 716 of the hydraulic motor-pump. On the opposing side of the bulk head the bulkhead is subjected to atmospheric (or near atmospheric) pressure. This may create a pressure differential across the bulkhead which may cause the bulkhead to deflect. Even if the bulkhead is constructed from a strong and stiff material (such as steel for example), any change in the pressure differential between the fluid 718 and the controller cavity 720 may cause a change in the deflection of the bulkhead. As the sealed pass-through 740 passes through the bulkhead, any change in deflection of the bulkhead may impart a motion to the sealed pass-through, which may in turn impart a motion to the electronic connector 738 that is contained within the sealed pass-through. The flexible electrical connection 736 is adapted so that it can absorb, or otherwise accommodate, motions between the electrical connector 738 and the winding electrical terminations 734. Therefore, the connections between the winding electrical terminations 734 and the flexible electrical connection 736 and between the flexible electrical connection 736 and the electronic connector 738 may be protected from fatigue which could lead to failure.

The electrical connector 738 may be in electrical communication with the power board 730 via another compliant electrical member (not shown). The compliant electrical member is adapted so that it can absorb any motions that may exist between the electrical connector 738 and the power board 730 so that the connections between the power board 730 and the compliant electrical member and between compliant electrical member 742 and the electronic connector 738 do not become fatigued over time which may cause these connections to fail as well.

The control housing 706 contains the control assembly 726 which may include a logic board, a power board, capacitors and other electronic components such as FETs or IGBTs. To offer an efficient means of heat dissipation for the control assembly 726, the control housing 706 may act as a heat sink, and may be constructed from a material that offers good thermal conductivity and mass (such as an aluminum or heat dissipating plastic for example). To ensure that an efficient heat dissipating capability is achieved by the control housing 706, the power components of the control assembly 726 (such as the FETs or IGBTs) may be mounted flat and in close contact with the inside surface of the control housing 706 so that it may utilize this surface as a heat sink. The construction of the control housing 706 may be such that the heat sink surface may be thermally isolated from the fluid filled housing 704, by constructing the housing from various materials and using methods such as overmolding the heat sink surface material with a thermally nonconductive plastic that is in contact with the housing 704. Alternatively, the control housing 706 may be constructed so that the heat sink surface is thermally connected to the fluid filled housing 704. As a smart valve may be disposed in a wheel well of a vehicle, the heat sink feature of the control housing 706 may be adapted and optimized to use any ambient air flow that exists in the wheel well to cool the thermal mass of the heat sink.

In some embodiments, a rotary position sensor 742, that measures the rotational position of a source magnet 744 that is drivingly connected to the electric motor/generator rotor 710, is mounted directly to the logic board 728. The rotary position sensor may be of a Hall effect type or other type. A non-magnetic sensor shield 746 is located within the bulkhead and lies in between the source magnet 744 and the rotary position sensor 742. Consequently, the sensor shield contains the fluid 718 that is in the fluid filled housing while allowing the magnetic flux of the source magnet 744 to pass through unimpeded so that it can be detected by the rotary position sensor 742 in order to detect the angular position of the rotor 710.

The signal from the rotary position sensor 742 may be used by the electronic controller for commutation of the BLDC motor as well as for other functions such as for the use in a hydraulic ripple cancellation algorithm (or protocol). Without wishing to be bound by theory, all positive displacement hydraulic pumps and motors (e.g. HSUs) produce a pressure pulsation that is in relation to its rotational position. This pressure pulsation is generated because the hydraulic motor-pump does not supply an even flow per revolution. Instead, the hydraulic motor-pump produces a flow pulsation per revolution, whereby at certain positions the hydraulic motor-pump delivers more flow than its nominal theoretical flow per revolution (i.e. an additional flow), and at other position the hydraulic motor-pump delivers less flow than its nominal theoretical flow per revolution (i.e. a negative flow). The profile of the flow pulsation (or ripple) is known with respect to the rotary position of the hydraulic motor-pump. This flow ripple then in turn generates a pressure ripple in the system due to the inertia of the rotational components and the mass of the fluid etc. and this pressure pulsation can produce undesirable noise and force pulsations in downstream actuators etc. Since the profile of the pressure pulsation can be determined relative to the pump position, which may be measured from the rotor position using the source magnet position, it is possible for the controller to use a protocol that can vary the motor current and hence the motor torque based upon the rotor position signal to counteract these pressure pulsations. This may help to mitigate or reduce the pressure pulsations and hence reduce the hydraulic noise and improve the performance of the system. Another method of reducing hydraulic ripple from the hydraulic motor-pump may be in the use of a port timed accumulator buffer. In this arrangement the hydraulic motor-pump contains ports that are timed in accordance with the hydraulic motor-pump flow ripple signature so that in positions when the hydraulic motor-pump delivers more flow than its nominal (i.e. an additional flow) a port is opened from the hydraulic motor-pump first port to a chamber that contains a compressible medium so that there is fluid flow from the hydraulic motor-pump to the chamber to accommodate this additional flow, and at positions when the hydraulic motor-pump delivers less flow than its nominal (i.e. a negative flow) a port is opened from the hydraulic motor-pump first port to the reservoir that contains a compressible medium so that the fluid can flow from the reservoir to the hydraulic motor-pump first port, to make up for the negative flow. The chamber with the compressible medium thereby buffers out the flow pulsations and hence the pressure pulsations from the hydraulic motor-pump. It is possible to use the hydraulic ripple cancellation algorithm described earlier with the port timed accumulator buffer described above to further reduce the pressure ripple and noise signature of the hydraulic motor-pump thereby further improving the performance of the smart valve.

Figure 15:
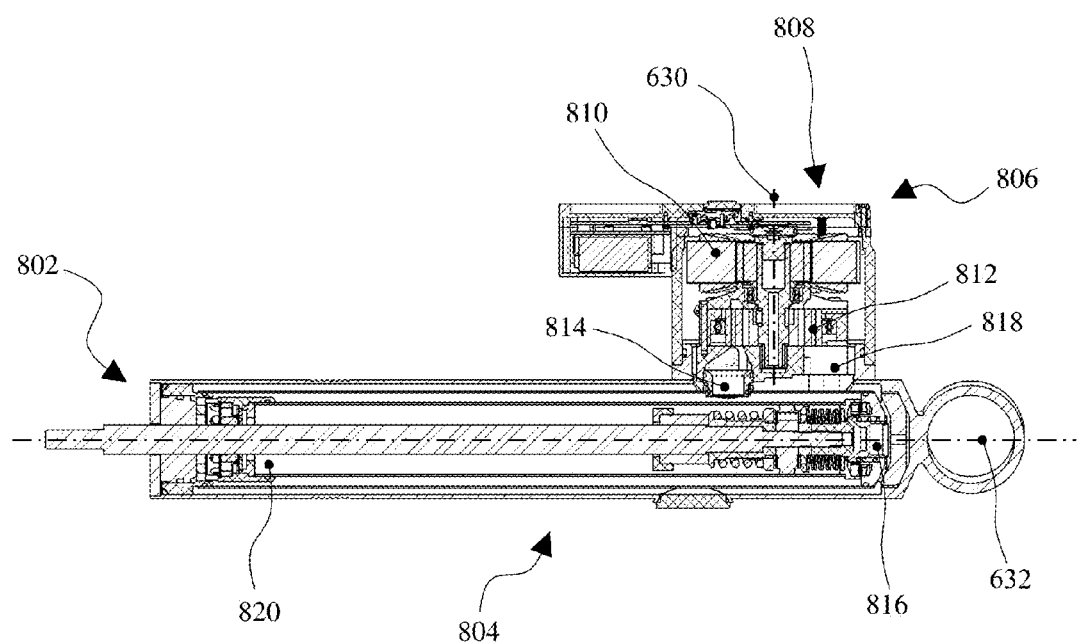
FIG. 15 is a cross-sectional view of an active suspension actuator including a hydraulic actuator and smart valve.

FIG. 15 which shows an embodiment of a suspension system 802 including an actuator body (housing) 804 and a smart valve 806. The smart valve 806 is close coupled to the actuator body 804 so that there is a tight integration and short fluid communication between the smart valve and the fluid body, and is sealed so that the integrated active suspension smart valve assembly either is, or may function as, a single body (or housing) suspension system. The integrated smart valve 806 includes an electronic controller 808 and an electric motor 810 that is close coupled to a hydraulic motor-pump (e.g. an HSU) 812. The hydraulic motor-pump has a first port 814 that is in fluid communication with a first chamber 816 in the actuator body 804 and a second port 818 that is in fluid communication with a second chamber 820 in the actuator body 804. The first port and second port include hydraulic connections to the actuator. The hydraulic connection may include a first tube inside a second tube such that the first port is the first tube, and the second port is the annular area between the first tube and second tube. In an alternate embodiment the hydraulic connection may include two adjacent ports. However, other types and arrangements of connections could also be used.

The embodiment of FIG. 15 is similar to that of the embodiment of FIG. 13 with the difference that the smart valve 806 is coupled to the actuator body 804 so that the axis of the smart valve (i.e. the rotational axis of the integrated hydraulic motor-pump and electric motor) 630 is perpendicular, or near perpendicular with the axis of the actuator body 632 as opposed to parallel to the axis of the actuator body 632. It is of course possible to mount the smart valve with its axis 630 at any angle between the parallel and perpendicular with that of the actuator body axis 632. Therefore, it should be understood that the hydraulic motor-pump may be coupled to the actuator body in any appropriate orientation and at any appropriate location.

Figure 16:
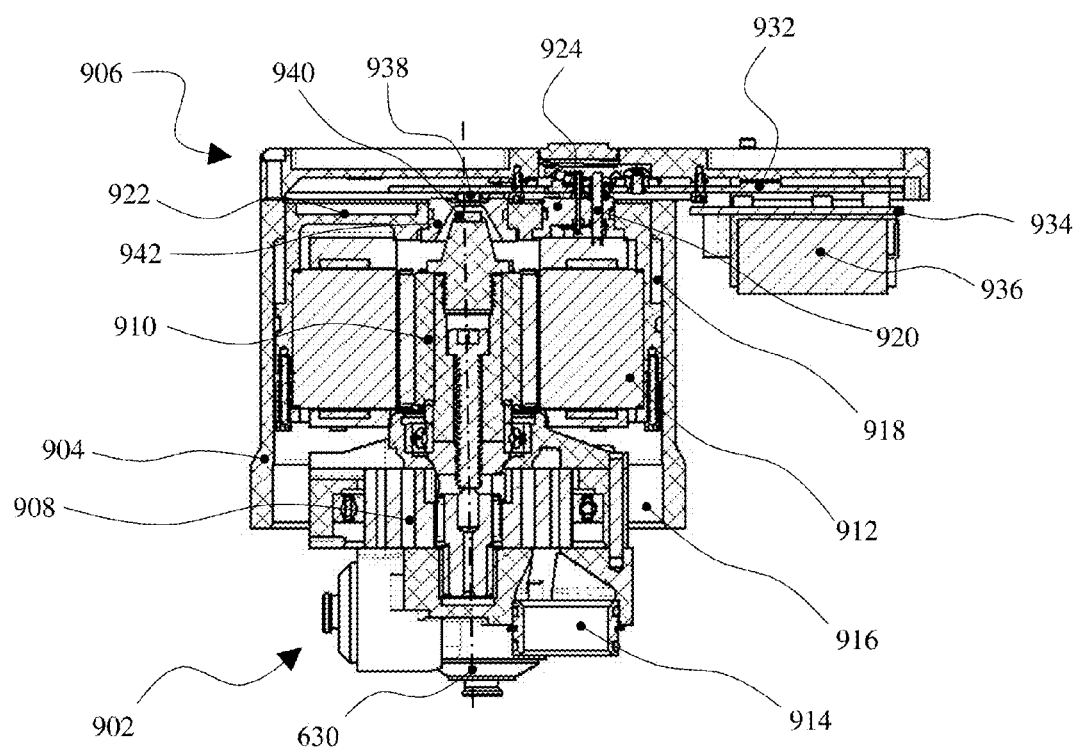
FIG. 16 is an enlarged cross-sectional view of the smart valve of FIG. 15.

FIG. 16 shows an embodiment of a smart valve 902 similar to that disclosed in FIG. 15. This embodiment shows a smart valve 902 including a housing 904 coupled with a controller module 906. The controller module is situated on the top of the smart valve 902. The smart valve assembly includes a hydraulic motor-pump assembly (e.g. an HSU) 908 closely coupled to a rotor 910 of an electric motor/generator. The stator 912 of the electric motor/generator is rigidly connected to the housing 904 of the electro-hydraulic valve assembly 902. The hydraulic motor-pump includes a first port 914 that is in fluid communication with a first chamber of the actuator and a second port 916 that is in fluid communication with a second chamber of the actuator. The second port 916 is also in fluid communication with fluid 918 that is contained within the volume of the housing 904. The hydraulic motor-pump and electric motor/generator assembly are contained and operated within the fluid 918 contained in the fluid filled housing 904.

The controller module 906 is connected to the electric motor/generator via an electronic connection 920 and is separated from the hydraulic fluid by a bulkhead 922, or other appropriate pressure sealed barrier. The electronic connection 920 is isolated from the hydraulic fluid via a pass through 924. Within the controller cavity is a logic subassembly 932, a power pack 934, and a capacitor 936. In another embodiment the power pack 934 can be mounted to a dedicated heat sink that is thermally decoupled from the hydraulic valve assembly 902. A power storage unit is mounted on the side of the hydraulic valve assembly 902, or it can be integrated with the power pack 934. In yet another embodiment, the power pack 934 is split into three subunits with each subunit housing a single leg (half bridge) of the power pack. However, other arrangements are also possible. For the purpose of minimizing thermal load and volume, the logic subassembly may be subdivided into a logic power module, a sensor interface module, and a processor module. In one embodiment the logic subassembly 932 uses a position sensor 938. The position sensor may share the same printed circuit board (PCB) that is used for housing FETs (IGBTs) or may be mounted on a flex cable. In another embodiment the logic subassembly 932 may be completely sensorless. Furthermore, while a subdivided controller has been described above, it should be understood that all the components of the controller module 906 can be integrated into a single assembly and produced on a single PCB.

In one embodiment, a rotary Hall effect position sensor 938 that measures the rotational position of a source magnet 940 that is drivingly connected to the electric motor/generator rotor 910, is mounted directly to the logic board 932. The Hall effect position sensor may also be protected from the working hydraulic fluid of the electro-hydraulic valve assembly 902 by a sensor shield 942.

Figure 17:
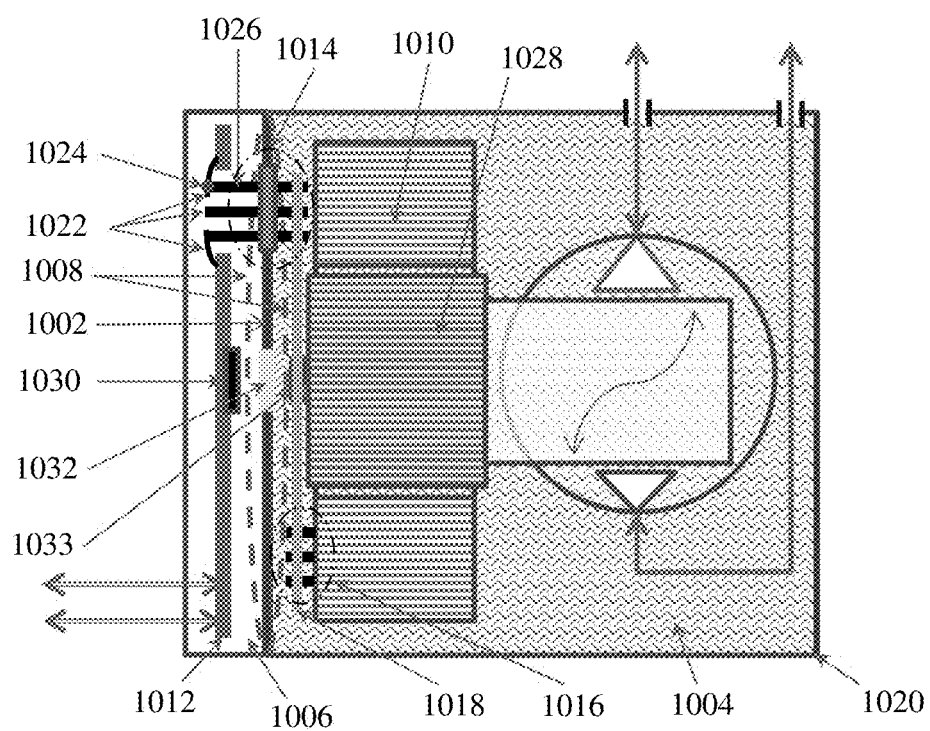
FIG. 17 is a schematic representation of a controller-valve integration.

FIG. 17 depicts one embodiment of a controller-valve integration in schematic form. A pressure barrier 1002 separates a fluid-filled pressurized reservoir 1004 from air-filled controller compartment 1006 that is exposed to atmospheric pressure. The pressure barrier 1002 deflects within the boundaries 1008 under the influence of variable pressure within volume 1004 while motor 1010 and a controller board 1012 remain stationary. A feed-through 1014 and a motor connection 1016 are electrically connected to opposite ends of a flexible printed circuit board 1018. When the pressure barrier 1002 flexes under the influence of a variable pressure, it pulls feed-through 1014 with it which may apply a force to a flexible printed circuit board 1018 which bends to accommodate this movement without transferring the force to a motor connection 1016. This may help to ensure reliable operation of the corresponding solder joints. A controller board 1012 may be rigidly attached to a valve housing 1020 and is restricted from motion while feed-through 1014 moves in conjunction with the motions of the pressure barrier 1002 (e.g. a membrane or other construction). Flexible leaves 1022 are welded 1024 or otherwise electrically connected to feed-through pins 1026. Flexible leaves 1022 may accommodate motions of a feed-through 1014 and prevent transfer of reciprocal forces to the controller board 1012. A radially magnetized magnet 1033 may transfer angular position of a rotor 1028 to a transducer module device 1030 via magnetic flux permeable window 1032.

In some embodiments, flexible leaves 1022 may be solder joined with feed-through pins 1026 using a low-temperature solder joint 1024. This may enable a self-healing behavior of flexible high current connections. Specifically, when 1024 develops micro-cracks, resistance of the corresponding solder joint increases causing a localized temperature rise and re-melting of the low temperature solder. This may be combined with non-wetting plating applied to the surrounding solder and connection pads outside of the solder joint to prevent reflow of the molten solder away from the designated solder area.

Figure 18:
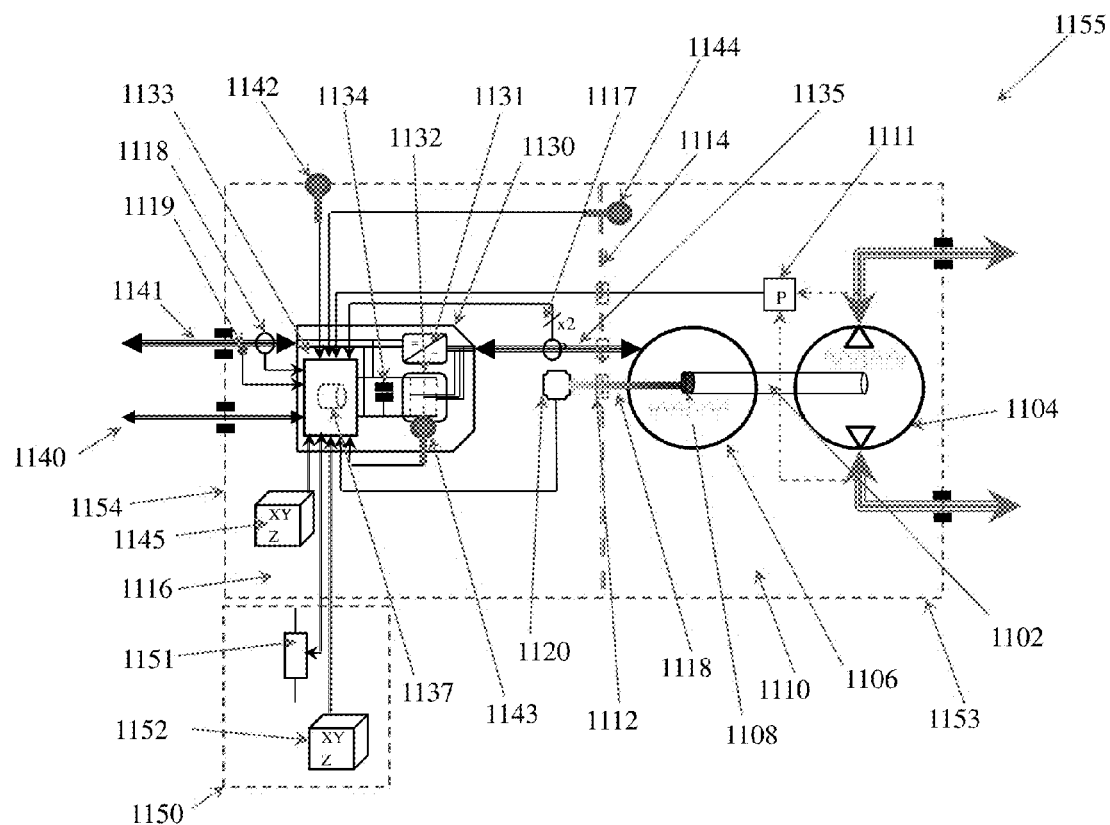
FIG. 18 is a schematic representation of a generic electro-hydraulic valve architecture.

FIG. 18 is a schematic of one embodiment of a smart valve architecture. The rotor shaft 1102 is operatively coupled to the shaft of a hydraulic motor-pump 1104 that may be both bidirectional and backdrivable. However, embodiments in which the hydraulic motor-pump is unidirectional and/or pumping only are also contemplated. The angular position of a rotor shaft 1102 that is rigidly connecting a hydraulic pump 1104 to a motor 1106 may be used in a motor control loop as described elsewhere. The aforementioned position measurement is derived from a radially magnetized permanent magnet inducer 1108 which is rigidly attached to a rotor shaft 1102 that is operationally located in fluid-filled reservoir 1110. A magnetic field flux induced by an axially rotated magnet 1108 penetrates through a magnetically transparent window 1112 that is built into a membrane 1114. The membrane separates the fluid filled reservoir 1110 from the electronic enclosure 1116 that is exposed to atmospheric pressure. It should be noted that the membrane 1114 is exposed to a variable differential pressure between the fluid-filled and air exposed enclosures resulting in a variable membrane deflection. Magnetic flux 1118 interacts with a field sensitive transducer 1120 that translates a strength of the measured magnetic flux 1118 into an angular position of a rotor shaft 1102.

In one embodiment, a controller module 1130 includes a processor module 1133, a storage capacitor 1134, a three-phase rectifier 1131 and a 3-Phase power bridge 1132. A three-phase rectifier 1131 and a 3-Phase power bridge 1132 are operatively connected to a motor 1106 via a bidirectional 3-Phase feed 1135. A controller 1130 is powered by a direct voltage power source via a power feed 1141 and may be in communication with at least one other similar controller or a central vehicle suspension controller via a communication bus 1140. Though other types of communication including wireless communication might also be used. The specifics of the aforementioned architecture, algorithm, and corresponding implementation are described elsewhere. During regenerative events associated with vertical wheel motions, or other appropriate motions of a hydraulic actuator, fluid is forced through the hydraulic motor-pump 1104 producing rotary motion of an electric motor 1106 that results in generation of back electromotive force (BEMF) on the electric motor's terminals. In case of a power bus failure, which may be manifested in "starving" a DC power feed 1141, the BEMF is rectified in 1131 and its energy is stored in a capacitor 1134 that is connected between positive and negative terminals of a power source. Therefore, charging of the capacitor 1134 results in developing a sufficient voltage to power logic of a controller 1130 that is also connected between positive and negative terminals of the capacitor 1134. A control algorithm implemented on a processor 1133 responds to a failure by either closing all switches in the bridge 1132 or by modulating the duty cycle of the bridge to maintain a desired current through the windings of a motor 1106 and producing a minimum fail-safe torque resulting in a safe damping force. Similarly, in case of a failure of a communication bus 1140, the controller rolls-back to a passive damping mode and maintains a desired passive damping characteristic of a suspension system. Furthermore, in case of a catastrophic failure of a controller 1130, the motor-pump assembly 1106, 1102, and 1104 may spin out of control resulting in voltage rise on a DC bus indicating an unacceptable suspension failure; a shunt relay connected across a DC bus as described elsewhere detects an "above safe voltage level" condition and closes the circuit shorting a DC bus and effectively guaranteeing safe suspension damping.

A processor module 1133 of a controller module 1130 may receive a plurality of intrinsic, extrinsic and vehicle related information. The intrinsic information may originate from within the smart valve housing 1153 and/or the controller housing 1154 forming a complete smart valve 1155.

An intrinsic sensors suite may include, but is not limited to at least two motor current sensors 1117, a bus voltage 1119 and current 1118 sensors, a differential pressure sensor 1111, an actuator body accelerometer 1145, an ambient 1142, fluid 1144, and a FET temperature sensor 1143. An extrinsic sensor suite 1150 may also include for example a suspension position sensor 1151 and a body acceleration sensor 1152, where a suspension position sensor 1151 which communicates a longitudinal position of a wheel in reference to the vehicle's body, and a body accelerometer 1152 which communicates vehicle body motions in reference to an inertial reference system that may include a body translational and/or rotational motion.

In the preferred embodiment vehicle related information may include, but is not limited to, steering, throttle, brake inputs, yaw rate, longitudinal acceleration, lateral acceleration, driver preferences, as well as a plurality of inputs such as calculated instantaneous force-velocity requirements. These inputs may be communicated to a controller via communication bus 1140. The specifics of the implementation have been described elsewhere. However, it should be understood that the above signals can be communicated to a controller 1130 using any other suitable means including a direct routing of individual signals or utilizing a data over power lines protocol. Furthermore, suspension actuators are effectively a link between an independently moving wheel and a vehicle body collectively affected by a plurality of actuator motions. Therefore, and without wishing to be bound by theory, an onset of a dynamic event in any wheel actuator assembly affects the behavior of all actuators connected between their corresponding wheels and the vehicle's body. Consequently, it may be beneficial from a control perspective to have a predictive signaling of any suspension event to all actuator controllers 1130. Thus, the actuator controllers in a vehicle may desirably be connected to a network to enable communicating the desired information. The networking can be achieved in a centralized fashion when each actuator uploads all information, including but not limited to time sensitive information like pressure ripples to a central controller, which in turn distributes this information downstream to all actuator controllers in the network to take an appropriate action. Alternatively, this may be accomplished in a decentralized manner by homogeneously connecting all controllers in the vehicle using any appropriate connection which may include, but is not limited to, a CAN bus, a Token Ring bus or a Data Over Power Bus interface.

Without wishing to be bound by theory, at any given moment in time the performance of an electro-hydraulic actuator primarily depends on a hydraulic motor-pump and electric motor performance characteristics as well as on power bus limitations, ambient temperature, electronic components, and hydraulic fluid temperatures. Recoverable thermal dependencies and non-recoverable age-related degradations due to mechanical wear-out and chemical changes in fluid composition may be taken into account by a control algorithm or protocol. Specifically, on a short-term time scale current-to-torque conversion curves may be adjusted based on fluid viscosity change due to temperature variations as well as on power handling capabilities of the electronics due to the rising temperature of electronic components and the amount of available energy stored in the system. On a long-term time scale the adaptive control algorithm may take into account an increased leakage due to mechanical wear out of a hydraulic pump 1104 components and/or a long term viscosity change (due to chemical degradation) of a hydraulic fluid. The same sensor suites noted above, including, but not limited to a differential pressure sensor 1111, temperature sensors 1144, 1142 and 1143 as well as the commanded and actual force-velocity response received from extrinsic sensors may be utilized to adjust both short-term and long-term parameters of the actuator model. Long-term parameter adjustments may be stored in a FLASH memory unit 1137.

In the depicted embodiment, a first input of a differential pressure sensor 1111 is connected to a first port of a pump 1104, while a second input of a sensor 1111 is operatively connected to a second port of a pump 1104. Power and output leads of a differential pressure sensor 1111 penetrate from a fluid-filled reservoir 1110 through a hermetically-sealed path-into a controller compartment 1116 and conveys a voltage representation of a differential pressure across a pump 1104 to a processor module 1133. A differential pressure value is correlated with a fluid temperature and a plant's (i.e. the object of control) force-velocity to calculate new system parameters that represent short-term and long-term system drift while long-term model changes may be saved in the FLASH memory 1137.

In addition to the above, a differential pressure variation may be used as an early forward-looking signal to indicate a pending reversal in a plant's motion direction. The latter usually happens when the electric motor/hydraulic motor-pump assembly is crossing a zero RPM point and rotational speed cannot be calculated based on rotor position sensing alone. Additionally, being a direct indication of a force applied to a plant, a differential pressure provides an unambiguous input to a controller 1130 involved in a fast control loop in response to an instantaneous pressure variation.

Figure 19A:
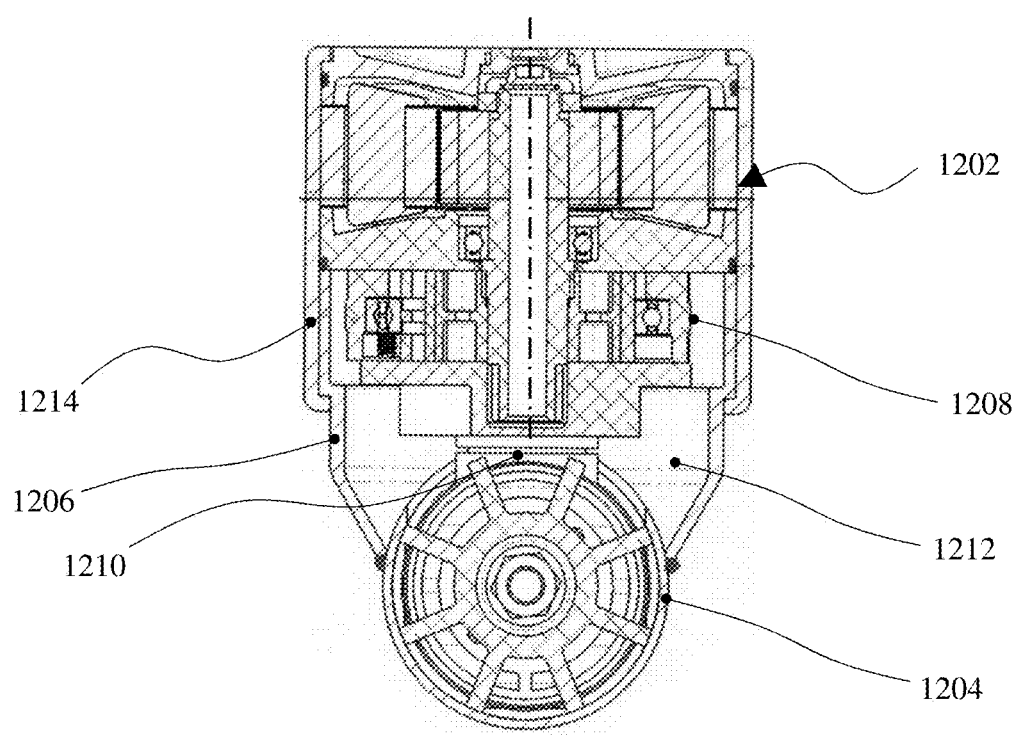
FIGS. 19A-19F depict various attachment methods for connecting a smart valve to an actuator body.

FIGS. 19A, 19B, 19C, 19D, 19E, and 19F show various embodiments of connection methods for integrating the smart valve with the active suspension actuator body. In the embodiment of FIG. 19A a cross section through a smart valve 1202 and actuator body 1204 is shown where the actuator body has a protrusion 1206 extending out from the actuator body. The protrusion 1206 is formed so that it can accept and locate the body of the hydraulic motor-pump 1208 such that the hydraulic connection between the first port of the hydraulic motor-pump and first chamber of the actuator body is made via tube 1210. The protrusion 1206 may be constructed by various means such as fixing a separate member to the actuator body (by welding for example), or by constructing the actuator body so that the protrusion is integrally formed with the actuator body (e.g. by utilizing a casting or a sheet metal forming process for example). The open cavity 1212 created by the protrusion 1206 is in fluid communication with the second port of the hydraulic motor-pump and the second chamber of the actuator body when connected thereto and serves to make the hydraulic connection between the two. An external member 1214 encloses the smart valve assembly 1202 and serves to rigidly secure the smart valve assembly to the actuator body and to contain the fluid therein. The external member 1214 can be assembled and secured after the smart valve assembly is connected to the actuator body by a suitable metal forming process (such as rolling or crimping for example) or by other means such as being secured by fasteners for example.

Figures 19B, 19C:
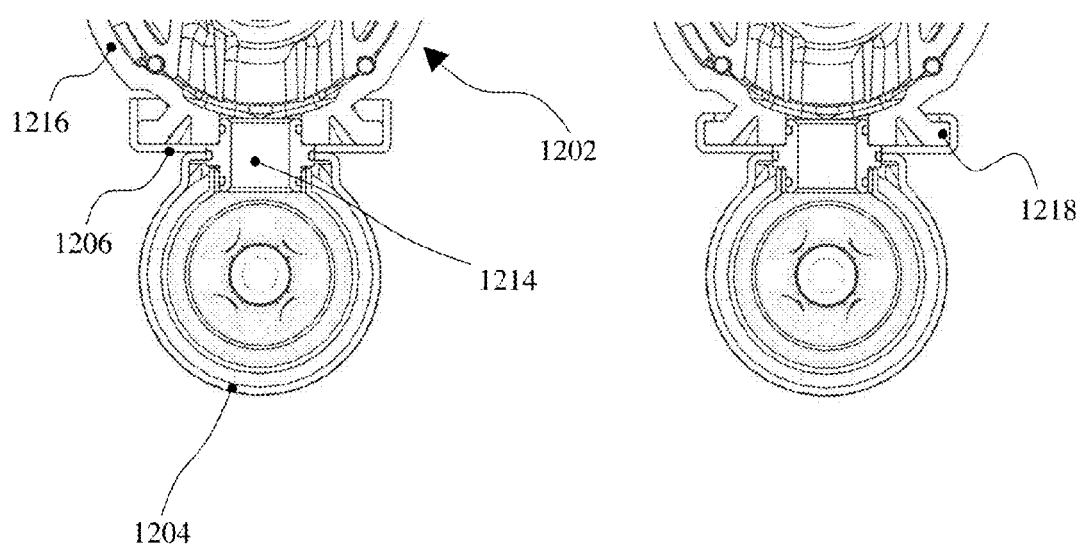
Figure 19D:
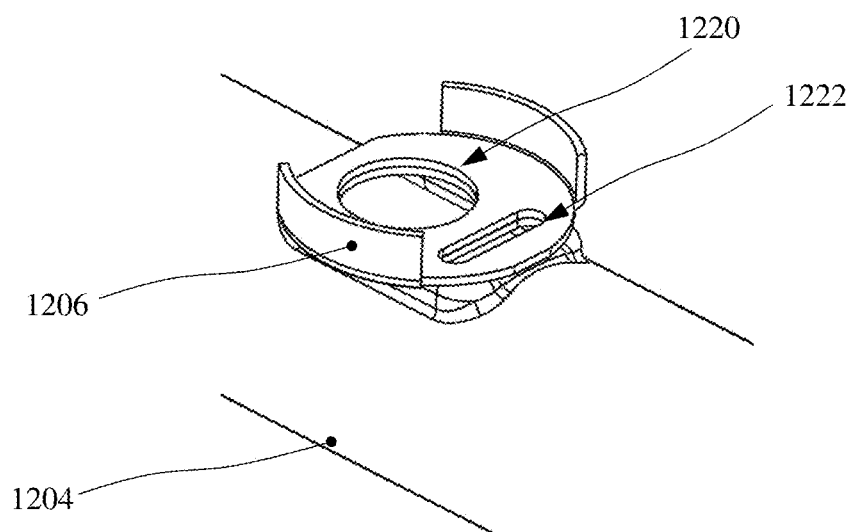
Figures 19E, 19F:
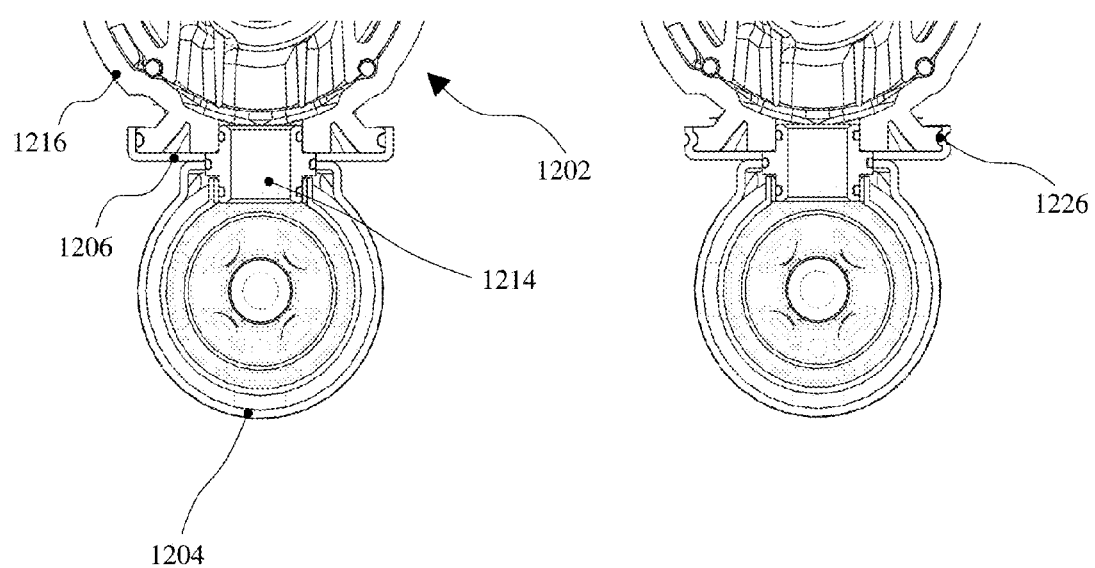

FIG. 19B shows an alternate embodiment of connecting the smart valve 1202 to the actuator body 1204. In the depicted embodiment, the actuator body has a protrusion 1206 extending out from the actuator body which is configured to accept and locate the fluid filled housing of the hydraulic motor-pump 1216 so that the hydraulic connection between the first port of the hydraulic motor-pump and first chamber of the actuator body is made via an encapsulated connector tube 1214. The protrusion 1206 may be constructed by various means such as fixing a separate member to the actuator body (by welding for example), or by constructing the actuator body so that the protrusion is integrally formed with the actuator body, (by utilizing a casting or a sheet metal forming process for example). A second cavity 1218 (shown in FIG. 19C) is created in the protrusion 1206 and is in fluid communication with the second port of the hydraulic motor-pump and the second chamber of the actuator body and serves to make the hydraulic connection between the two. The protrusion 1206 can be secured after the smart valve assembly is connected to the actuator body by a suitable metal forming process such as a rolling process or crimping for example. The unformed state of the protrusion 1206 is shown in FIG. 19B and is shown in the secured, formed state in FIG. 19C. In the embodiment of FIGS. 19B and 19C, the protrusion 1206 is formed over tabs 1218 that are formed into the fluid filled housing 1216. In FIG. 19D the actuator body 1204 is shown without the smart valve so that the openings 1220 and 1222 in the actuator body can be seen as well as to show the protrusion 1206 in the unformed state. The opening 1220 in the actuator body 1204 encases the connector tube connector tube 1214 and the opening 1222 connects to the second port in the hydraulic motor-pump via the fluid filled housing 1216. The opening 1220 is also in fluid communication with the second chamber of the actuator. A seal or gasket (not shown) may be placed between the actuator body and the smart valve so as to seal the hydraulic fluid internally from the openings 1220 and 1222 as well as to contain the fluid so that it cannot leak externally. An alternate securing shape of the protrusion 1206 is shown in FIGS. 19E and 19F. In the depicted embodiments, the protrusion 1206 is formed into a groove 1226 that is formed into the fluid filled housing 1218. The protrusion 1206 is shown in the unformed state in FIG. 19E and in the secured, formed state in FIG. 19F. It is possible to incorporate a thermally insulating member between the actuator body and the smart valve if desired.

While particular methods and arrangements are described above for securing a smart valve to an actuator body, it should be understood that that other methods of securing a smart valve to an actuator body are also contemplated.

Figure 20:
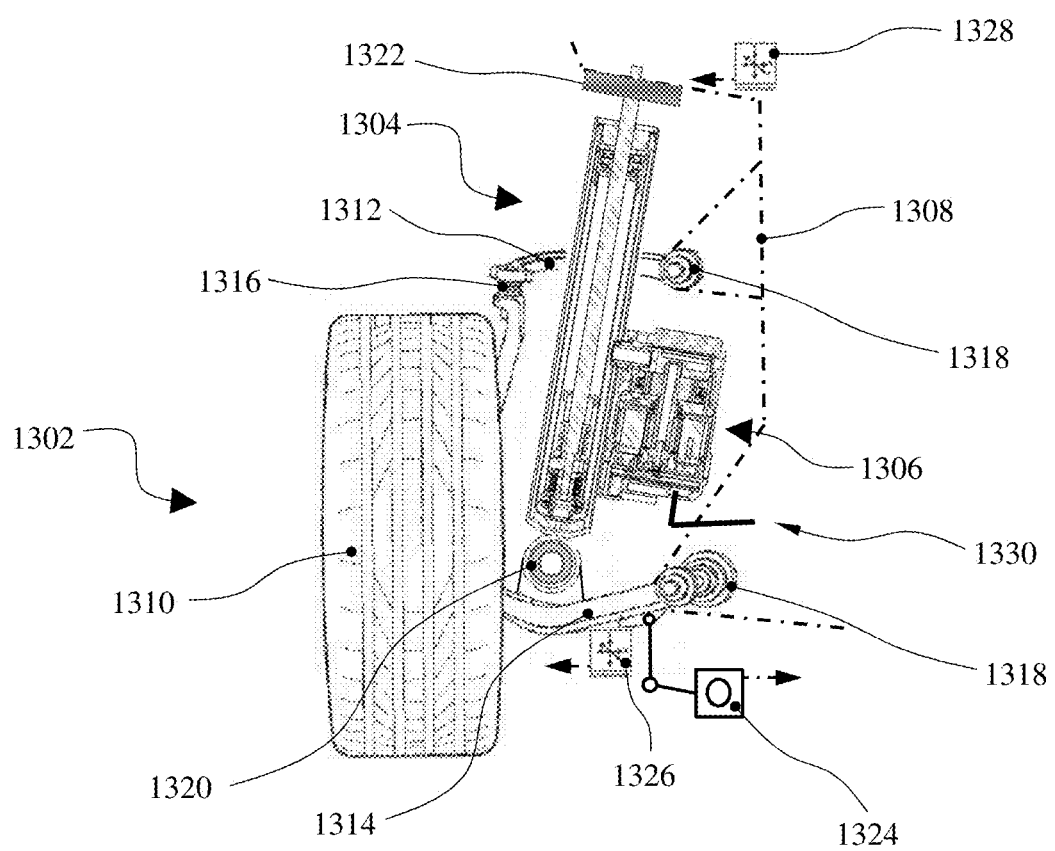
FIG. 20 is a cross sectional view of a hydraulic actuator connected with a smart valve disposed in a wheel well at one corner of a vehicle.

FIG. 20 depicts an embodiment of a suspension installation 1302 of an active suspension actuator 1304 within a wheel well at one corner of a vehicle. The suspension system 1302 includes an active suspension actuator 1304 integrated with a smart valve 1306 that is coupled between the chassis 1308 and the wheel 1310. Generally, the chassis is commonly referred to as a sprung mass, while the wheel and mounting assembly are commonly referred to as an unsprung mass. As illustrated, the wheel 1310 is coupled to the chassis and actuator 1302 by an upper control arm 1312, a lower control arm 1314 and a mounting member 1316 (which is commonly referred to as the knuckle). The upper control arm 1312 and lower control arm 1314 are coupled to the chassis at connection points 1318, while the actuator is coupled to the lower control arm 1314 via a lower mounting member 1320 and to the chassis at an upper mounting member 1322. The mounting members 1320 and 1322 may be in the form of elastomeric bushings or other types of suspension mounts, such as hydramounts or active suspension bushings for example, that can be adapted to reduce noise or resonances that may be associated with operation of the active suspension actuator being transmitted to the vehicle or to improve the vehicle NVH characteristics. As depicted in the figure, a position sensor 1324 may be located between the suspension mounting assembly and the chassis so that wheel position relative to the chassis can be monitored and used for control of the active suspension actuator. An accelerometer 1326 may be mounted on the unsprung mass so as to monitor wheel acceleration and an accelerometer(s) 1328 may be mounted on the sprung mass so as to monitor chassis accelerations. An accelerometer, rotary position sensor, and/or pressure sensors may be contained within the active suspension housing and may be combined and adapted with the vehicle sensors to sense a wheel and/or body event. These signals may be used for control of the active suspension actuator. Many combinations of vehicle and actuator based sensors can be constructed and arranged to sense a wheel and/or body event and used for the control of the active suspension actuator. For example, appropriate sensor inputs may be related to wheel acceleration sensing, pressure sensing, position sensing, smart valve local sensing, rotary motor position sensing, multi-sensor whole vehicle sensing, a centralized IMU sensor architecture, utilizing combinations of sensors per wheel and axle, as well as other appropriate types of sensors.

The depicted smart valve is electrically connected to the vehicle electrical power, control, and sensor systems via a connection 1330. The compact integrated active suspension actuator 1304 occupies a similar volume as a typical passive and semi active damper, which facilitates installation of the integrated system into a vehicle wheel well. In the embodiment shown in FIG. 20, the smart valve 1306 is positioned with its axis 630 parallel to the axis of the actuator body 632. However, other positions and orientations of the smart valve are also contemplated in order to facilitate installation in other vehicle locations as well as other possible applications.

Figure 21:
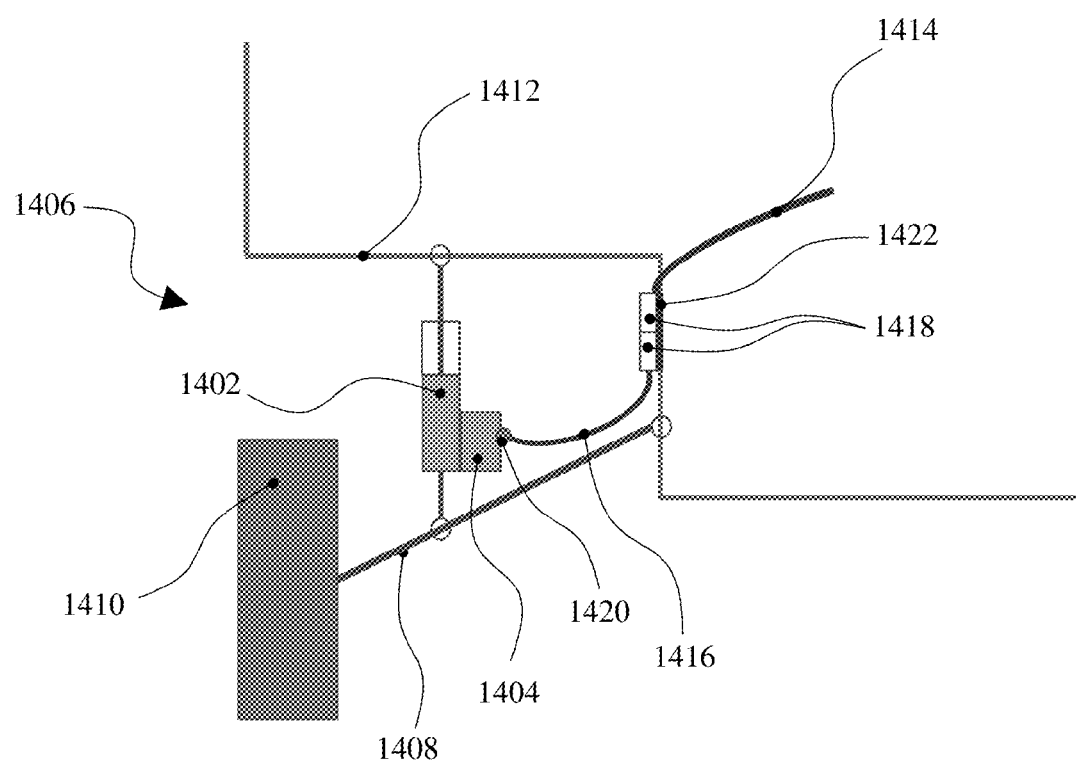
FIG. 21 is a schematic representation of a hydraulic actuator connected with a smart valve disposed in the wheel well at one corner of a vehicle employing a flex cable connection system.

FIG. 21 shows a schematic implementation of an embodiment of an active suspension actuator 1402 with an integrated smart valve 1404 with chassis mounted power and signal wire connections. As depicted in the figure, the actuator and smart valve are disposed in a vehicle wheel well 1406. In this embodiment, the active suspension actuator with integrated smart valve, 1402 and 1404, is attached to the unsprung portion of the suspension 1408, which connects the wheel 1410 to the vehicle chassis 1412, such that during operation, there is relative motion between the smart valve 1404 and the chassis of the vehicle 1412. The smart valve's controller is connected to the chassis-mounted wiring harness 1414 via one or more flex cable pigtails 1416 and mating pair(s) of connectors 1418. The pigtails exit the controller housing through one or more lead-out glands 1420 that provide strain relief as well as environmental sealing. Both sides of the mated pair of connectors are attached to a chassis-mounted bracket 1422 and their cables include strain reliefs connected to the same bracket to minimize any motion across the connection, whether it be due to shock, vibration, or cable flexing. The same approach can be used to wire local sensors and other components to the actuator-mounted smart valve controller as well.

Figure 22:
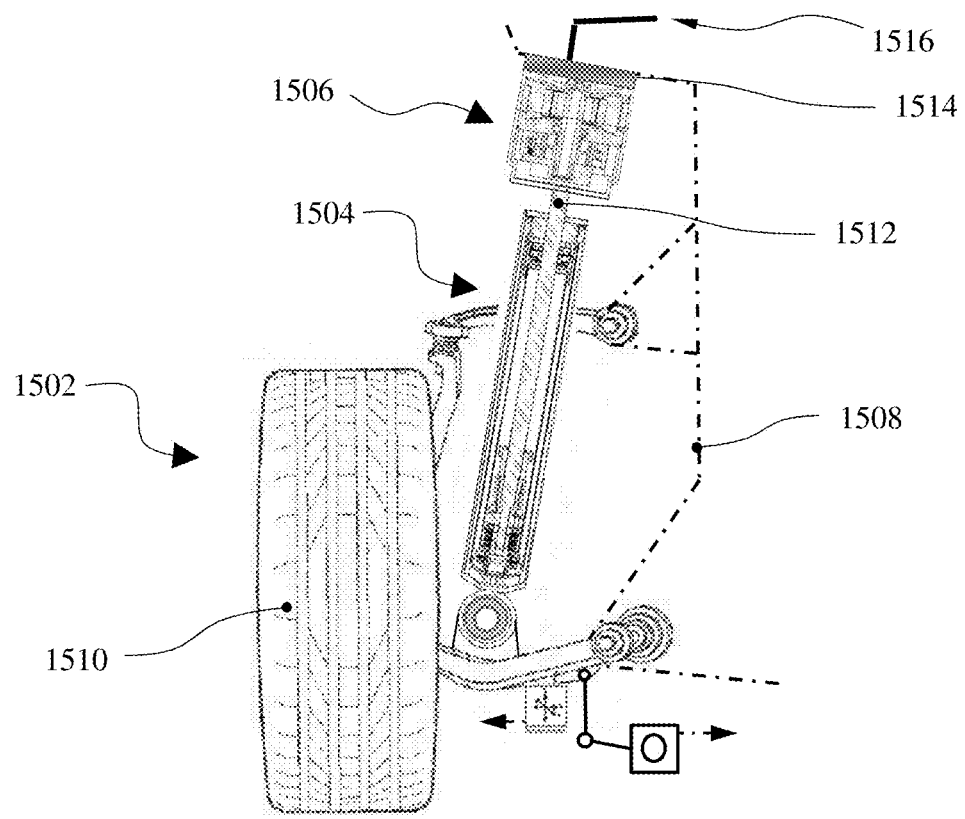
FIG. 22 is a cross sectional view of a hydraulic actuator connected with a top mounted smart valve disposed in a wheel well at one corner of a vehicle.

FIG. 22 depicts an alternate location of a smart valve on an actuator body. In the embodiments of FIGS. 13, 15 and 20 the smart valve is located on the side of the actuator body. However, the smart valve may be mounted in other locations on the active suspension actuator as well. One such location may be at the external end of the piston rod where it is fixed to the chassis member. The embodiment of FIG. 22 depicts the suspension installation 1502 of an active suspension actuator 1504 within the wheel well at one corner of a vehicle. The suspension system 1502 includes an active suspension actuator 1504 integrated with a smart valve 1506 that is coupled between the chassis 1508 and the wheel 1510. In the embodiment depicted in FIG. 22 the smart valve 1506 is located at the external end of the piston rod 1512. The axis of the hydraulic motor-pump 630 may be co-axial with the axis of the actuator 632, and may be fixed to a suspension mount 1514 which is connected to the chassis 1508. In this arrangement the first port and second port of the hydraulic motor-pump contained within the smart valve is in fluid communication with the first chamber and second chamber of the actuator via hydraulic flow passages formed in the piston rod 1512. The smart valve is electrically connected to the vehicle electrical power, control and sensor systems via a connection 1516.

The arrangement depicted in FIG. 22 may be advantageous as the smart valve now occupies the space at the top of the suspension where the top suspension mount normally connects to the chassis, and as such many vehicle chassis construction have adequate clearance in this area. Another advantage is that the smart valve is not connected to the chassis and does not move with the wheel, thereby reducing the unsprung mass of the suspension, as well as mitigating a possible need for flex cables. While an embodiment where the smart valve is located coaxially with, and adjacent the top suspension mount of, the hydraulic actuator, embodiments in which the smart valve is located at or adjacent to a bottom mount of the hydraulic actuator are also contemplated.

The embodiments shown in FIGS. 20 and 15 depict a suspension arrangement where an upper and lower suspension member is used to locate the wheel assembly relative to the chassis. However, in an alternative embodiment, the active suspension actuator with integrated smart valve may be adapted into a McPherson strut arrangement, not depicted. In such an arrangement, the actuator body and piston rod may become a locating member of the wheel assembly. It is also possible to adapt the active suspension actuator to incorporate other arrangements such as an integral air spring, coil spring, torsion spring leaf/beam springs, an inverted actuator, a telescoping actuator, a self-pumping ride height adjustable device, or to incorporate alternate actuator arrangements such as monotube, twin tube, and/or triple tube configurations as the disclosure is not so limited.

Figure 23:
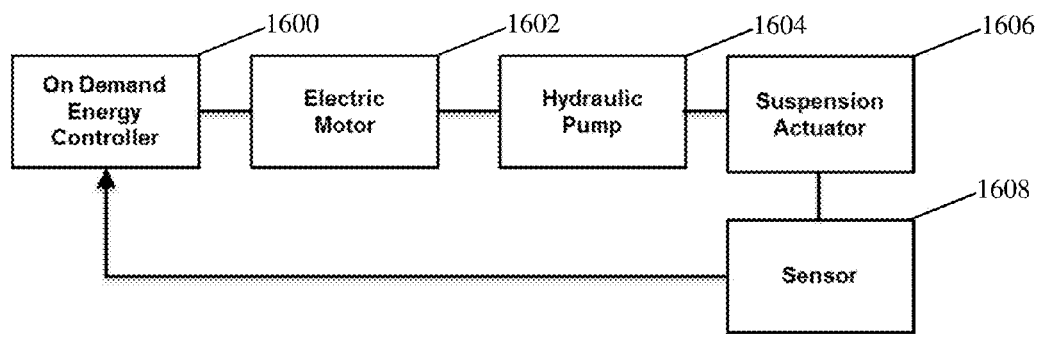
FIG. 23 is an exemplary block diagram of an active suspension with on-demand energy flow.

FIG. 23 is a schematic representation of one embodiment of a suspension system adapted to provide on demand energy. As illustrated in the figure, an on-demand energy controller 1600 is operatively coupled to an electric motor 1602 such that it controls a motor input of the electric motor. The electric motor 1602 is operatively coupled to a hydraulic motor-pump 1604 which is coupled to a hydraulic actuator 1606. Actuation of the hydraulic motor-pump 1604 controls a fluid flow into and out of the various portions of the actuator 1606 to create an actuation force of the actuator. The system also includes at least one sensor 1608 which is in electrical communication with the on-demand energy controller 1600. The sensor is adapted to detect one or more system conditions and provide that information to the on-demand energy controller so that the controller can control the overall suspension system to respond to that sensor input. While this system has been described with regards to an on-demand energy suspension system, it should be understood that any hydraulic actuator could also implement an on-demand energy control system as described elsewhere.

Figure 24:
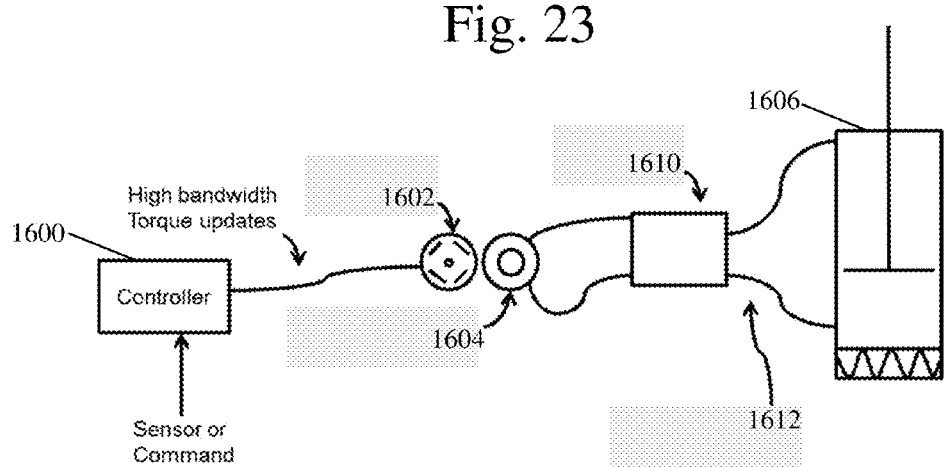
FIG. 24 is a schematic representation of an active suspension adapted to provide on-demand energy.
Figure 25:
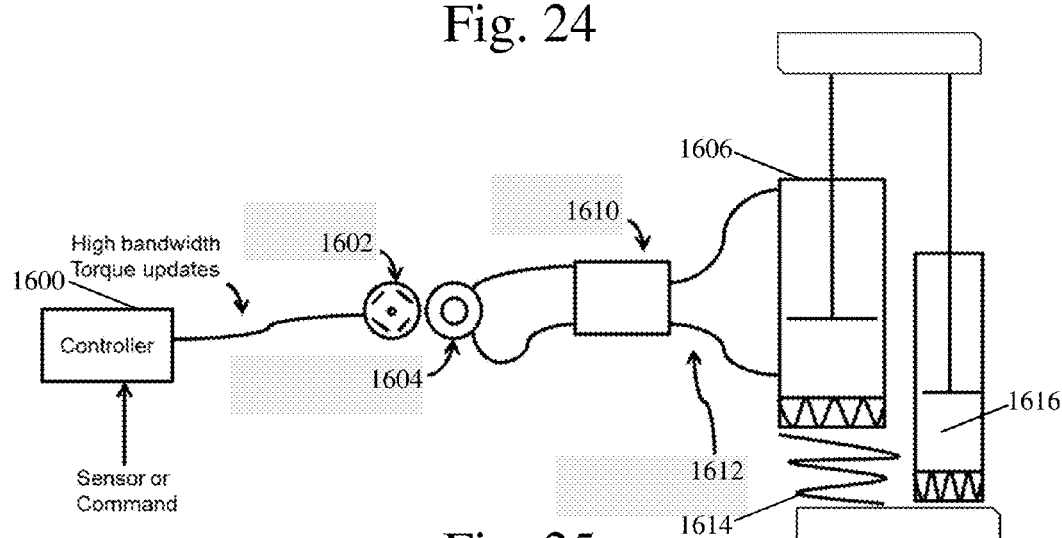
FIG. 25 is a schematic representation of an active suspension with a series spring and parallel damper adapted to provide on-demand energy.

FIGS. 24 and 25 are directed to embodiments of a suspension system that again includes a controller 1600, an electric motor 1602, a hydraulic motor-pump 1604, and a hydraulic actuator 1606. However, as depicted in the figures, unlike previous embodiments where they are directly connected, or closely coupled to one another, a fluid connection between the hydraulic actuator 1606 and the hydraulic motor-pump 1604 may include one or more valves 1610 as well as hydraulic tubes or hoses 1612. Depending on the particular embodiment, the hydraulic motor-pump 1604 may still be located near, or be attached to, the hydraulic actuator 1606 and include valves 1610 within or proximal to the hydraulic actuator 1606. However, embodiments in which the hydraulic motor-pump is remotely located from the hydraulic actuator 1606 are also contemplated. Regardless of the use of the one or more valves 1610 and the hydraulic tubes or hoses 1612, the electric motor 1602 may still be controlled in a manner as noted previously in order to dynamically control the system and provide on-demand energy and/or control within three or more quadrants of a force velocity domain.

In addition to the above, FIG. 25 also includes a compliant mechanism 1614 located in series with the hydraulic actuator 1606, as well as a damper 1616 located in parallel with the hydraulic actuator 1606. The compliant mechanism may be a spring (e.g. a coil spring, air spring, or other appropriate spring) or an elastomeric bushing (e.g. a suspension top mount or bottom mount) or any other appropriate mechanism capable of functioning like a spring. Additionally, the damper 1616, which is located in parallel with both the hydraulic actuator 1606 and the compliant mechanism 1614, may either be a semi-active damper or a passive damper as the disclosure is not so limited. Again, the electric motor 1602 may still be controlled in a manner as noted previously in order to dynamically control the system and provide on-demand energy and/or control within three or more quadrants of a force velocity domain. In one embodiment the controller may control the motor 1602 and one or more semi-active valves in the damper 1616 such that they are coordinated to operate in unison to affect body and/or wheel control. In some embodiments one or more valves 1610 are included that are electronically controlled and/or coordinated by the controller. Additionally, in certain embodiments, additional passive valves such as compression and rebound blowoff valves, which may reside on the piston head, not depicted, may also be included.

In some embodiments, the one or more valves 1610 depicted in FIGS. 24 and 25 and described above may correspond to the specific valving arrangements shown in FIGS. 26A-26D and as described in more detail below.

Figure 26B:
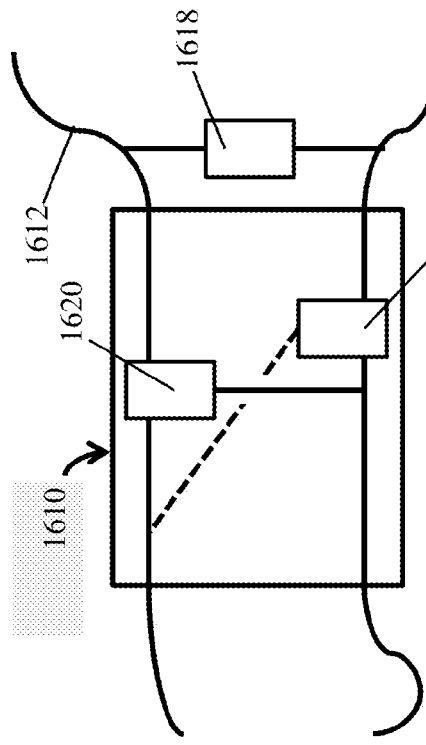
FIGS. 26A-26D are schematic representations of an active suspension including valves and dampers adapted to provide on-demand energy.
Figure 26D:
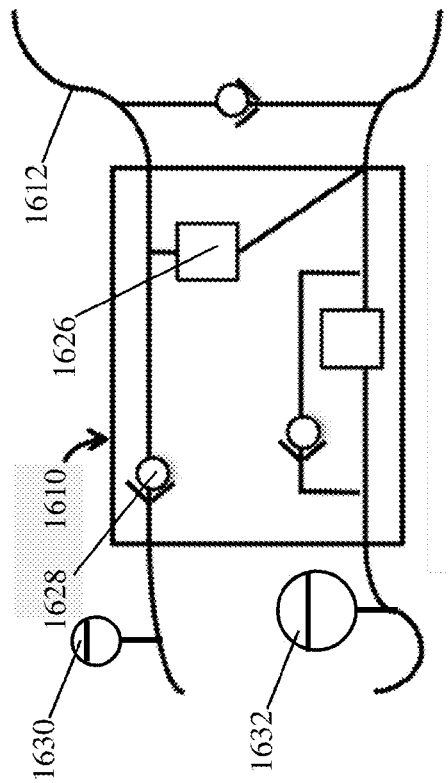
Figure 26A:
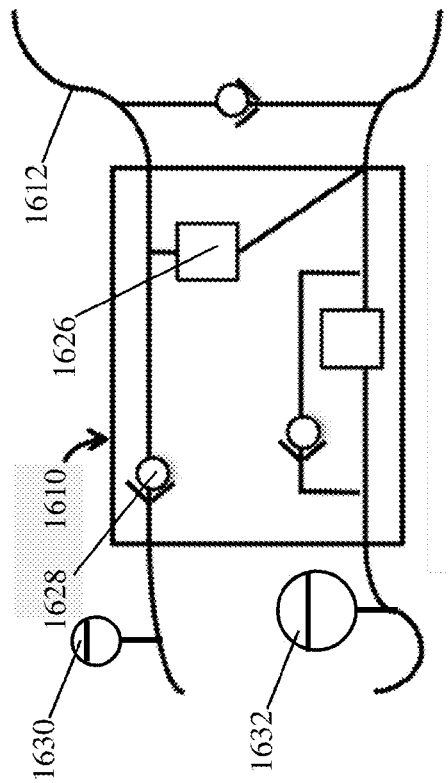

FIG. 26A depicts an embodiment where the hydraulic tubes or hoses 1612 are direct connections and the one or more valves 1610 are not used.

FIG. 26B presents an embodiment where the one or more valves 1610 include a blowoff valve 1618 (which may comprise separate rebound and compression digressive valves, which may further feature substantially no leakage below a first pressure threshold, a top diverter valve 1620 for use during rebound, and a bottom diverter valve 1622 for use during compression. The diverter valves provide fluid communication between the actuator volumes and the hydraulic motor-pump 1604 when fluid velocity is below a threshold, and provide dual communication between both the hydraulic motor-pump and a bypass channel when the fluid flow velocity threshold is exceeded. The bypass channel may further comprise a tuned restrictive valve to provide damping.

Figure 26C:
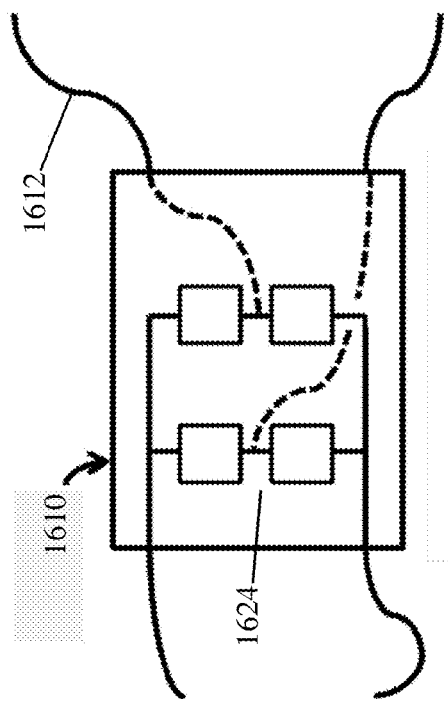

FIG. 26C depicts an embodiment where the one or more valves 1610 correspond to a controlled H-bridge rectifier 1624 that controls the fluid flow through the hydraulic hoses or tubes 1612. The H bridge rectifier 1624 includes electronically controlled valves, such as a solenoid valve or other appropriate valve. Additionally, a check valve may be located in parallel to each electronically controlled valve, not depicted, such that external movement into the hydraulic actuator 1606 may allow fluid to flow from the actuator body, through the check valves, towards the hydraulic motor-pump. These reverse check valves provide regenerative operation such that external input to the actuator creates a rotation of the hydraulic motor-pump 1604.

FIG. 26D depicts an embodiment of the one or more valves 1610 including an electrically controlled valve 1626 located on one hydraulic tube or hose 1612 and another electrically controlled valve 1626 controlling flow of fluid between both of the hydraulic tubes or hoses 1612. The embodiment also includes several passive check valves 1628 to control fluid relative to the electrically controlled valves 1626 and the two hydraulic hoses or tubes 1612 so that in an actuated compression stroke, on-demand fluid pressure acts on the annular area (piston area minus the piston rod area), and in an actuated extension stroke, on-demand fluid pressure acts on the piston rod area. The presence of such valving in addition to on-demand energy control may improve inertia response of the system, provide unidirectional flow, and improve harshness characteristics of some embodiments. In such embodiments force on the actuator may be created by a pressure in the actuator 1606 that is at least partially decoupled from the pressure created by the hydraulic motor-pump. The hydraulic motor-pump may be operated at high bandwidth (such as on a per wheel or body event basis), while the electronically controlled valving may also operate at least at this frequency. While specific valving arrangements are described above, it should be understood that embodiments using other types of valving arrangements and/or no separate valving other than that provided by a smart valve are also contemplated.

Figure 27:
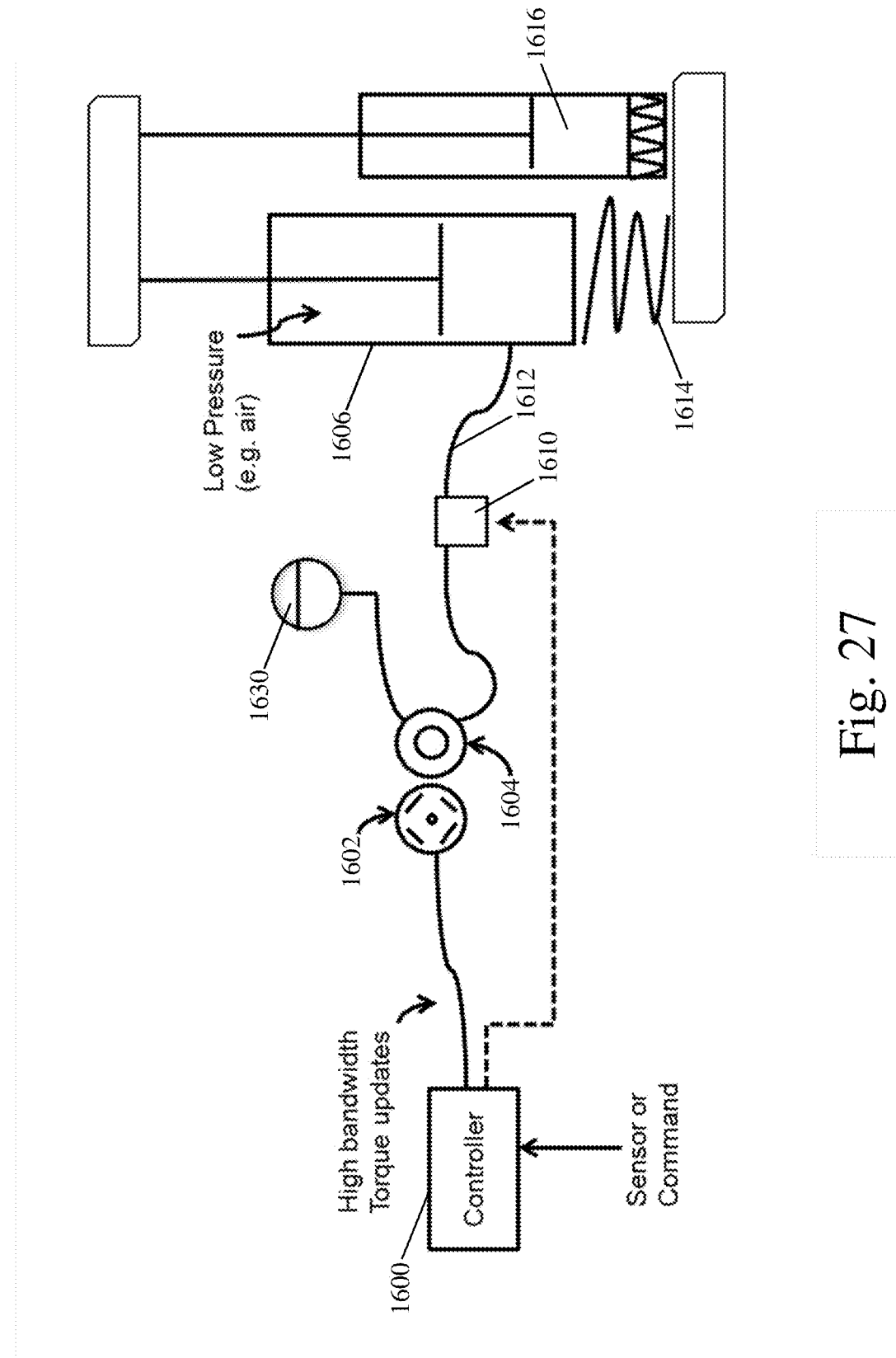
FIG. 27 is a schematic representation of an active suspension comprising a single acting actuator adapted to provide on-demand energy.

FIG. 27 is directed to an embodiment of a suspension system that again includes a controller 1600, an electric motor 1602, a hydraulic motor-pump 1604, and a hydraulic actuator 1606. The embodiment also includes a low pressure reservoir or accumulator 1630 in fluid connection with a first port of the hydraulic motor-pump 1604. A fluid connection between the hydraulic actuator 1606 and a second port of the hydraulic motor-pump 1604 may include one or more valves 1610 as well a hydraulic tube or hose 1612. Depending on the particular embodiment, the hydraulic motor-pump 1604 may still be located near, or be attached to, the hydraulic actuator 1606. However, embodiments in which the hydraulic motor-pump is remotely located from the hydraulic actuator 1606 are also contemplated. Regardless of the use of the one or valves 1610 and the hydraulic tube or hose 1612, the electric motor 1602 may still be controlled in a manner as noted previously in order to dynamically control the system and provide on-demand energy and/or control within three or more quadrants of a force velocity domain.

In the embodiment depicted the actuator is a single acting actuator, wherein the one or more valves may contain a check valve that checks against flow of fluid from the single acting actuator to the hydraulic motor-pump. This check valve may be in parallel to an electrically controlled valve that controls flow of fluid from the single acting actuator to the hydraulic motor-pump. In another embodiment, a single electrically controlled valve may control flow of fluid to and from the single acting actuator and the hydraulic motor-pump. The non-controlled side of the single acting actuator may be open to atmospheric pressure or may contain a low pressure gas. The hydraulic connection 1612 may connect to a compression side of the actuator or to the extension side of the single acting actuator.

In some embodiments, the system depicted in FIG. 27 may be controlled as follows: to create an active extension force, the controller 1600 creates a torque in the electric motor 1602, which puts a torque on the hydraulic motor-pump 1604, creating pressure. The pump may operate in a forward direction, wherein pressure from the hydraulic motor-pump moves fluid in a first direction from the hydraulic motor-pump, through the valve 1610 (such as a check valve free flow path), and into the controlled side of the actuator thus creating an extension force. This extension force operates on a compliant mechanism 1614 that will be described below. To create a compression compliance, during which the actuator provides a substantially low force, the valve 1610 may be controlled by the controller 1600 to open (such as an electronically controlled solenoid or servo valve), allowing fluid to flow from the controlled side of the actuator to the hydraulic motor-pump 1604, and into the reservoir 1630. In this case, the electric motor is backdriven such that energy may flow from the motor into the controller in a regenerative mode of operation. In one control mode, the electric motor may control the hydraulic motor-pump to actively pump fluid from the controlled side of the actuator to the reservoir 1630. By controlling torque in the motor dynamically (and in some embodiments in conjunction with valves in 1610), an instantaneous force may be provided to the suspension.

In another embodiment, the system of FIG. 27 may be accomplished without any valve 1610, such that holding force is accomplished by directly controlling the electric motor 1602. One possible benefit of using valving, however, is to provide low energy holding force operation.

In addition to the above, FIG. 27 also includes a compliant mechanism 1614 located in series with the hydraulic actuator 1606, and a damper 1616 located in parallel with the hydraulic actuator 1606. The compliant mechanism may be a spring (e.g. a coil spring, air spring, or other appropriate spring) or an elastomeric bushing (e.g. a suspension top mount or bottom mount) or any other appropriate mechanism capable of functioning like a spring. Additionally, the damper 1616, which is located in parallel with both the hydraulic actuator 1606 and the compliant mechanism 1614, may either be a semi-active damper or a passive damper as the disclosure is not so limited. Again, the electric motor 1602 may still be controlled in a manner as noted previously in order to dynamically control the system and provide on-demand energy and/or control within three or more quadrants of a force velocity domain.

Figure 28:
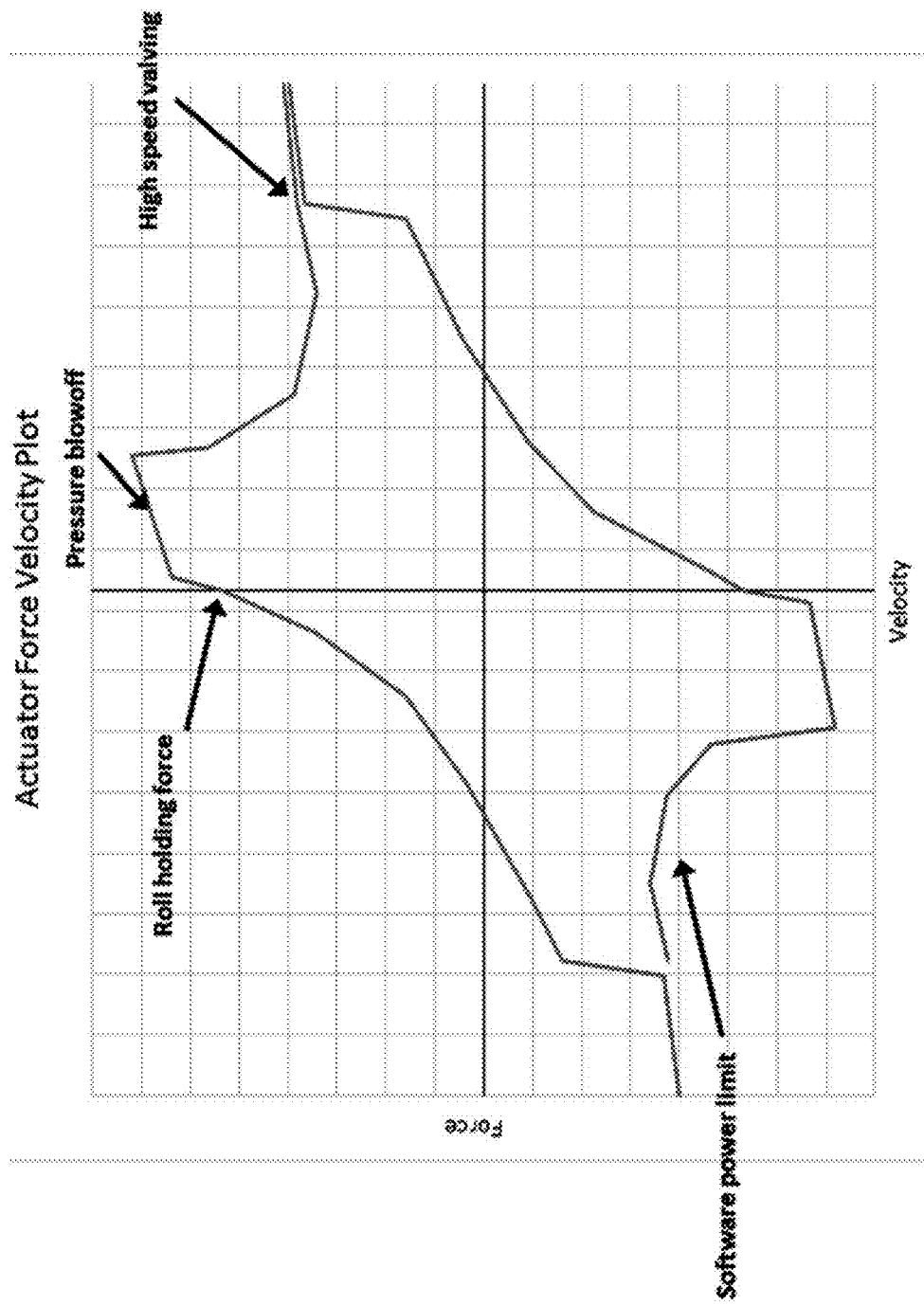
FIG. 28 is a graph of a four operational quadrant force velocity domain for an active suspension system.

FIG. 28 is a graph showing the control and tuning regimes for one embodiment of an active suspension system capable of providing on demand energy flow as described herein. In addition to operating within the four quadrants of the force velocity domain, the graph also indicates regions corresponding to roll holding force, pressure blowoff (which may be individual valves for each of compression and rebound), high-speed valving (such as a diverter valve described elsewhere in this specification), and software power limits (such as controlling a maximum current or a maximum current times velocity in the motor controller). These various concepts are described in more detail elsewhere.

In some embodiments, a hydraulic actuator and/or suspension system is associated with an electronics architecture that uses an energy bus with voltage levels that can be used to signal active suspension system conditions. For example, an active suspension with on demand energy delivery may be powered by a loosely regulated DC bus that fluctuates between about 40 and 50 volts. When the bus is below a lower threshold, for example, 42 volts, the active suspension controller for each actuator may reduce its energy consumption by operating in a more efficient state, reducing the amount of force it commands, and/or reducing how long it commands a force (e.g. during a roll event, the controller allows the vehicle to increasingly lean by relaxing the anti-roll mitigation to save energy). Additionally, a lower voltage may signal the active suspension actuators to bias towards a regenerative mode if the actuator is capable of energy recovery. Similarly, when a high voltage is detected, the actuators may reduce energy recovery or dissipate damping energy in the windings of a motor in order to prevent an overvoltage condition. While this example was described using thresholds, it may also be implemented in a continuous manner wherein the active suspension is simply controlled as some function of the voltage of its power bus. Such a system may have several advantages. For example, allowing the voltage to fluctuate increases the usable capacity of certain energy storage mechanisms such as super capacitors on the bus. It may also reduce the number of data connections in the system, or reduce the amount of data that needs to be transmitted over data connections such as CAN. In some embodiments the power bus may even be used to transmit data through a variety of communication of power line modulation schemes in order to transmit data such as force commands and sensor values.

In another embodiment, an active suspension as described above is associated with a vehicular high power electrical system that operates at a voltage different from (e.g. higher than) the vehicle's primary electrical system. For example, multiple active suspension power units may be energized from a common high power electrical bus operating at a voltage such as 48 volts, with a DC/DC converter between the high power bus and the vehicle's electrical system. Several devices in addition to the active suspension may be powered from this bus, such as, for example, the electric power steering (EPS). In such an embodiment, the high power bus is galvanically isolated from the vehicle's primary electrical system using a transformer-based DC/DC converter between the two buses. In some embodiments the high power electrical system may be loosely regulated, with devices allowing voltage swing within some range. In some embodiments the high power electrical system may be operatively connected to an appropriate form of energy storage such as capacitors and/or rechargeable batteries. These energy storage devices can be directly connected to the bus and referenced to ground; connected between the vehicle electrical system and the high power electrical system; or connected via an auxiliary DC/DC converter. Certain other connections may also exist, including, for example, a split DC/DC converter connecting the vehicle electrical system, the high power bus, and the energy storage.

Without wishing to be bound by theory, combining an active suspension with a power bus that is independent of the vehicle's electrical system may provide several advantages. First, the vehicle's electrical system may be isolated from voltage spikes and electrical noise from high power consumers such as suspension actuators. The DC/DC converter may be also be adapted to employ dynamic energy limits so that too many loads do not overtax the vehicle's electrical system. By running the high power bus at a voltage higher than the vehicle's electrical system, the system may also operate more efficiently by reducing current flow in the power cables and the motor windings. In addition, the active suspension actuators may be able to operate at higher velocities for a given motor winding.

In some embodiments, the suspension systems described above, are associated with an active safety system adapted to control the suspension system to improve the safety of the vehicle during a collision or dangerous vehicle state. In one exemplary embodiment, the suspension system is controlled to deliver a vehicle height adjustment when an imminent crash is detected in order to ensure the vehicle's bumper collides with the obstacle (for example, a stopped SUV ahead) so as to maximize the crumple zone or minimize the negative impact on the driver and passengers in the vehicle. In such an embodiment, the suspension may adjust to a set ride height to optimize performance during any sort of pre or post-crash scenario. In another embodiment, the suspension system can adjust wheel force and tire to road dynamics in order to improve traction during ABS braking events or electronic stability program (ESP) events. For example, the wheel can be pushed towards the ground to temporarily increase the contact force (by utilizing the vertical inertia of the vehicle). This may either be sustained for a predetermined duration or it may be pulsed over multiple shorter durations as the disclosure is not so limited.

In the above noted embodiments, the suspension systems as described herein can be utilized to rapidly change the energy and performance delivered by the suspension on a per event basis in order to respond to an imminent safety threat. By exploiting the fast response time characteristics of these suspension systems in combination with an active safety system, where corrective action often has to occur in about 100 ms or less, vehicle dynamics such as height, wheel position, and wheel traction, may be rapidly adjusted and can operate in unison with other safety systems and controllers on the vehicle to increase vehicle safety.

In one specific embodiment, a suspension as described herein is used as an active truck cab stabilization system to improve comfort, among other benefits. In one embodiment geared towards European-design trucks, four hydraulic actuation systems are disposed between the chassis of a heavy truck and the cabin. A spring sits in parallel with each actuator (i.e. coil spring, air spring, or leaf spring, etc.), similar to the spring and actuator depicted in FIG. 5, and each assembly is placed roughly at the corner of the cabin. Sensors on the cabin and/or the chassis sense movement, and a control loop controlling the active suspension commands the actuators to keep the cabin roughly level. In an embodiment for North American-design trucks, two actuators are used at the rear of the cabin, with the front of the cabin hinged to the chassis. In some embodiments such a suspension may contain modified hinges and bushings to allow greater compliance in yaw, pitch, and/or roll. In a related embodiments, a suspension system incorporating this type of hydraulic actuators may be applied in other appropriate applications, such as, for example, on an isolated truck bed or trailer to reduce vibration transferred to the truck load.

Here, the system might employ two active actuators to stabilize the cab. The system uses a plurality of sensors (e.g. accelerometers) and/or vehicle data (e.g. steering angle) in order to sense or predict cab movement, and a control system sends commands to the actuators in order to stabilize the cab. Such cab stabilization provides significant improvement in comfort and may reduce maintenance requirements in the truck.

In another related embodiment, a single hydraulic actuator may be coupled to a suspended seat such as, for example, a truck seat. In this embodiment, the seat rides on a compliant device such as an air spring, and the actuator is connected in parallel to this complaint device. Sensors measure acceleration and control the seat height dynamically to reduce heave input to the individual sitting on the seat. In some instances the actuator may be placed off the vertical axis in order to affect motion in a different direction. By using a mechanical guide, this motion might not be limited to linear movement. In addition, multiple actuators may be used to provide more than one degree of freedom for controlling movement of the seat.

A long haul truck containing an active suspension may especially benefit by improving driver comfort and reducing driver fatigue. By using an active suspension with on demand energy delivery, the system can be smaller, easier to integrate, faster response time, and more energy efficient.

In another embodiment, a suspension system as described herein is associated with an air spring suspension in which static ride height is nominally provided by a chamber containing compressed air. In such one embodiment, the hydraulic actuator of the suspension system is incorporated in a standard hydraulic triple tube damper, with a side-mounted hydraulic motor-pump and electric motor, which may or may not be integrated with the housing as described above. The hydraulic motor-pump and electric motor may be placed towards the base of the actuator body such that an airbag with folding bellows can fit around the actuator on an upper portion of the housing. In such an embodiment, a standard air suspension airbag can be placed about the actuator body towards the top of the unit. In another embodiment, the suspension system includes hoses exiting the hydraulic actuator housing near the bottom and leading towards an external power pack containing a hydraulic motor-pump and an electric motor. As such, the physical structures of the active suspension actuator and the air spring can again be joined on the top of the housing.

In a related embodiment, the control systems for a suspension system and an air suspension system may either be in electrical communication with one another or integrated together. In such an embodiment, air pressure in the air suspension may be controlled in conjunction with the commanded force in the hydraulic actuator of the suspension system. This combined control may either be for the entire air spring system, or it may be implemented on a per-spring (per wheel) basis. The frequency of this control may be on a per event basis and/or based on general road conditions. Generally, the response time of the active suspension actuator is faster than the air spring, but the air spring may be more effective in terms of energy consumption at holding a given ride height or roll force. As such, a controller may control the active suspension for rapid events by increasing the energy instantaneously in the on-demand energy system, while simultaneously increasing or decreasing pressure in the air spring system, thus making the air spring effectively an on-demand energy delivery device, albeit at a lower frequency. By combining the controlled aspects of an active suspension that uses on-demand energy with an air spring that can also be controlled to dynamically change spring force, greater forces may be achieved in the suspension, adjustments can be made more efficiently, and the overall ride experience can be improved.

In some embodiments, a suspension system as described herein is coupled with one or more anti-roll bars in a vehicle. In one specific embodiment, a standard mechanical anti-roll bar is attached between the two front wheels and a second between the two rear wheels. In another embodiment a cross coupled hydraulic roll bar (or actuator) is attached between the front left and the rear right wheels, and then another between the front right and the rear left wheels. Since the active suspension will often counteract the roll bar during wheel events, it may be desirable for efficiency and performance reasons to completely eliminate the roll bar (wherein the active suspension with on demand energy acts as the only vehicular roll bar), or to attach a novel roll bar design. In one embodiment, a downsized anti roll bar is disposed between the wheels, such that there is a large amount of spring compliance in the bar. In another embodiment, an anti roll bar with hysteresis is disposed between the two front and/or the two rear wheels. Such a system may be accomplished with a standard roll bar that has a rotation point in the center of the roll bar, wherein between two limits the two ends of the bar can twist freely. When the twist reaches some angle, a limit is reached and the twist becomes stiff. As such, for certain angles between some negative twist and some positive twist from level, the bar is able to move freely. Once the threshold on either side is reached, the twist becomes more difficult. Such a system can be further improved by using springs or rotary fluid dampers such that engagement of the limit is gradual (for example, prior to reaching the limit angle a spring engages and twist resistance force increases), and/or it is damped (e.g. using a dynamic mechanical friction or fluid mechanism).

In another embodiment, a suspension system may be coupled with an active roll stabilizer system. The active roll stabilizer system may either be hydraulic, electromechanical, or any other appropriate structure.

Use of anti-roll bar technologies and/or active roll stabilizer systems in connection with the suspension system, and especially an active suspension, as described herein may be especially beneficial when a vehicle experiences high lateral accelerations where roll force is greatest and may exceed a maximum force capability of the suspension actuator. Thus, by implementing anti-roll bar technologies and/or active roll stabilizer systems that primarily operate at higher accelerations, roll force levels, and/or roll angles as compared to the suspension system, roll performance can be improved. While several technologies are disclosed to assist in mitigating vehicle roll, the disclosure is not limited in this regard as there are many suitable devices and methods of providing an anti-roll force to supplement a suspension.

As noted above, it is desirable to provide a fast response time for either a hydraulic actuation system and/or a suspension system. However, without wishing to be bound by theory, inertia of the actuation system itself and components associated with it may impact the ability to respond quickly due to inertial forces limiting the response of the system. Consequently, in some embodiments, it is desirable to mitigate the impact of the system inertia on a response of the system. As described in more detail below, this may be accomplished in a variety of ways.

In one embodiment, a hydraulic actuation system and/or a suspension system includes rotary elements made from low inertia materials in order to reduce the amount of energy needed to accelerate these elements and thus increase the response time of the system. For example, the hydraulic pump and/or motor shaft may be produced from an engineered plastic with a lower mass in order to reduce rotary inertia. This may also have an additional benefit for systems including a positive displacement pump by reducing the transmissibility of high frequency inputs into the actuator (i.e. a graded road at high speed input on the wheel). In another exemplary embodiment, a system might include a low-inertia hydraulic motor-pump such as a gerotor. In addition, the electric motor coupled to the hydraulic pump may also have a low inertia, such as by using an elongated but narrow diameter rotor of the motor. In one such embodiment, the diameter of the rotor is less than the height of the rotor. Additionally, a system may use features such as bearings, a low startup torque hydraulic motor-pump, or hydrodynamic bearings in order to reduce startup friction of the rotating assembly.

In another embodiment, a hydraulic actuation system or suspension system includes an inertia buffer located in series to help mitigate inertial effects. The inertia buffer may either be located externally to hydraulic actuator, or it may be integrated into the hydraulic actuator as the disclosure is not so limited. An inertia buffer may be embodied in a number of different ways. For example, an inertia buffer may be embodied as fluid leakage around the hydraulic motor-pump, an appropriately sized orifice arranged in parallel with the hydraulic motor-pump, an elastic coupling between the hydraulic motor-pump and electric motor, a damper and spring combination located between the piston head and actuator body, an active bushing, and/or any other appropriate device or configuration capable of at least partially decoupling movement of the electric motor, hydraulic motor-pump, and/or hydraulic actuator from one another.

In yet another embodiment, the hydraulic actuation system and/or a suspension system is controlled using an algorithm to both predict and compensate for inertia of the system. In such an embodiment, the algorithm predicts inertia of the electric motor and/or hydraulic motor-pump and controls the a motor input of the electric motor, e.g. a motor torque, to at least partially reduce the effect of inertia on a response of the system. For example, for a hydraulic active suspension including a hydraulic motor-pump operatively coupled to an electric motor, a fast pothole hit to a wheel will create a surge in hydraulic fluid pressure and accelerate the hydraulic motor-pump and electric motor. However, an inertia of the rotary elements, which are the hydraulic motor-pump and electric motor in this case, will resist this acceleration, creating a force in the actuator. This force will counteract compliance of the wheel. This may create harshness in the ride of the vehicle, and may be undesirable. In contrast, a system employing predictive analytic algorithms may factor inertia of the various rotary elements into the active suspension control and may command a motor torque that is lower than the desired torque during acceleration events, and at a higher torque that the desired torque during deceleration events. The delta between the command torque of the motor and the desired torque (such as the control output from a vehicle dynamics algorithm) is a function of the rotor or actuator acceleration. Additionally, the mass and physical properties of the rotor may be incorporated in the algorithm. In some embodiments acceleration is calculated from a rotor velocity sensor (by taking the derivative), or by one or two differential accelerometers on the suspension. In some cases the controller employing inertia mitigation algorithms may actively accelerate the mass.

Without wishing to be bound by theory, certain hydraulic motors-pumps, such as a gerotor, produce a pressure ripple during operation. Depending upon the frequency of operation, this pressure ripple may result in vibrations that are either audibly or physically noticeable. Consequently, in some embodiments, a hydraulic actuation system and/or a suspension system may include an appropriate ripple cancellation method and/or device. For example, a motor input of the electric motor may be controlled to produce a varying pressure with a profile similar to the pressure ripple but 180° out of phase. In another exemplary embodiment, position-timed ports communicating with a chamber containing a compressible medium is used to reduce the pressure ripple. Other methods of reducing a pressure ripple might also be used as the disclosure is not so limited.

Example

Controlling an Active Suspension System in Response to Wheel Events

Figure 8:
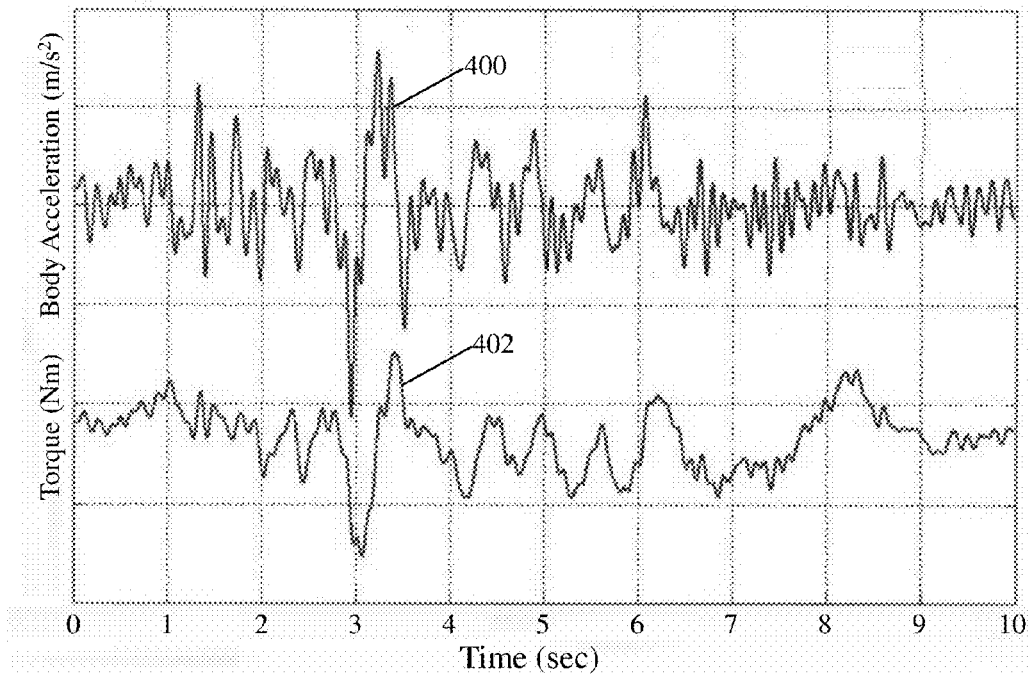
FIG. 8 is a graph of body acceleration and motor torque illustrating active suspension control on a per-event basis.

FIG. 8 demonstrates an active suspension motor torque 402 control system that updates in response to wheel events determined from sensed body acceleration 400. As can be seen in the chart, changes to the commanded motor torque 402 occur at a similar frequency over the presented time period to body acceleration 400, which is caused by wheel events such as bumps, hills, and potholes, and driver inputs such as turns, braking, etc.

Figure 9:
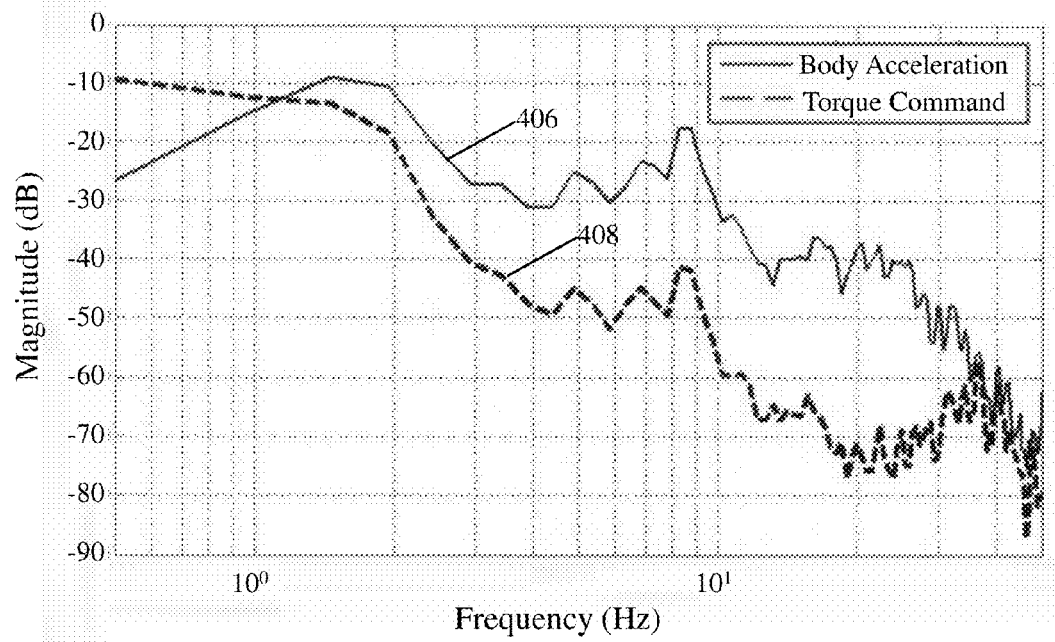
FIG. 9 is a Bode diagram of frequency versus magnitude of torque command correlated to body acceleration.

FIG. 9 shows the same data in terms of frequency instead of time. The shape of the motor torque 408 magnitude command with respect to frequency roughly traces the shape of the body acceleration 406 magnitude with respect to frequency. This trace of the control algorithm demonstrates that not only is commanded motor torque updated at frequencies at least as high as wheel events are occurring, but also that there is high correlation between the motor torque magnitude and the body acceleration magnitude.

Example

System Natural Frequency Derivation

As noted above in some embodiments, it is desirable for a hydraulic actuation system and/or suspension system to respond quickly to commands because it directly affects the ability of the system to operate in a closed-loop control system.

Figure 10:
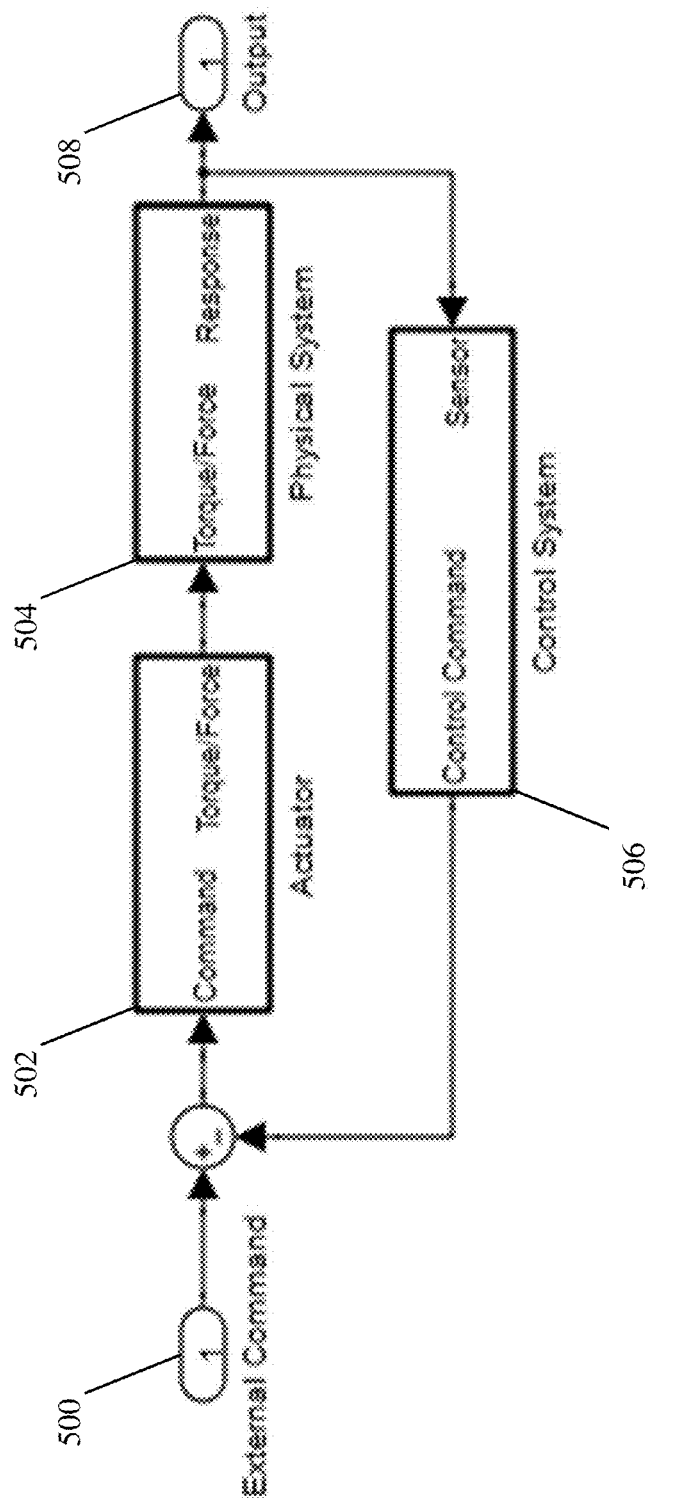
FIG. 10 is an exemplary block diagram of a feedback loop of an active suspension system.

Referring to FIG. 10, in a feedback loop, the time from receiving an external command 500, commanding a desired output 502, and the physical system subsequently responding at 504 affects the maximum frequency at which the overall system can be controlled (its bandwidth). This is in addition to response times associated with subsequent sensing and commands at 506 to obtain a desired output at 508 using the closed loop command structure. Therefore, and without wishing to be bound by theory, the ability of a closed-loop system to respond to high frequency inputs (by either rejecting them or following them), will be limited in part by the actuator's response time.

The system response time can be characterized in many different ways, but is most often described as the time between a command change, and the time when the resulting actuator output reaches that command.

Figure 11:
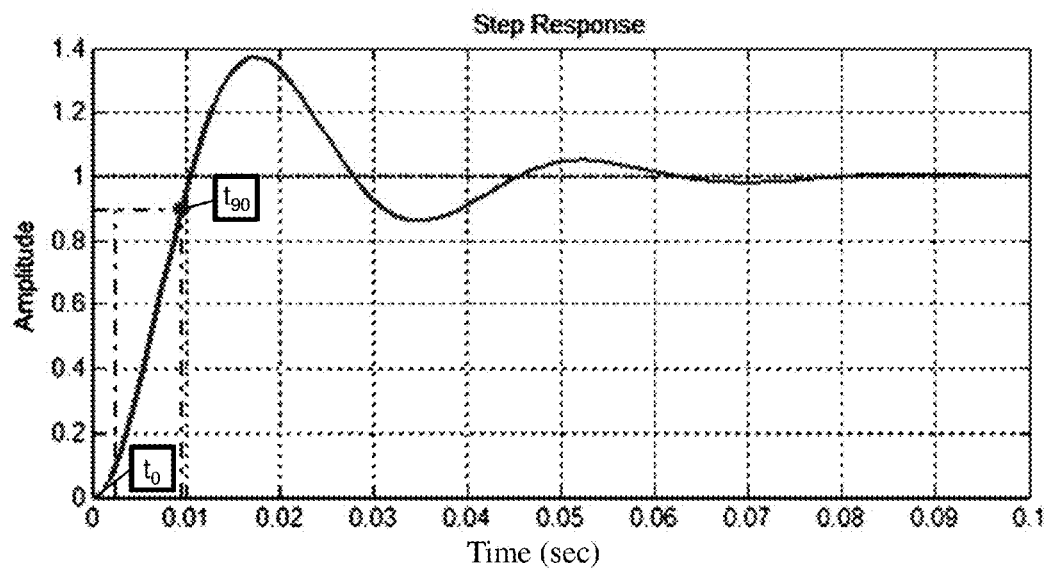
FIG. 11 is a calculated force response illustrating a response time, an overshoot, and subsequent force oscillation.

As illustrated in FIG. 11, a response time of a physical system is commonly characterized as the time between the command change (t0) and the time the output reaches 90% of its steady-state value as a result of that command change (t90).

Many common types of actuators can be characterized at least as a second-order system, where the force or torque output of the actuator, divided by the commanded input, can be characterized as a function of frequency by the following equation $$\frac{\text{Response}}{\text{Command}} = \frac{\text{gain}}{s^2 + 2\xi\omega s + \omega^2}$$

Where s is the complex frequency variable, is the system damping, ands is the natural frequency of the system. While a second-order system has been described above, it should be understood that this has been done for modeling convenience and other models including higher order models might also be used.

Figure 12:
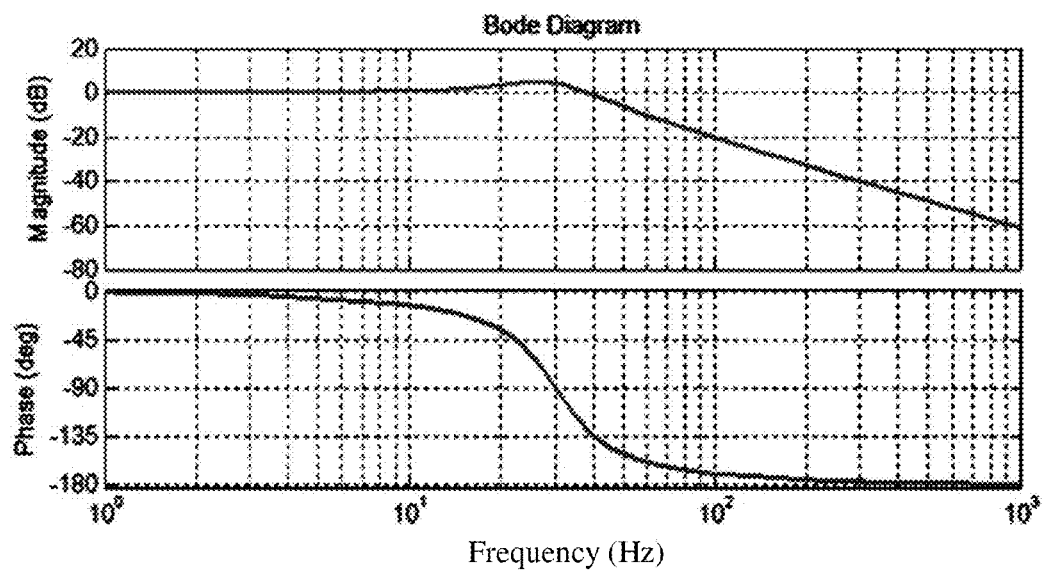
FIG. 12 is a calculated Bode diagram.

An exemplary Bode diagram is presented in FIG. 12 and illustrates the predicted frequency response for a simple second order system.

As an example, in an electro-hydraulic active suspension actuator, including an electric motor, operatively coupled to a back-drivable hydraulic motor-pump, and coupled to a hydraulic piston, the system can be characterized through its reflected inertia, its system compliance, and the inherent system damping.

The system's transfer function now becomes $$\frac{\text{Force}}{\text{Torque}} = \frac{n}{s^2 + 2B\sqrt{\frac{K}{Jn^2}}\, s + \frac{K}{Jn^2}}$$

Where s is again the complex frequency vector, B is the inherent system damping, 1/K is the total compliance (i.e. the inverse of the system stiffness K), J is the total system inertia, and n is the motion ratio. Typically, the ratio $$\sqrt{\frac{K}{Jn^2}}$$

Without wishing to be bound by theory, this ratio typically is defined as being equal to $2\pi f$ where f is the natural frequency. The ratio is also defined as the frequency at which the total kinetic energy and the total potential energy in the system are equal in magnitude and can thus trade off during the response of the system to an input or a disturbance. Additionally, it can be shown that the response time of a second order system is directly proportional to the natural frequency, and that the response time increases with the system damping while the overshoot decreases. In a current active suspension system design, a natural frequency of about 30 Hz gives a response time of less than about 10 ms.

As noted above, in some embodiments, response times for a hydraulic actuation system and/or an active suspension system may be less than about 150 ms to provide a desired performance, which implies a system natural frequency greater than about 2 Hz, or a product of system compliance times reflected system inertia, or alternatively a ratio of the reflected system inertia to the system stiffness, of less than about 0.0063.

Example

Natural Frequency Design Variations

Tables I-III present the ratio of reflected system inertia to system stiffness for natural frequencies ranging between about 2 Hz to 100 Hz. Additionally, the tables present different design variations for the desired natural frequencies given a particular reflected system inertia, stiffness, and/or motion ratio. Specifically, Table I presents variations in system stiffness for a given reflected system inertia of 20 kg for various natural frequencies. Table II presents variations in system inertia for a given motion ratio of 600 radians/m and a system stiffness of $5\times10^5$ N/m. Table III presents variations in motion ratio for a given system stiffness of $5\times10^5$ N/m and system inertia of $5\times10^{-5}$ kg m$^2$. While particular exemplary combinations of these design criteria are presented below, it should be understood that the disclosure is not limited to only these parameters and that systems including system inertias, motion ratios, and stiffnesses both greater than and less than those presented below are also contemplated.

TABLE I

| Natural Freq. (Hz) | $Jn^2/K$ (s$^2$) | $Jn^2$ (kg) | K (N/m) |
|---|---|---|---|
| 2 | 6.3E−03 | 20 | 3.2E+03 |
| 5 | 1.0E−03 | 20 | 2.0E+04 |
| 10 | 2.5E−04 | 20 | 7.9E+04 |
| 20 | 6.3E−05 | 20 | 3.2E+05 |
| 30 | 2.8E−05 | 20 | 7.1E+05 |
| 40 | 1.5E−05 | 20 | 1.3E+06 |
| 50 | 1.0E−05 | 20 | 2.0E+06 |
| 100 | 2.5E−06 | 20 | 7.9E+06 |

TABLE II

| Natural Freq. (Hz) | $Jn^2/K$ (s$^2$) | n (rad/m) | K (N/m) | J (kg m$^2$) |
|---|---|---|---|---|
| 2 | 6.3E−03 | 600 | 5.0E+05 | 8.8E−03 |
| 5 | 1.0E−03 | 600 | 5.0E+05 | 1.4E−03 |
| 10 | 2.5E−04 | 600 | 5.0E+05 | 3.5E−04 |
| 20 | 6.3E−05 | 600 | 5.0E+05 | 8.8E−05 |
| 30 | 2.8E−05 | 600 | 5.0E+05 | 3.9E−05 |
| 40 | 1.6E−05 | 600 | 5.0E+05 | 2.2E−05 |
| 50 | 1.0E−05 | 600 | 5.0E+05 | 1.4E−05 |
| 100 | 2.5E−06 | 600 | 5.0E+05 | 3.5E−06 |

TABLE III

| Natural Freq. (Hz) | $Jn^2/K$ (s$^2$) | K (N/m) | J (kg m$^2$) | n (rad/m) |
|---|---|---|---|---|
| 2 | 6.3E−03 | 5.0E+05 | 5.0E−05 | 7962 |
| 5 | 1.0E−03 | 5.0E+05 | 5.0E−05 | 3185 |
| 10 | 2.5E−04 | 5.0E+05 | 5.0E−05 | 1592 |
| 20 | 6.3E−05 | 5.0E+05 | 5.0E−05 | 796 |
| 30 | 2.8E−05 | 5.0E+05 | 5.0E−05 | 531 |
| 40 | 1.6E−05 | 5.0E+05 | 5.0E−05 | 398 |
| 50 | 1.0E−05 | 5.0E+05 | 5.0E−05 | 318 |
| 100 | 2.5E−06 | 5.0E+05 | 5.0E−05 | 159 |

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A device comprising:
   a housing including a first port and a second port and a pressure sealed barrier located in the housing disposed between a first oil filled portion of the housing and a second portion of the housing;
   a hydraulic motor-pump disposed within the first portion of the housing, wherein the hydraulic motor-pump controls a flow of fluid between the first port and the second port;
   an electric motor disposed within the housing and operatively coupled to the hydraulic motor-pump; and
   a controller electrically coupled to the electric motor and disposed within the housing, wherein the controller controls a motor input of the electric motor.

2. The device of claim 1, wherein at least a portion of the pressure sealed barrier allows the transmission of a magnetic flux through the pressure sealed barrier.

3. The device of claim 2, further comprising a sensor, and wherein at least a portion of the magnetic flux transmitted through the at least a portion of the pressure sealed barrier is measured by the sensor.

4. The device of claim 1, wherein the electric motor is at least partially located in the first portion of the housing.

5. The device of claim 1, wherein the controller is located in the second portion of the housing.

6. The device of claim 1, wherein the hydraulic motor-pump and the electric motor are located in the first portion of the housing.

7. The device of claim 6, wherein the controller is located in the second portion of the housing.

8. The device of claim 7, wherein the pressure sealed barrier is a bulkhead that is exposed to pressure variations of the hydraulic fluid on one side and to a lower pressure on a second side.

9. The device of claim 7, further comprising a rotary position sensor located in the second portion of the housing, wherein the electric motor is a rotary electric motor that is coupled the hydraulic motor-pump by a shaft located in the first portion of the housing, wherein the rotational position of the shaft is detected by the rotary position sensor.

10. The device of claim 1, wherein the electric motor and hydraulic motor-pump have a combined reflected system inertia and a combined system compliance, and wherein a product of the system compliance times the reflected system inertia is less than or equal to 0.0063 $s^{-2}$.

11. The device of claim 10, wherein a product of the system compliance times the reflected system inertia is greater than or equal to $2.5 \times 10^{-6}$ $s^{-2}$.

12. The device of claim 1, wherein a response time of the device is between or equal to 10 ms and 150 ms.

13. The device of claim 1, wherein a natural frequency of the device is between or equal to 2 Hz and 100 Hz.

14. The device of claim 1, wherein the housing is attached to and in hydraulic communication with a first hydraulic actuator.

15. The device of claim 14, wherein the first port and the second port are in fluid communication with an extension volume and a compression volume of the hydraulic actuator when the hydraulic actuator is attached to the housing.

16. The device of claim 14, wherein controlling the motor input of the electric motor directly controls actuation of the hydraulic actuator when the hydraulic actuator is attached to the housing.

17. The device of claim 14, further comprising one or more valves located between the hydraulic motor-pump and the hydraulic actuator when the housing is attached to the hydraulic actuator.

18. The device of claim 1, wherein the motor input is at least one of motor position, voltage, torque, impedance, frequency, and speed.

19. The device of claim 1, wherein the controller controls the motor input to the electric motor to control a hydraulic actuator in at least three of four quadrants of a force velocity domain of the hydraulic actuator.

20. The device of claim 19, wherein the hydraulic actuator is controlled to operate in all four quadrants of the force velocity domain of the hydraulic actuator.

21. The device of claim 1, wherein the controller receives inputs from at least one of an internal sensor integrated with the device and an external sensor remotely located relative to the device, and wherein the controller controls operation of a hydraulic actuator in response to the signals from the at least one of the internal sensor and the external sensor.

22. The device of claim 1, wherein the housing is connected to a sprung mass side of a suspension system.

23. The device of claim 1, wherein the housing is coaxially aligned with and connected to a hydraulic actuator.

24. The device of claim 1, wherein the controller is adapted to update the motor input at a frequency greater than or equal to 0.5 Hz.

25. The device of claim 24, wherein the controller is adapted to update the motor input at a frequency less than or equal to 1 kHz.

26. The device of claim 1, further comprising:
   at least one valve that partially controls a flow of hydraulic fluid between the first and second ports of the hydraulic-motor pump during at least one mode of operation.

27. The device of claim 26, wherein the at least one valve is a diverter valve that activates at a preset flow rate of hydraulic fluid leaving the damper.

28. The device of claim 26, wherein the hydraulic motor-pump and the electric motor have a combined reflected system inertia and a combined system compliance, and wherein a product of the system compliance times the reflected system inertia is less than or equal to 0.0063 $s^{-2}$.

29. The device of claim 28, wherein the hydraulic motor-pump and the electric motor have a combined reflected system inertia and a combined system compliance, and wherein a product of the system compliance times the reflected system inertia is greater than or equal to $2.5 \times 10^{-6}$ $s^{-2}$.

30. The device of claim 26, wherein a response time of the active suspension actuator is between about 10 ms and 150 ms.

31. The device of claim 26, wherein a natural frequency of the active suspension actuator is between 2 Hz and 100 Hz.

32. The device of claim 26, wherein controlling the motor input of the electric motor directly controls actuation of the hydraulic actuator.

33. The device of claim 26, wherein the motor input is at least one of motor position, voltage, torque, impedance, frequency, and speed.

34. The device of claim 26, wherein the controller receives inputs from one or more sensors adapted to sense at least one of a wheel event and a body event, and wherein the controller controls the motor input in response to at least one of a sensed wheel event and a sensed body event.

35. The device of claim 26, wherein an update frequency of the motor input is greater than or equal to at least one of a wheel event and a body event frequency.

36. The device of claim 35, wherein the update frequency of the motor input is greater than about 0.5 Hz.

37. The device of claim 36, wherein the update frequency of the motor input is less than about 1 kHz.

38. The device of claim 36, wherein at least one of the wheel event and body event frequency is between about 0.5 Hz to 20 Hz.

39. The device of claim 26, wherein the at least one valve includes:
   a first valve that limits a flow of hydraulic fluid to the hydraulic-motor pump from the first volume during at least a first mode of operation; and
   a second valve that limits a flow of hydraulic fluid to the hydraulic-motor pump from the second volume during at least a second mode of operation.

* * * * *